United States Patent

Boswell et al.

[11] Patent Number: 5,903,624
[45] Date of Patent: May 11, 1999

[54] DATA TERMINAL FOR TELEPHONE CIRCUITS

[75] Inventors: Lanny E. Boswell, American Fork; Christopher I. Madore, Provo, both of Utah; Myron C. Butler, Edmond, Okla.

[73] Assignee: Communications Manufacturing Company, Los Angeles, Calif.

[21] Appl. No.: 08/027,868

[22] Filed: Mar. 8, 1993

[51] Int. Cl.⁶ .................................................. H04M 3/28
[52] U.S. Cl. ................................................ 379/21; 379/15
[58] Field of Search .................................... 379/21, 15

[56] References Cited

U.S. PATENT DOCUMENTS

| | | | |
|---|---|---|---|
| Re. 33,987 | 7/1992 | Suzawa | 359/49 |
| 4,367,923 | 1/1983 | Ishikawa | 350/345 |
| 4,487,481 | 12/1984 | Suzawa | 359/49 |
| 4,723,840 | 2/1988 | Humbert et al. | 350/345 |
| 4,760,389 | 7/1988 | Aoki et al. | 345/102 |
| 4,799,050 | 1/1989 | Prince et al. | 340/765 |
| 4,837,811 | 6/1989 | Butler et al. | 379/96 |
| 4,997,263 | 3/1991 | Cohen et al. | 350/345 |
| 5,025,466 | 6/1991 | Hilligoss et al. | 379/1 |
| 5,039,206 | 8/1991 | Wiltshire | 359/50 |
| 5,146,355 | 9/1992 | Prince et al. | 359/50 |
| 5,163,079 | 11/1992 | Crowdis | 379/27 |
| 5,208,846 | 5/1993 | Hammond et al. | 379/15 |
| 5,228,072 | 7/1993 | Imgalsbe et al. | 379/21 |
| 5,235,629 | 8/1993 | Butler et al. | 379/21 |

*Primary Examiner*—Stephen Chin
*Attorney, Agent, or Firm*—McAfee & Taft

[57] ABSTRACT

The present invention is an improved data terminal for use in communication and testing of telephone lines which data terminal is operated by a 16-bit microprocessor operating under control of MS-DOS 5.0 program. The data terminal with operating computer and large plurality of telephone test functions is fully contained in a hermetically sealed, lightweight housing to enable easy field handling through data send and receive operations as well as the multiple of telephone line test operations. Power saving aspects of the invention include automatically adjusted LCD backlight control and LCD adjustment caused by large or abrupt temperature changes in the field. The system uses a large microprocessor with EPROM and random access memory with field programmable gating arrays offering virtually thousands of different gate logic decisions.

15 Claims, 14 Drawing Sheets

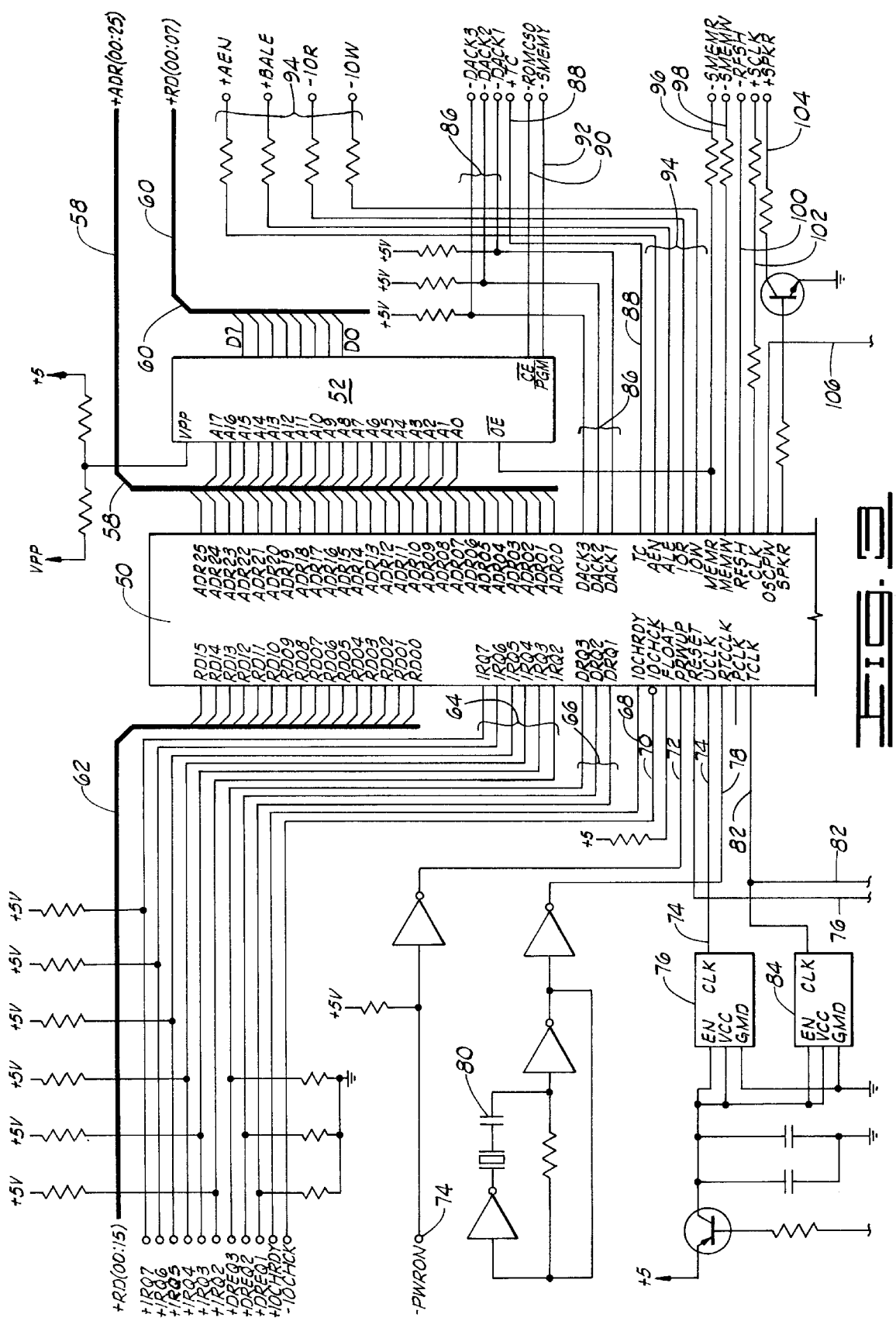

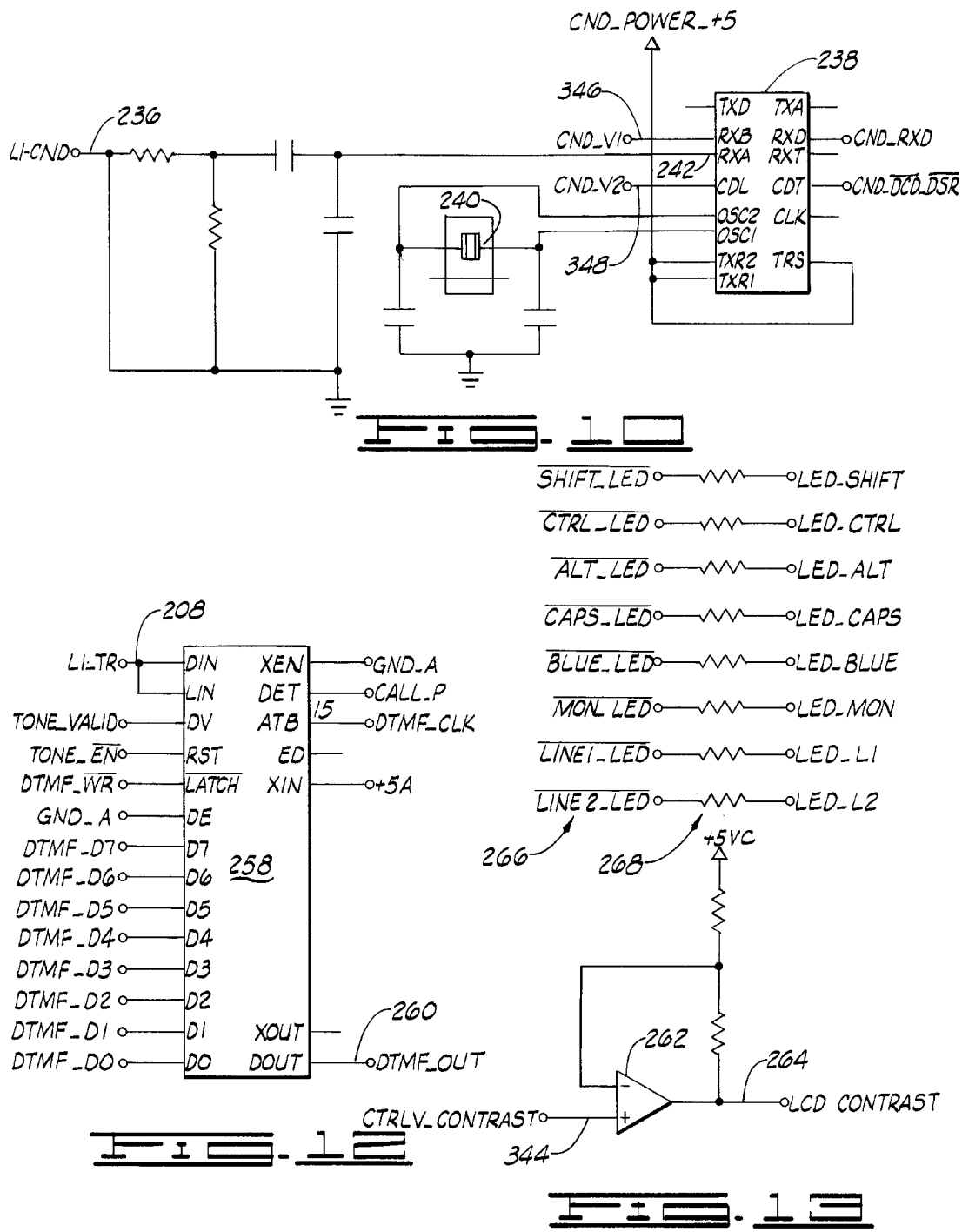

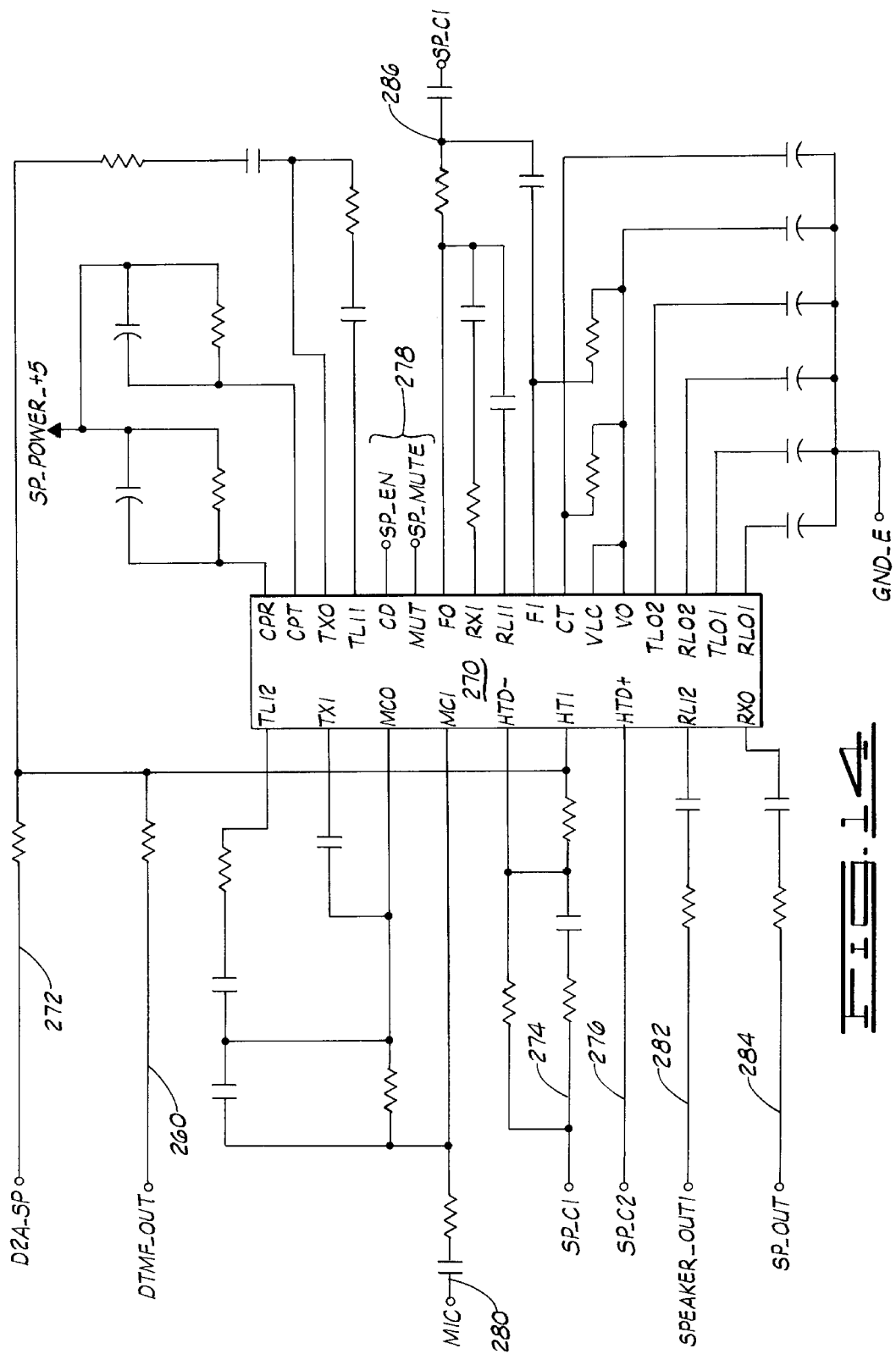

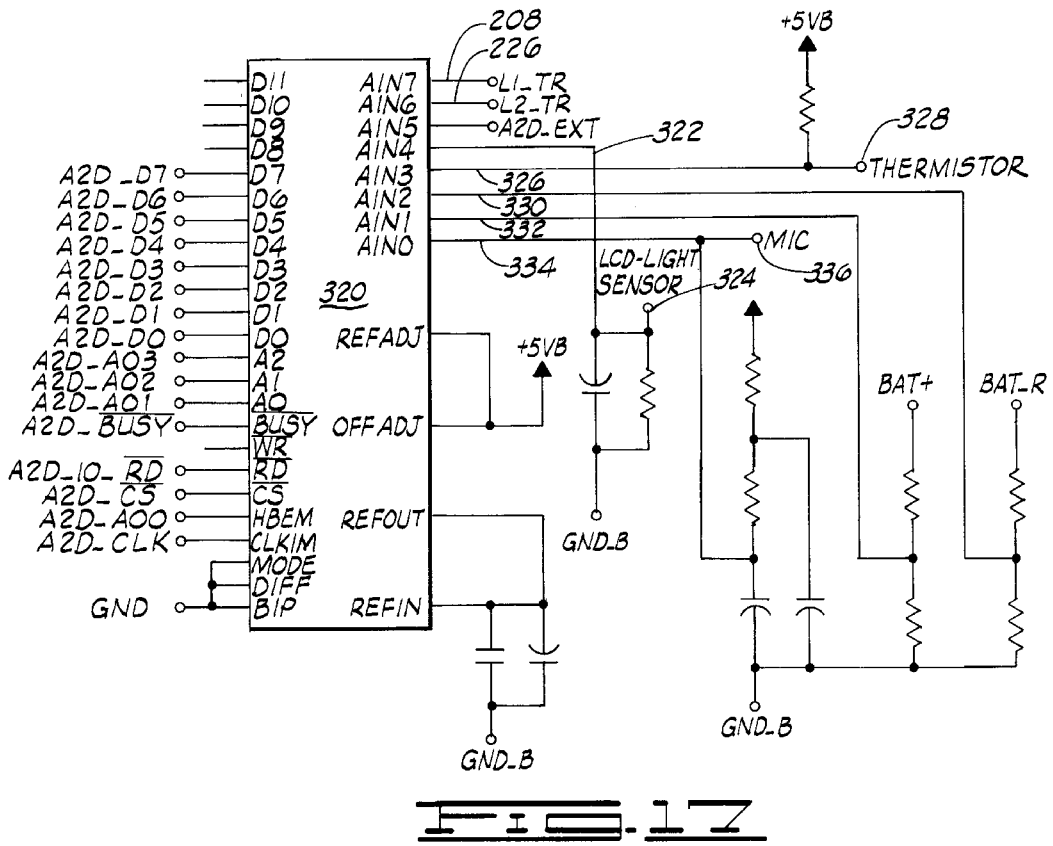
FIG. 17
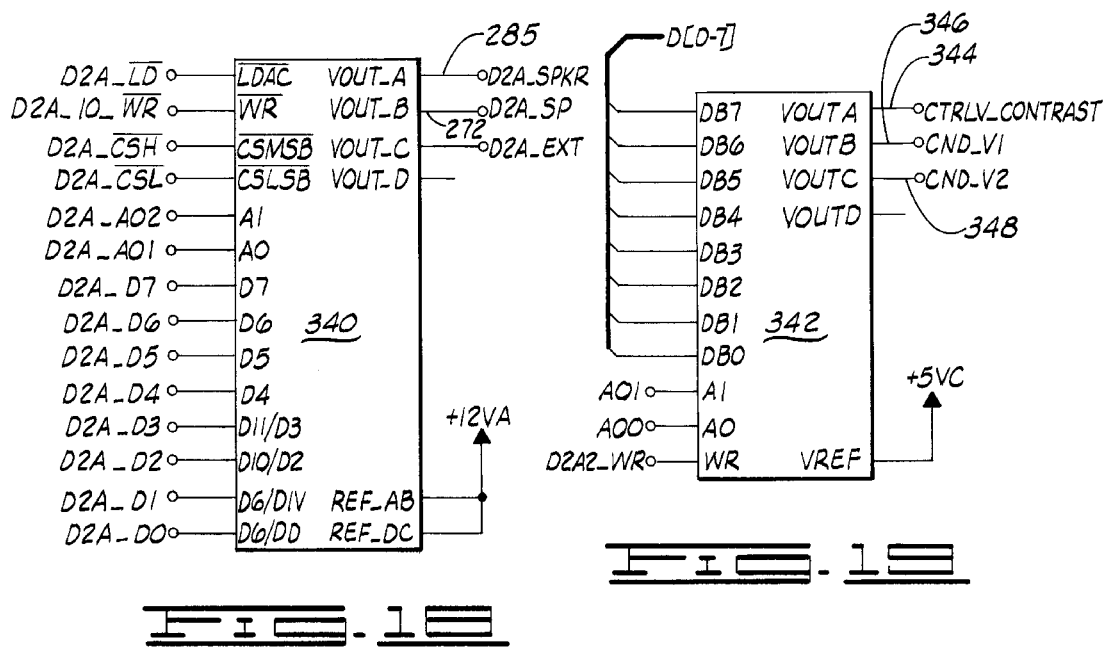
FIG. 18
FIG. 19

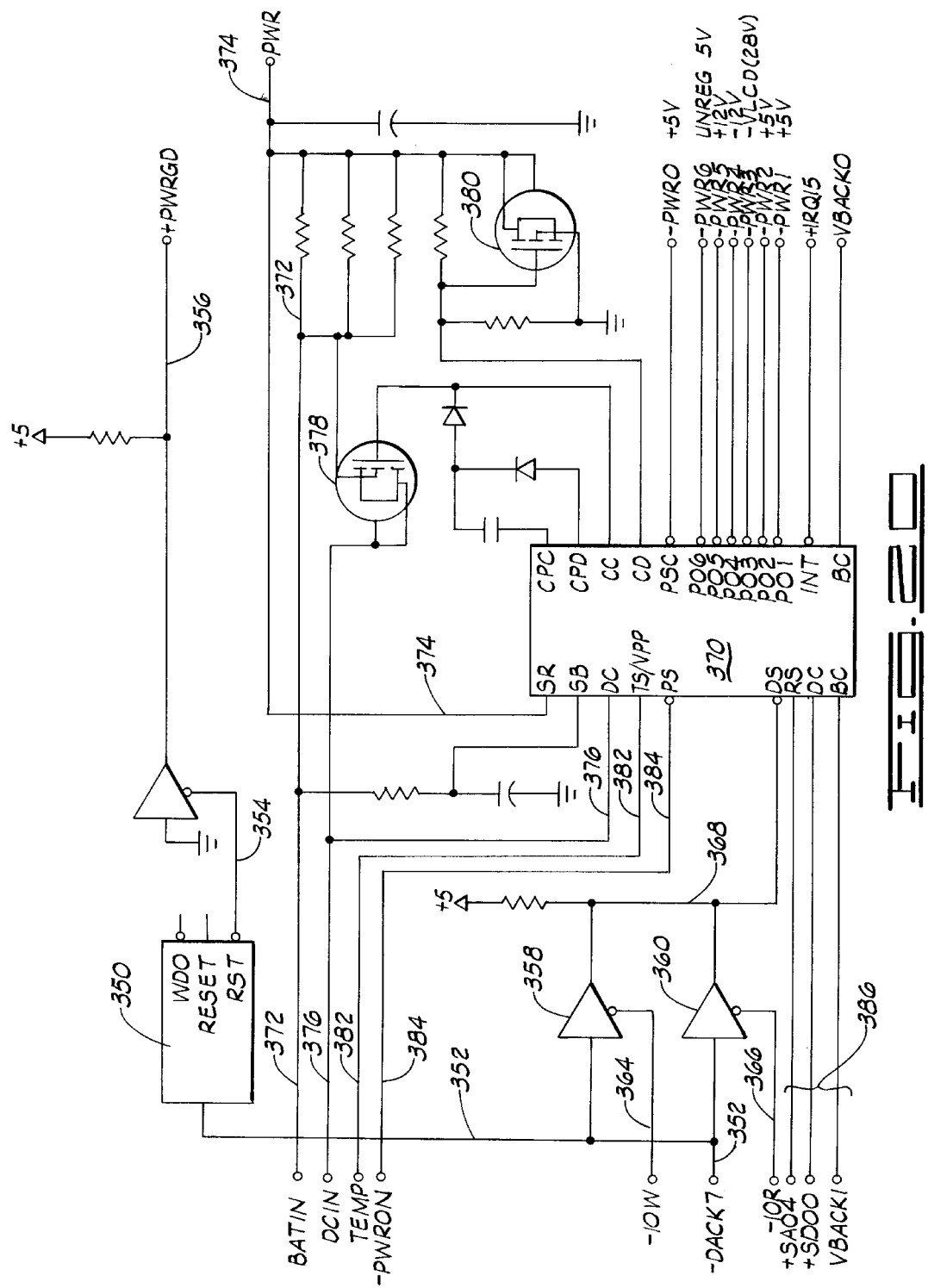

DATA TERMINAL FOR TELEPHONE CIRCUITS

CROSS-REFERENCE TO RELATED APPLICATION

This application is related to U.S. patent application Ser. No. 07/514,318 which was filed on Apr. 23, 1990, now abandoned and entitled "DATA TERMINAL FOR COMMUNICATING OVER A TELEPHONE CIRCUIT".

BACKGROUND OF THE INVENTION

1. Field of the Invention

This invention relates generally to data terminals for communicating over telephone circuits, and more particularly, but not by way of limitation, to a terminal for communicating with a telephone operations and administrative system, one specific type of which is referred to as a craft technician's portable field terminal through which telephone maintenance dispatches and reports are made.

2. Description of the Prior Art

In the telephone industry, individuals, referred to as craft technicians, are utilized in the field traveling from site to site where telephone instruments or telephone facility problems are found. Typically, maintenance requests are collected at a central location and then dispatched to different individuals for attention. Once a problem has been attended to, the craft technician must report results back to the central location.

Computerization of such maintenance systems has enabled the craft technicians to receive dispatches and submit reports without having to travel to and from or to verbally communicate with the central maintenance location. The craft technician can now communicate with the central location through a hand-held portable field terminal such as is disclosed in U.S. Pat. No. 4,837,811 in the name of Butler et al. This computerized maintenance system along with the advent of the technician's field terminal has significantly improved the efficiency of telephone systems.

Although terminals such as the type disclosed in U.S. Pat. No. 4,837,811 have proved advantageous, there are additional needs to be met to enhance further the utility of such terminals. One such need is to enable such terminals to receive programs, such as applications programs which the technician may wish to call up in order to perform a specific task (e.g., creating and filling out a time sheet), which are downloaded over conventional telephone circuits. In order to save time, the technician no longer need take the terminal into the central office in order to be reprogrammed over a high speed data link, but he can download additional programs directly to the terminal at its remote location via the existing telephone circuit.

SUMMARY OF THE INVENTION

The present invention provides a novel and improved data terminal for communicating over a telephone circuit. The data terminal utilizes a single microprocessor and a minimum one meg storage while operating on MS DOS (Version 5) to enable a plurality of circuit functions including multi-mode communications, selected telephone test functions, LCD brightness control functions, temperature compensation features and continuous power management functions. The data terminal includes an LCD display (40×25) and all of the standard personal computer function and control keys including a QWERTY alphanumeric keypad and a standard telephone keypad. In addition, the data terminal is packaged in a lightweight, hermetically sealed and weatherproof encasement thereby to provide the craft technician with greatest repair and communication capability under all field conditions.

It is an object of the present invention to provide a craftsman's data terminal that is programmable based upon the DOS platform.

It is also an object of the present invention to provide a data terminal that can be readily upgraded in the field by switching modular modems and which can add additional random access memory by modular exchange.

It is still further an object of the present invention to provide a data terminal having increased area of liquid crystal display which has automatic contrast and backlighting control.

It is yet further an object to provide a data terminal having multiple modes of communication including DTMF signalling as well as amplified loud speaker output that provides a high-impedance monitor for subscriber lines.

Finally, it is an object of the present invention to provide a data terminal housed in a compact, lightweight package that is totally waterproof and capable of telephone subscriber line voltage measurements with up to 15 mv accuracy.

Other objects and advantages of the invention will be evident from the following detailed description when read in conjunction with the accompanying drawings which illustrate the invention.

BRIEF DESCRIPTION OF THE DRAWINGS

FIG. 3 is a schematic drawing of the top half of the microprocessor circuitry of the present invention;

FIG. 10 is a schematic drawing of the caller number delivery modem circuit of the present invention;

FIG. 12 is a schematic drawing of the dial tone multi-frequency (DTMF) receiver-transmitter of the data terminal;

FIG. 13 is a schematic drawing of liquid crystal display contrast circuitry and LED control leads in the present invention;

FIG. 14 is a schematic diagram of a voice switched speaker phone circuit as utilized in the present invention;

FIG. 17 is a schematic diagram of analog to digital converter used in the light sense and temperature sense circuitry of the present invention;

FIG. 18 is a schematic diagram of a digital to analog converter of the present invention as utilized with the speaker and speaker phone circuits;

FIG. 19 is a schematic diagram of a digital to analog converter as used with the display light control and caller number delivery modem in the present invention; and FIG. 20 is a schematic diagram of power supply and attendant energy management unit as utilized in the present data terminal.

DETAILED DESCRIPTION OF THE INVENTION

Figure 1:
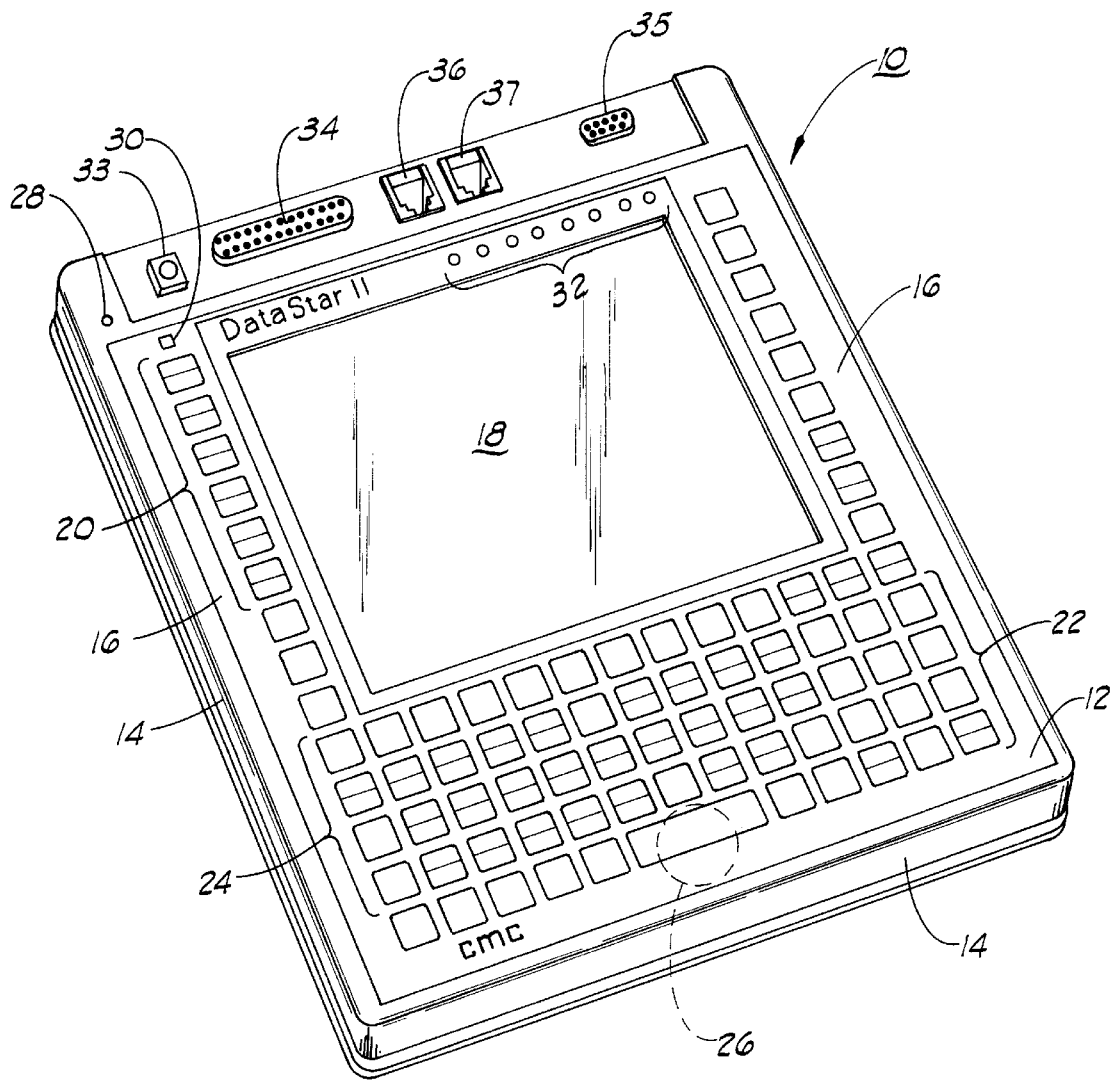
FIG. 1 is a perspective view of the data terminal as constructed in accordance with the present invention.

Referring to FIG. 1, the data terminal 10 consists of a housing or container 12 having sidewalls 14 and top panel 16 in water-tight assembly, as will be further described. The data terminal has a 320×200 dot TN LCD panel 18 of the transflective type with automatic CFL backlighting and eighty-one embossed tactile keys with embedded LED indicators. The keys consist of function keys 20, a telephone keypad 22, a standard QWERTY keyboard 24, with the remainder being the various control keys of standard PC-compatible type including special keys, panning and scroll keys, etc.

A hands free speaker 26 is placed in the sub panel position designated by dash lines and a microphone function is provided by an embedded electret 28. An optical light sensor 30 provides an ambient light detector for use in controlling contrast of LCD screen 18, and a plurality (eight) of LED function indicators are provided at 32. A battery charge jack 33 is provided and a twenty-five pin LPT1 parallel port receptacle 34 is available adjacent thereto. An RS-232 receptacle 35 appears on the right hand side while line 1 and line 2 (data/voice and voice) RJ-11 telephone receptacles 36 and 37 are readily accessible.

Figure 2A:
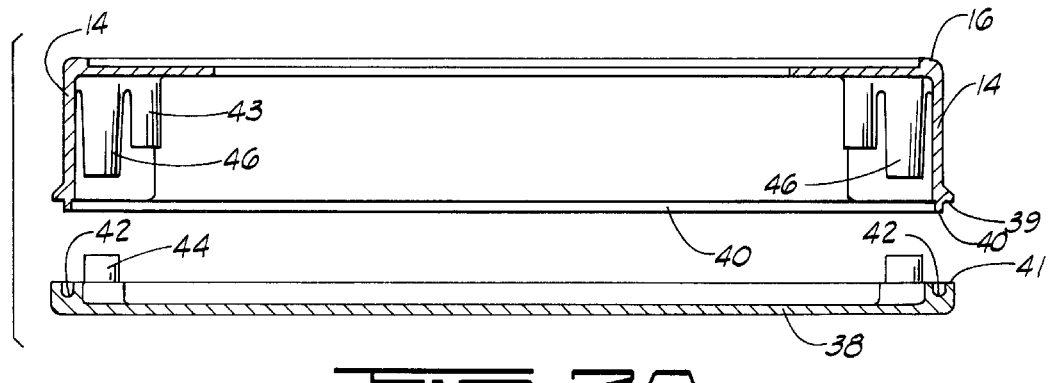
FIG. 2A is an exploded view in section of top and lower panels of the data terminal container.

FIG. 2A shows in exploded form the manner in which the top panel 16 and integrally formed side walls 14 are engageable with a bottom panel 38 to form a hermetically sealed container 12. The side walls 14 of the upper half structure are actually rectangular or nearly square in configuration and the lower edge 39 of side walls 14 extends a nearly square sealing tongue 40 therearound. The bottom panel 38 extends unitarily an upwardly facing lip 41 of nearly square configuration which includes a nearly square groove 42 for mating reception of the downward facing insert tongue 40. In actual assembly, a length of elastomeric gasket material is disposed around the groove 42 with subsequent force-fit of tongue 40 downward therein and suitable bonding around the total, nearly square extremity. A plurality of securing posts 43 and 44 are located around the inner side of top panel 16 and lower panel 38 for water tight reception of selected fasteners.

Figure 2B:
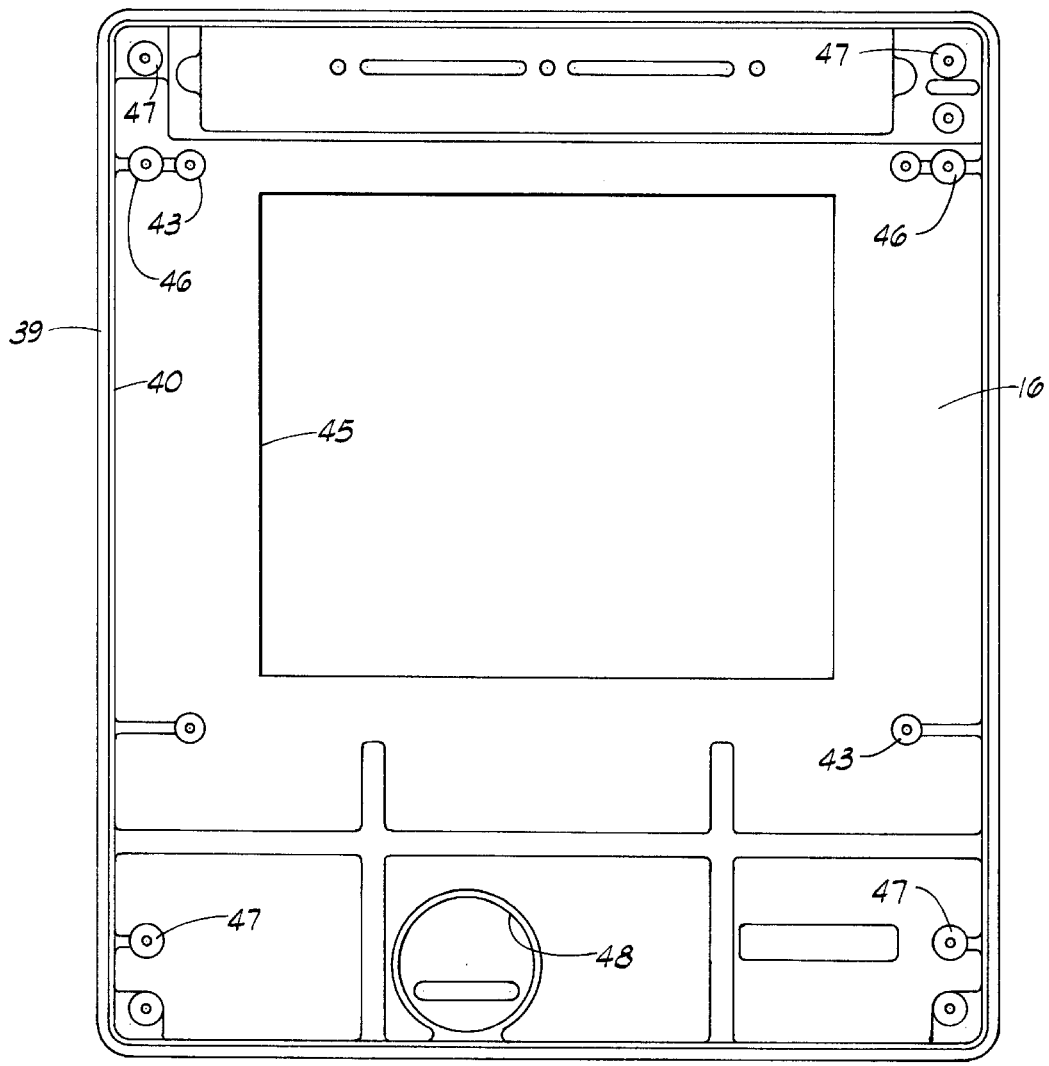
FIG. 2B is a plan view of the interior side of the top panel of the data terminal.

FIG. 2B is a view of top panel 16 showing the inner structure. The top panel 16 includes a rectangular hole 45 through which the LCD panel 18 is viewably mounted, and it includes other strategically located securing posts 46 and 47 disposed for mating engagement with opposite securing posts within the lower panel 38. A circular rib structure 48 provides a mounting space for the device speaker 26.

Figure 4:
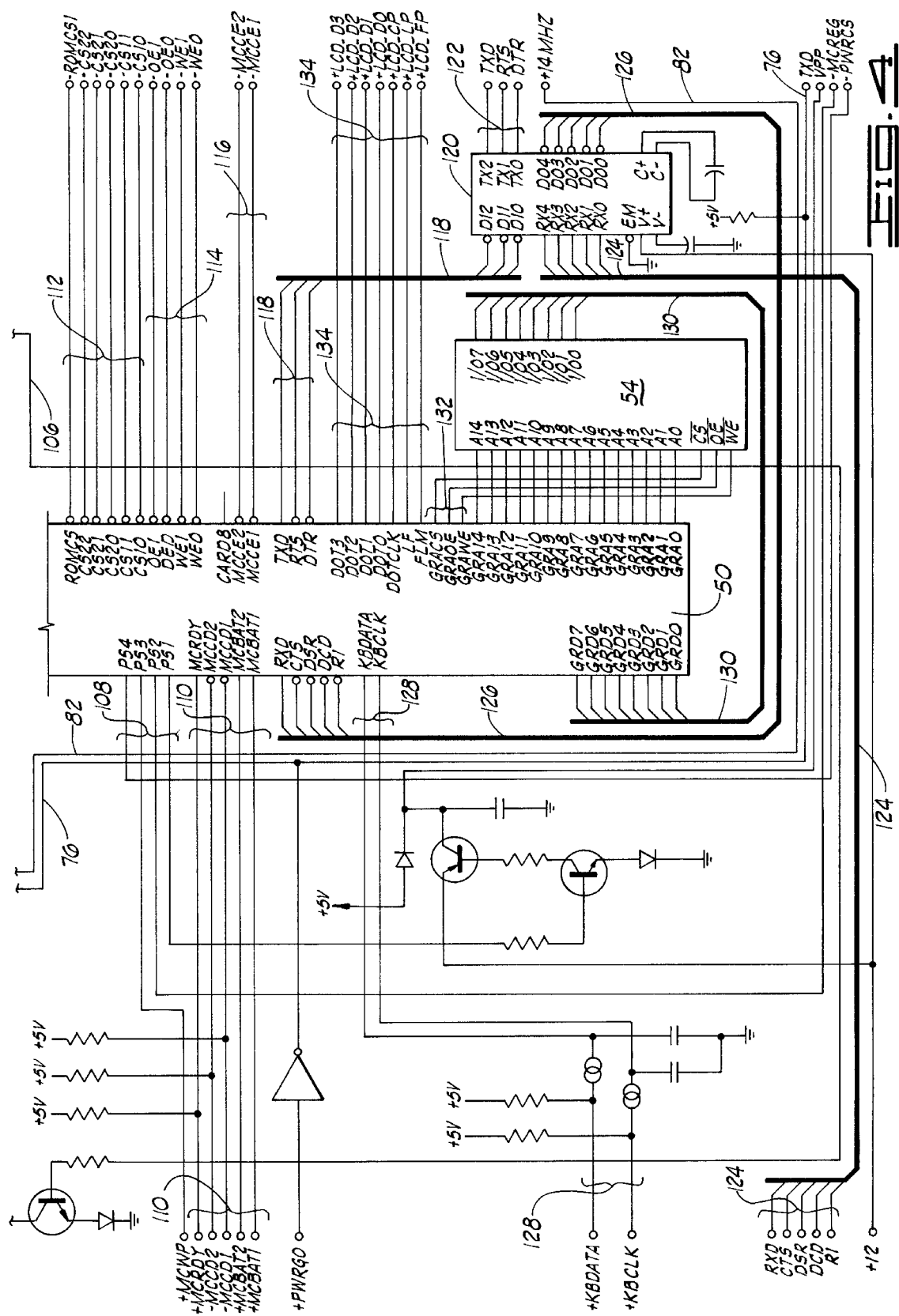
FIG. 4 is a schematic drawing of the bottom half of the microprocessor circuitry.

FIGS. 3 and 4 relate to the microprocessor 50 and attending circuitry. The microprocessor 50 is a Chips and Technology Type F8680 and it functions in conjunction with an EPROM 52, an Intel Type 27C020, a reprogrammable 256 kb Flash EPROM. Referring to FIG. 4, there is also provided a coactive random access memory 54 which is Motorola Type 62250.

The address ports ADR00–ADR25 are each connected into an address bus 58 while ports 00–17 are also connected into the address ports of EPROM 52. The output data ports D0–D7 from EPROM 52 are connected onto the bi-directional data bus 60. The data ports RD00–RD15 of microprocessor 50 are connected onto a bi-directional data bus 62. Interrupt request leads IRQ2–IRQ7 are connected via lead group 64 into the respective ports of microprocessor 50 and the data request ports receive input of the DRQ1-3 leads 66. In like manner, inputs are received for IOCHRDY channel ready and IOCHCK channel check on respective leads 68 and 70. Power up PWRUP on lead 72 is received in from the power on indication at terminal 74, and system reset is provided on lead 76. U-clock is received on lead 74 from the 1.6432 megahertz oscillator 76 and RTC clock is received on lead 78 from a 32.76 kilohertz oscillator 80. A T clock input on lead 82 is derived from a 14.318 megahertz oscillator 84.

Dynamic memory access acknowledgment signals DACK 1–3 are output on lead group 86 and terminal count output TC is presented on lead 88. Chip select ROMC50 and memory write SMEMW control are provided on leads 90 and 92 to the EPROM 52. Lead group 94 provides input to the microprocessor 50 of address enable AEN, address latch enable ALE, read IOR and write IOW on lead group 94. Memory read JMEMR and memory write SMEMW outputs are provided on leads 96 and 98 while refresh RFSH output is on lead 100, system clock on lead 102 and speaker control on lead 104. Oscillator power on lead 106 returns to receive data circuitry as will be further described.

Referring now to FIG. 4, the lower half of microprocessor 50, the lead group 108 provides power supply condition inputs to ports PS1 through PS4 and lead group 110 provides memory card data to the memory card ports MCBAT 1 through MCRDY. Various chip select CS functions are attended by lead group 112 and selected read and write chip commands are provided on leads 114. Enablement of memory cards 1 and 2 is controlled by lead group 116. Lead group 118 controlling transmit data TXD, ready to send RTS and data terminal ready DRT is input to a voltage converter 120, a Maxim Type 239. The voltage control output is then presented on lead group 122. Input at lead group 124 consisting of receive data RXD, clear to send DTS, data set ready DSR, data carrier detect DCD and ring indicator RI is applied to ports RX0–RX4 of the voltage converter 120 and regulated outputs D00–D04 are conducted on lead group 126 for return to the respective ports R1-RXD of microprocessor 50.

Keyboard data and keyboard clock signals are connected on leads 128 from the keyboard. Ports GRA0–GRA14 provide graphics address to ports A0–A14 of RAM 54 and input-output ports 0–7 provide interconnection on lead group 130 back to the graphics data ports GRD0–GRD7 at microprocessor 50. The chip select, read enable and write enable of RAM 54 are attended by lead group 132. Intelligence depiction of graphics is controlled by the output ports for dot, i.e., lead group 134 which are applied to the liquid crystal display terminals.

Figure 5:
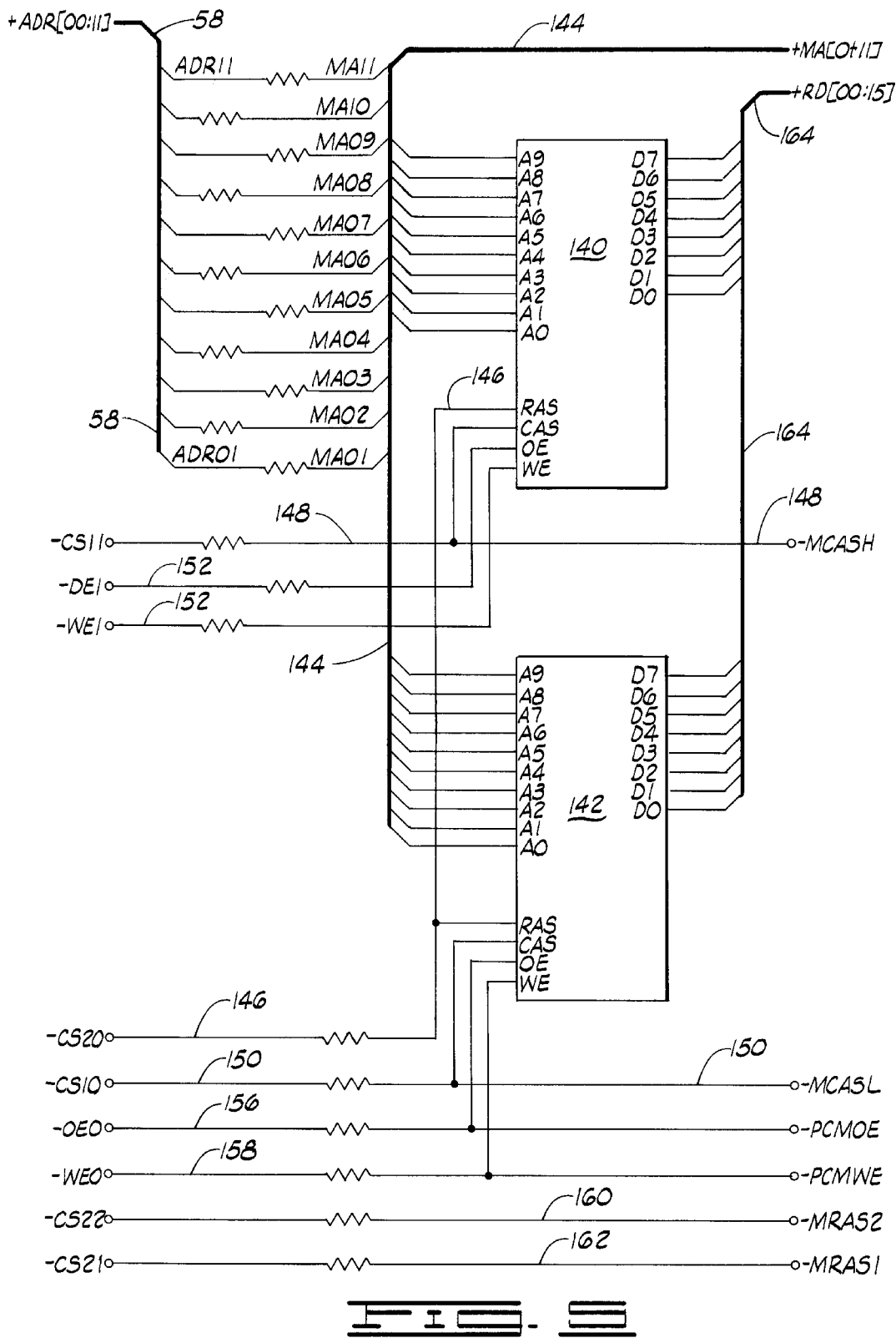
FIG. 5 is a schematic diagram of the memory section of the present invention.

FIG. 5 represents a memory circuit that functions in conjunction with the microprocessor 50 and which maintains storage of the MS DOS 5.0 program. The storage is effected by a pair of DRAMS, Hitachi Type 4C8512 Kx 8 bit DRAM circuits, which DRAMS 140 and 142 operate in parallel. The respective address lines 01–11 are each current limited and placed onto a memory address bus as lines MA01–MA11 present on memory address bus 144. Address input is then derived from memory address bus 144 for input to respective A0–A9 inputs of each of DRAMS 140 and 142.

The DRAMS 140 and 142 operate in tandem as chip select CS 20 signal on line 146 is applied to respective RAS ports and chip select CS 11 and chip select CS 10 are applied via respective leads 148 and 150 to the CAS ports of DRAMS 140 and 142. Read OE and write WE inputs on leads 152, 154, 156 and 158 are also applied in control of respective DRAMS 140 and 142. Additional chip select signals on leads 160 and 162, CS22 and CS21, are available as output for microprocessor 50.

Each of the DRAMs 140 and 142 is controlled to output D0–D7 8-bit data onto a data bus 164. Each of the DRAMS 140 and 142 has the capacity of 512 kilobytes so that the total storage capacity is normally 1024 kilobytes. This dynamic RAM storage is used to contain the MS DOS program information and it can be readily expanded up to 4 Mb by modular insertion of storage components if such additional memory is required.

Figure 6:
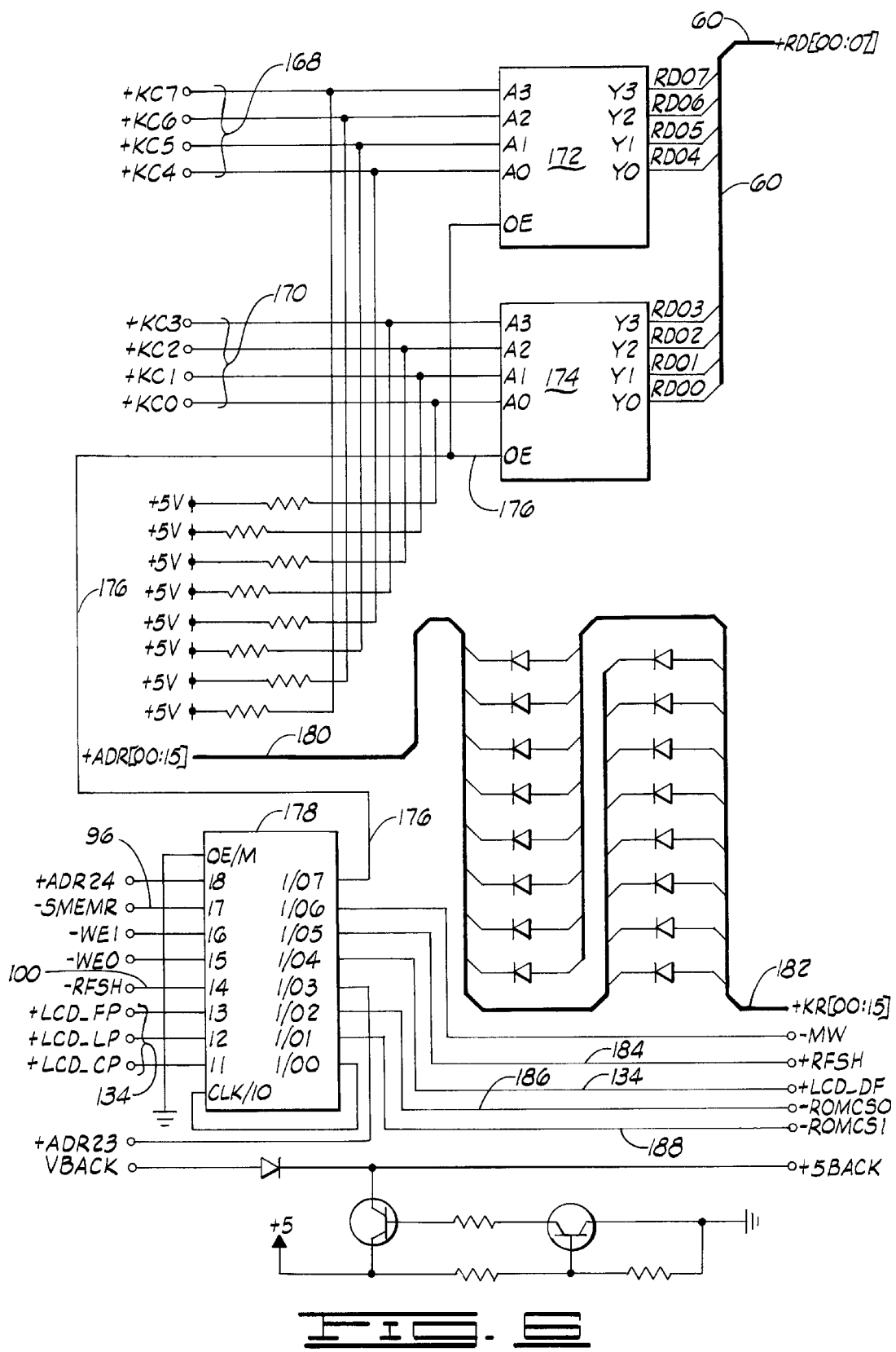
FIG. 6 is a schematic drawing of the keyboard and LCD control circuitry of the data terminal.

Referring to FIG. 6, there is shown circuitry for keyboard scanning data compilation and logic circuitry for the liquid crystal display. While the keyboard circuitry is not shown specifically in the interest of eliminating clutter, the data terminal 10 utilizes a standard type of keyboard matrix array that can be readily scanned by examining the rows and column circuit condition for each matrix interconnection. Thus, the lead groups 168 and 170 each provide 4 lead input to the A0–A3 ports of respective tri-state buffers 172 and 174. The tri-state buffers 172 and 174 are Motorola Type 74HC244 integrated circuits and they receive enable voltage via lead 176 from the I07 port of a programmable array logic circuit 178, Atmel Type PAL 16VS. A pair of Y0–Y3 outputs from respective tri-state buffers 172 and 174 is then output onto data bus 60 as binary signals RD00–RD07.

Address lines ADR 00–ADR15 are applied on an address bus 180 through respective diodes to emerge as matrix row signals KR00–KR15 on bus 182. The programmable array logic 178 is connected with 20 grounded read enable (OE) port, and ADR 24 from address bus 58 is connected to port 18. The SMEMR output on lead 96 (FIG. 3) connects to port 17 while refresh output on lead 100 connects to port 14. The WEI and WEO signals from microprocessor 50 and lead group 114 are connected to respective ports 16 and 15, and liquid crystal display outputs FP, LP and CP from lead group 134 (FIG. 4) are applied to respective ports 13, 12 and 11 of PAL 178. The ROM chip select voltages are applied to I/O ports 1 and 2 while address lead ADR 23 from bus 58 is applied to the I/O port 3. Refresh voltage is present on lead 184 (I/O 5) and the ROM chip select voltages for ROMs 0 and 1 are present on respective leads 186 and 188.

Figure 7:
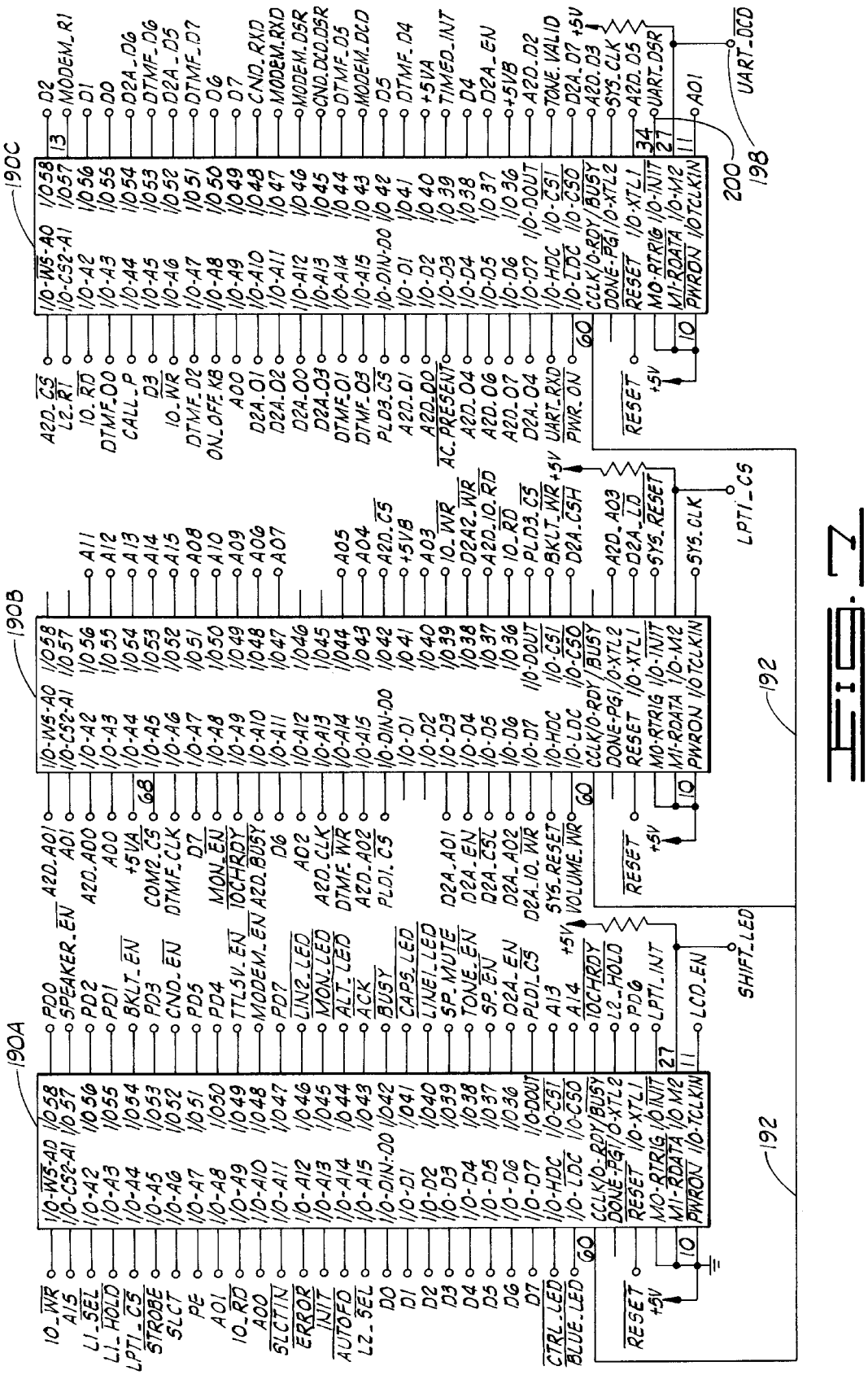
FIG. 7 illustrates connections for specific circuits in relation to a three-ganged field programmable gate array (FPGA) circuit.

Referring now to FIG. 7, there is a tandem interconnection of field programmable gate arrays of Type XC 3020 which are available from Xilinx Corp. The field programmable gate arrays are commonly referred to as FPGA circuits and three identical FPGA chip circuits 190A, 190B and 190C are utilized in the overall circuit. The FPGA has the capability of being pre-programmed so that selected gating arrangements are effected between signals at selected I/O ports. The program allows wide variation in the number and association of outputs versus inputs as utilized on a respective FPGA. The program for present design of FPGAs 190A–C is a fifty page document and is submitted herewith as Exhibit 1.

The three FPGA circuits 190A, 190B and 190C are synchronized as a unit by interconnection of their respective pins 60 clock inputs as tied together by control lead 192. Each of the FPGAs 190A, 190B and 190C is energized by application of 5 volts power to pin 10, the power PWRON connection which includes the memory 0 and 1 receive trigger and receive data inputs in parallel. Generally, each of the FPGA integrated circuits 190A, 190B and 190C deals with a separate plurality of the different circuit functions that occur in the operation of the data terminal 10.

Figure 8:
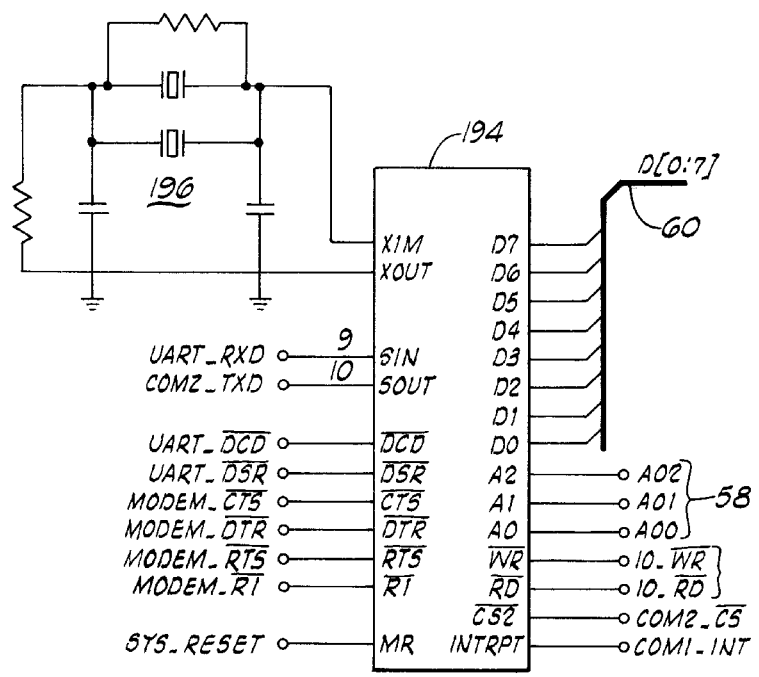
FIG. 8 is a schematic illustration of a universal asynchronous receiver-transmitter (UART) stage in the present invention.

Referring now to FIG. 8, a chip 194 is a silicon systems Type 73M1450 universal asynchronous receiver/transmitter which is commonly referred to as a UART. A UART chip functions to link the device 10 circuitry up to a standard type of modem which is connected to an external telephone line. A 1.8432 megahertz oscillator 196 is connected between the XIN and XOUT ports and the remaining ports on the left hand side connect from other circuits. Thus, noting also FIG. 7, the UART RXD input as applied to the SIN port is connected from the I/O-HDC port (pin 28 of FPGA 190C). The COM2-TXD port is output to the communications 2 transmission channel. The UART DCD signal input to UART 194 comes from terminal 198 (pin 27) of FPGA 190C, and the UART DSR data set ready signal is applied to terminal 200 (pin 34) of FPGA 190C. Connection of DTR data terminal ready and RTS ready to send are outputs and CTS clear to send and RI ring indicator receive inputs.

Referring again to FIG. 8, binary data signals are received in at ports D0–D7 from the data bus 60, and terminals A0, A1 and A2 receive address signals A00–A02 from the address bus 58. Also, IORD read and IOWR write signals are input to their respective ports as derived from lead group 94 (see FIG. 3) and the communications port 2 chip select is available from FPGA 190B at pin 68, the I/O A5 port. The interrupt signal from communications port 1 is then applied as interrupt for the UART 194.

Figure 9:
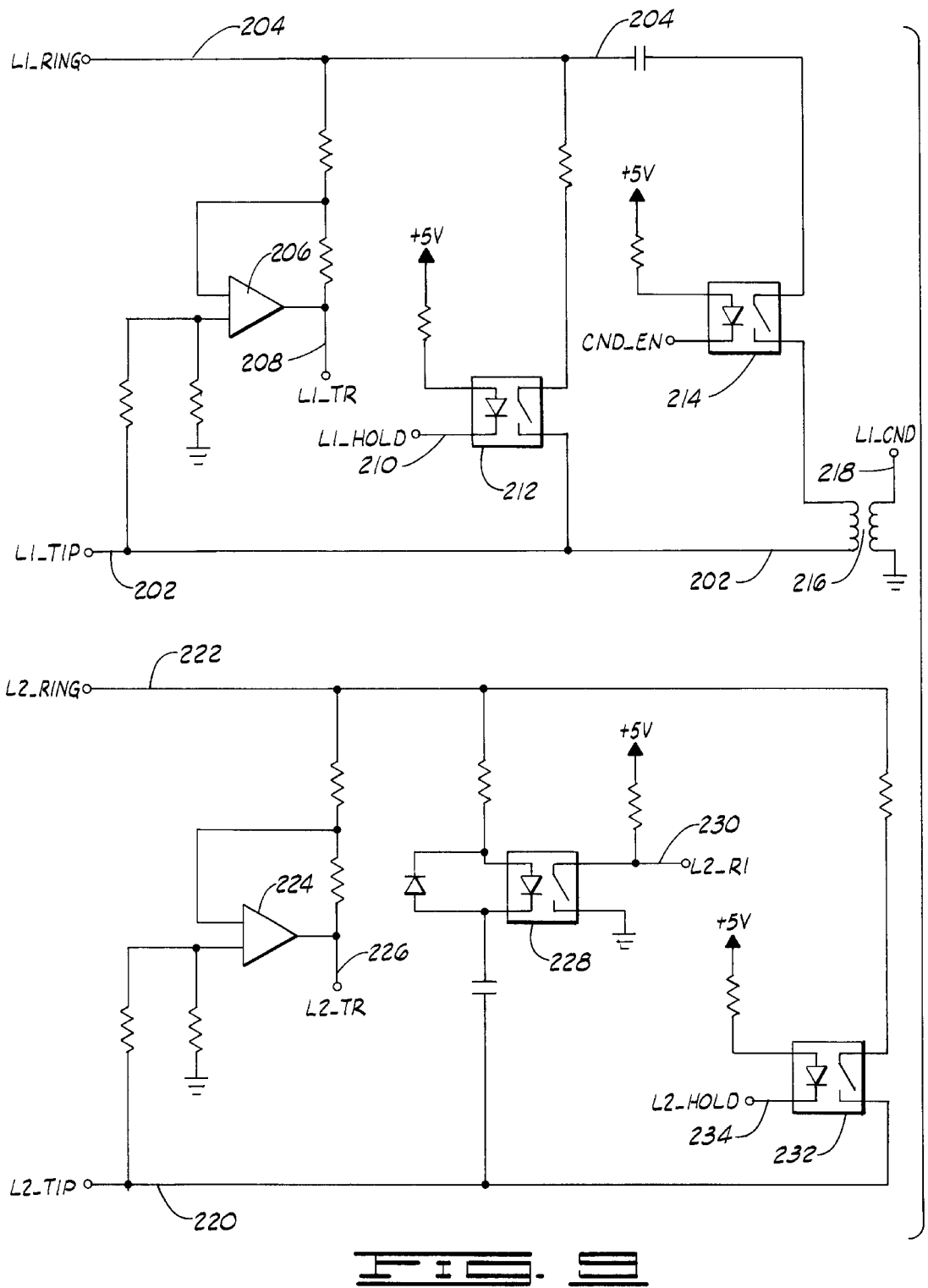
FIG. 9 is a schematic drawing of the caller number delivery (CND) circuitry of the data terminal.

FIG. 9 illustrates the telephone line input circuitry for both lines 1 and 2. The line 1 inputs consist of tip and ring terminals 202 and 204 with an amplifier 206 interconnected to detect an incoming signal on line 1. Upon detection of a signal, a signal is produced at terminal 208 line 1-TR, and this signal is applied to an analog to digital converter in FIG. 17, as will be further described. In the event of a signal input L1 HOLD at terminal 210, the solid state switch 212 will be energized to latch the hold circuit closed. Ring voltage on lead 204 also will close the switch circuit 214 to place caller identification signal on the primary of a transformer 216 with the line 1 caller number delivery signal present on output terminal 218.

The line 2 tip and ring leads 220 and 222 span a similar amplifier 224 which produces a line 2 TR signal at terminal 226. The signal at terminal 226 is also applied to an analog to digital converter as will be discussed relative to FIG. 17. A solid state switch 228 is connected as a ring indicator to provide line 2 RI indication on output terminal 230. Solid state switch 232 then functions as a hold circuit to enable the line 2 HOLD output at terminal 234.

Referring now to FIG. 10, a caller number delivery (CND) circuit receives input of the line 1-CND signal as output from terminal 218 (FIG. 9) for connection to terminal 236 and the RXA input of a CND modem 238, a Motorola Type TCM3105 which functions to retrieve the caller ID number off of the incoming line. An oscillator 240 operating at 4.4336 megahertz is input across the oscillator 2 and oscillator 1 inputs of modem 238. The CND V1 and CND V2 voltages are derived in FIG. 19 (to be described) and applied to the RXB and CDL inputs of modem 238, and the outputs are generated in digital signal form as the CND RXD and CND DCD/DSR control signals which indicate data carrier detect and data set ready, for input to FPGA 190C at I/O48 and I/O45 (FIG. 7).

Figure 11:
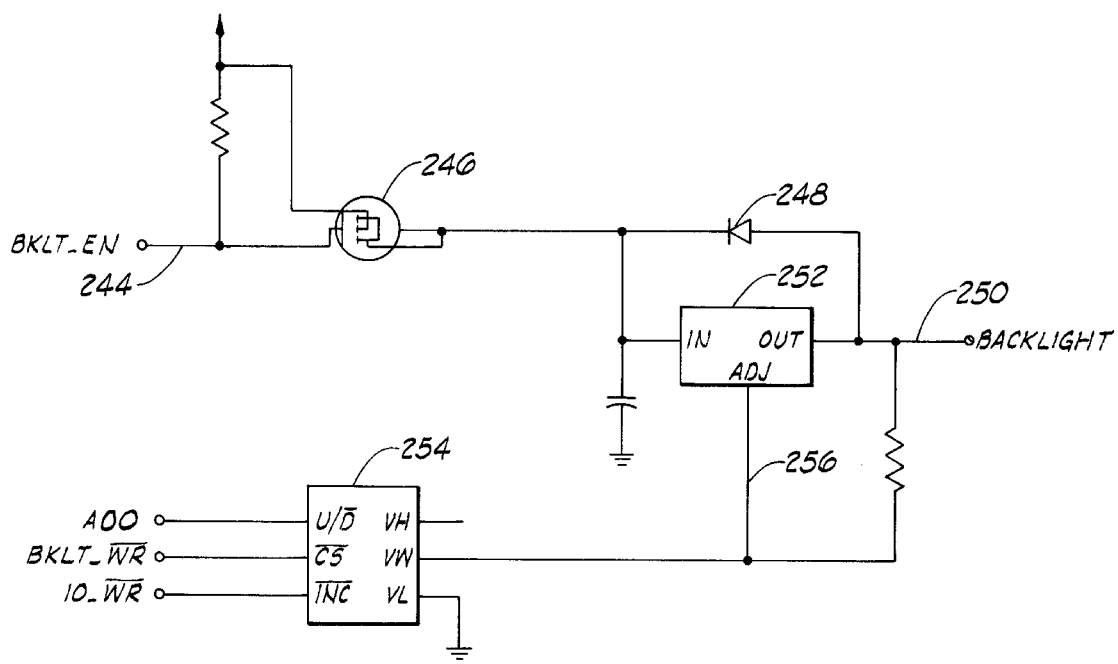
FIG. 11 is a schematic illustration of the display backlighting circuitry of the present invention.

FIG. 11 illustrates one form of voltage regulator that is utilized in the LCD backlight circuitry. A backlight enable signal BKLT EN is applied to input terminal 244 and is derived from I/O 54 of FPGA 190A. This signal is applied through transistor switch 246, a Type S19953 for conduction through parallel diode 248 to an output lead 250 which conveys the BACKLIGHT control voltage output. A solid state voltage regulator 252, a Type LM317, is connected in parallel to control the level of voltage at output terminal 250. Inputs from FPGA 190B, viz. A00 at I/O A2, BKLT WR at I/O CSI (actually a chip select) and I/O WR at I/O 39, are applied in control of a digital resistor 254, a Dallas Semi-Conductor Type DS1666SN, to provide adjustment via lead 256 of the output 250 of voltage regulator 252. The transflective LCD screen is clear and viewable with sufficient ambient light but may need additional backlighting at low ambient light levels.

FIG. 12 shows a dual tone multi-frequency (DTMF) receiver-transmitter integrated circuit chip 258, a Silicon Systems Type 75T2091. Eight bit binary digital input is applied to DTMF D0 through DTMF D7 terminals from respective terminals located on the FPGA 190C. The LATCH PORT of the DTMF receiver-transmitter 258 is connected to DTMF WR on FPGA 190B, as is DTMF CLK in connection to the ATB port (pin 15). The DTMF output is present on port terminal 260.

Referring now to FIG. 13, a CTRLV CONTRAST signal 344 (from FIG. 19) is input to the positive terminal of an amplifier 262 which generates an output on lead 264 that automatically adjusts the contrast condition of the liquid crystal display when temperature change may have caused detrimental contrast change. The software determines the connecting contrast voltage by accessing a look-up table based upon the current temperature system voltages. Also indicated in FIG. 13 is the manner in which a series of outputs 266 as derived from selected ports on FPGA 190A are conducted through respective current limiting resistors 268 to become the energizing voltages for the plurality of front panel LED light indicators.

FIG. 14 represents a speaker phone circuit as utilized in the present device wherein a Motorola Type MC 341180 voice switched speaker phone circuit functions. The SP C1 and SP C2 inputs are derived from FIG. 16 as will be described. The DTMF OUT on lead 260 (FIG. 12) is applied as input to the HTI port of IC device 270. Also, a D2A SP analog signal output as derived from speaker phones is present on lead input 272 and also connected to the HTI port of chip 270. Yet additional inputs SP Cl and SP C2 are obtained from a coupling transformer in FIG. 16, as will be further described, for input via leads 274 and 276. Speaker phone signals SP EN and SP MUTE are applied at inputs 278. Microphone input on lead 280 is applied to the MCI port of chip 270 and outputs generated are conducted on speaker output lead 282 and speaker phone output 284. The speaker phone mute and enable signal inputs at 278 are derived from the FPGA 190A (FIG. 7) and the signal on lead 272 is derived from a digital to analog converter in FIG. 18 as will be described. The speaker phone C1 input at lead 286 to port FO of speaker phone chip 270 allows sound actuated switching of the speaker phone circuit.

Figure 15:
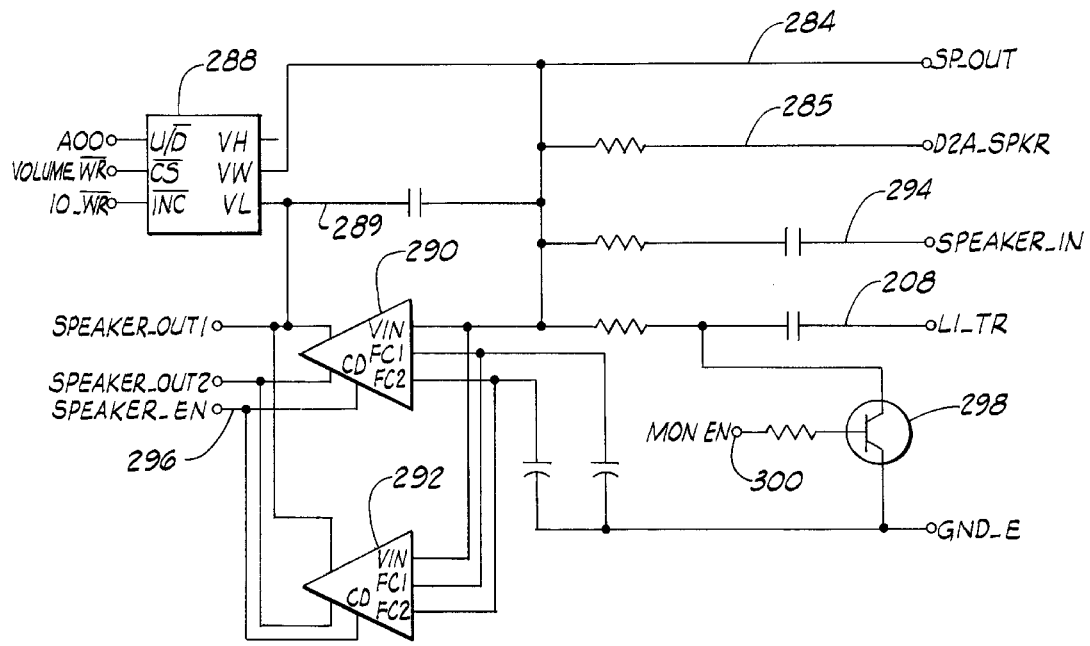
FIG. 15 is a schematic diagram of a high impedance monitor circuit constructed in accordance with the present invention.

FIG. 15 is a high impedance monitor circuit controlling system audio. An integrated circuit 288 is a digital resistor, a Dallas Semi-Conductor Type DS1666SN, which functions to control volume of the speaker. Control inputs of A00, volume WR, and IO WR are connected to respective I/O ports A3, LDC and 39 of FPGA 190B (FIG. 7) in control of digital resistor 288 with output via lead 289, the speaker phone out lead 284 goes to the like connection in FIG. 14. A pair of audio amplifiers 290 and 292, Motorola Type MC 341190, operate in parallel and receive input of L1 TR input 208 (FIG. 9) and front panel audio on lead 294. The amplifiers 290 and 292 generate outputs consisting of speaker out 1 and speaker out 2 with a speaker enable output on lead 296. A transistor switch 298 controls operation of the circuit under influence of a MON EN or monitor enable input at terminal 300 as received from I/O port A8 of FPGA 190B (FIG. 7).

Figure 16:
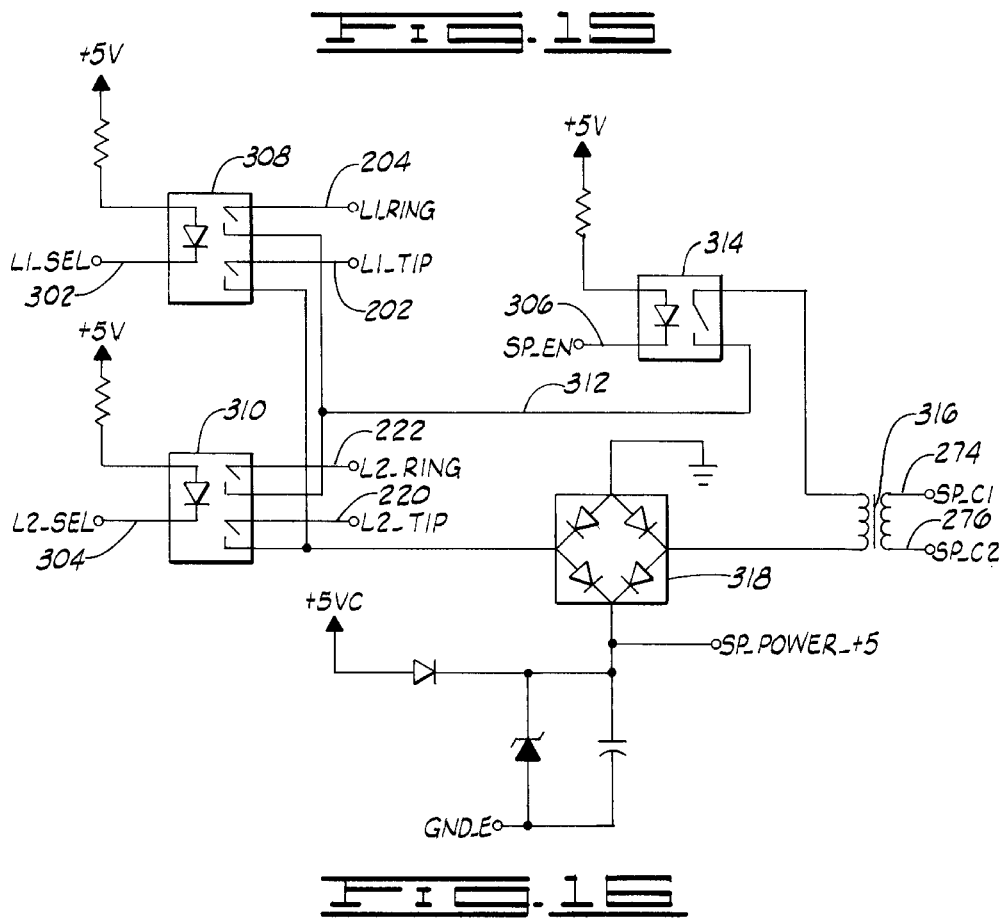
FIG. 16 shows schematically a portion of the speaker phone circuits utilized in the present invention.

The circuit of FIG. 16 controls the application of power to the speaker phone circuits as leads 302, 304 and 306 are energized by L1 SEL, L2 SEL and SP EN energization from the FPGA 190A (FIG. 7) from respective gate ports I/O-A2, I/O-A15, and I/O 37. L1 RING and L1 TIP from leads 204 and 202 on FIG. 9, are applied to a telephone switch 306 to place L1 onto the speaker phone circuit. Alternatively, L2 may be selected via input 304 to latch speaker phone switch 310 and, in either event, signal on lead 312 causes switch 314 to latch in response to input of SP EN on terminal 306. Switch 314 functions as a hook switch for the speaker phone to provide indication through a transformer 316 and bridge circuit 318 to produce SP-C1 and SP-C2 outputs via leads 274 and 276 back to FIG. 14. The diode bridge 318 allows power supply board connection to power the speaker phone.

FIG. 17 is the system data acquisition circuitry which consists of an eight channel analog to digital converter, Maxim Type MAX180. The analog to digital converter 320 receives analog input (AIN) on lead 322 of the LCD light level sensor 324, the ambient temperature on lead 326 from thermistor 328, the charge level of batteries on leads 330 and 332 and the microphone audio output on lead 334 from microphone 336. The various data are converted to eight bit binary digital data on leads D0–D7 (A2D-D0 through A2D-D7) which are then conducted to designated gate ports on FPGA 190A. The remainder of the A2D digital outputs from converter 320 are then applied to ports on FPGA 190B. In addition to the sensed analog inputs AIN0–AIN4, the circuit 320 also receives an external analog input at AIN5 as well as L2TR and L2TR (AIN6 and AIN7) from FIG. 9.

FIG. 18 is a digital to analog converter 340 which receives digital signals on the left side from the FPGA arrays 190B and 190C. Thus, the D2A control outputs are connected from selected ports of FPGA 190B while the binary digital signals D2A 00 through D2A 07 are derived from ports on FPGA 190C. Analog outputs consist of lead 285 (FIG. 15) which conducts the D2A SPKR signal and the B output lead 272 which conducts D2A SP speaker phone output as utilized in FIG. 14.

FIG. 19 illustrates yet another digital to analog converter 342, Maxim Type MAX506, which receives binary digital output D0–D7 from a digital data bus 344 from FPGA 190A, ports I/O DIN–I/O D7. These digital inputs are under control of analog control signals A01 and A00 from FPGA 190C (FIG. 7) and write input D2A2_WR executes to provide analog outputs 344 conducting CTRLV CONTRAST to FIG. 13, and leads 346 and 348 conducting the caller number delivery V1 and V2 data to the caller number delivery modem 238 in FIG. 10.

FIG. 20 illustrates the power supply and energy management unit of the present invention. A Maxim Type MAX699 solid state device 350 receives input of −DACK1 on a lead 352 which triggers device 350 to produce RST output on lead 354 and a POWER GOOD indication on output lead 356. Amplifiers 358 and 360 are controlled by −IO WRITE input on lead 362 or −IO READ on lead 366 to produce outputs on the common lead 368 for input to the DS port of a solid state device 370. Solid state device 370 is a Chips and Technologies Type DQ2001 that functions as an energy management unit.

Battery input 372 from a rechargeable battery pack (if used) is applied through the circuit to the output lead 374 which is also tied back to the input port SR of device 370. The normal battery power, a rechargeable nickel-cadmium 12-volt pack having capacity of 1200 milliamperes, is connected for input at lead 376 and applied to a digital switch 378 as well as the SB port of device 370. The FET device 378 switches on and off to control charging of the battery pack. An FET 380 acting as a digital switch also functions in the battery charging process. A sensed temperature indication is input on lead 382 to the TS/VPP port of device 370 and the PWRON indication is input on lead 384 to the PS port.

The leads 386 are address and data signal inputs from the microprocessor 50 (FIG. 3) and the VBACK1 input relates to a backup battery that is not presently in use. The ports CPC, CPD, CC and CD of device 370 contribute to the battery charging operation through the FET switches 378 and 380.

The plurality of ports PO1 through PO6 relate to the various voltage supplies that are distributed throughout the circuitry in such manner as to save power wherever possible. It is extremely important to use a given segment of the power output for only specific purposes and for limited lengths of time in order to best economize power.

The present data terminal represents a next generation of the original DataStar™ telephone desk set as developed by the present assignee. The present data terminal is fully compatible with all existing applications and it meets exacting criteria in that data terminal 10 is based upon a 16-bit compatible processor running at 14 megahertz and is fully compatible with MS-DOS 5.0, thus allowing for development of custom application programs on a common platform. The data terminal display consists of a 320 X200 LCD backlit display of the transflective type, and the circuitry includes automatic light and temperature sensing circuitry in order to eliminate the need for most user adjustments while also enabling a great savings in precious battery power.

The terminal normally includes 1024 kilobytes of standard random access memory; however, this memory may be expanded to a total of 4 megabytes. The device is fully compatible with the 7970A printer, and upgrades and enhancements to the base product may be made readily by the user by dial-up connection to obtain software data. The data terminal is fully weatherproof and designed to operate in the most harsh environmental conditions that might be encountered in the field. A hermetically sealed housing or container protects the electronics against any of driving rain or liquid spills or submersion. The modem capabilities of data terminal 10 are greatly enhanced over prior types of similar equipment. The Z-note form factor allows for field installable modems with speeds up to 14,400 baud, employing MAP 2-5 and V.42 bis standards. The inclusion of Personal Computer Memory Card International Association interface allows expansion to a wide range of new RAM card technologies.

The present data terminal includes an expanded number of telephone/test set functions. The device has caller number delivery (CND) and supports the caller I.D. data interface specified in certain of the Bellcore documents, and a custom application program is available from the assignee to test this class feature. The system is capable of precision tone generation and subscriber line voltage measurements may be performed to within 15 millivolts accuracy. The terminal is equipped with an amplified loud speaker circuit that provides a high-impedance monitor for subscriber lines, this feature is enabled directly from the keyboard. Both telephone lines of the terminal employ software switchable circuits that allow placing a caller on hold or bridging circuits to conference capability and the system is able to generate and decode DTMF signalling. "Hands-free" amplified speaker telephone is provided with the data terminal as it automatically selects and connects to a line with available dial tone.

Changes may be made in the combination and arrangement of elements as heretofore set forth in the specification and shown in the drawings; it being understood that changes may be made in the embodiments disclosed without departing from the spirit and scope of the invention as defined in the following claims.

EXHIBIT 1

The following is the program listing for the Xilinx Type XC 3020 FPGA as referred to on page 12 of the specification.

\_OMMUNICATIONS MFG. COMPANY
XILINX Configuration data

; LCA Design=ds2pld1 Part=3020PC68 -- Blocks=125 Nets=80.
; Program=APR Version=3.20 Date=Sat Feb 27 16:14:46 1993.
Design 3020PC68
Speed -50
Programorder On
Addnet ackin P33.I ED.D TBUF.GD.2.I
Colornet 3 ackin
Netdelay ackin ED.D 9.9 TBUF.GD.2.I 4.7
NProgram GD.20.1.2 GD.20.1.13 HD.20.1.1 HD.20.1.14 FD.20.1.8 FD.20.1.12 row.F.local.4:ED.D
col.D.local.1:PAD42.I col.D.local.2:TBUF.GD.2.I
Addnet alt_ledin P32.I TBUF.DC.1.I
Colornet 3 alt_ledin
Netdelay alt_ledin TBUF.DC.1.I 16.4
NProgram EC.20.1.2 EC.20.1.7 FD.20.1.2 FD.20.1.11 GD.20.1.3 GD.20.1.10 DC.20.1.3 DC.20.1.12
HD.20.1.4 HD.20.1.10 ED.20.1.12 ED.20.1.17 col.D.local.5:PAD43.I col.C.local.4:TBUF.DC.1.I
col.C.local.3:row.E.local.0 col.D.local.3:row.F.local.0
Addnet autofdin P67.I TBUF.CE.2.I
Colornet 3 autofdin
Netdelay autofdin TBUF.CE.2.I 7.4
NProgram CE.20.1.0 CE.20.1.13 BE.20.1.1 BE.20.1.14 AE.20.1.5 AE.20.1.13 row.A.local.1:PAD10.I
col.E.local.2:TBUF.CE.2.I
Addnet a0 P8.I BH.A BG.A BB.A BE.A BF.A BC.A BD.A
Colornet 3 a0
Netdelay a0 BH.A 10.5 BG.A 10.5 BB.A 10.5 BE.A 10.5 BF.A 10.5 BC.A 10.5 BD.A 10.5
NProgram BB.20.1.1 BB.20.1.13 row.B.long.2:BB.A row.B.long.2:BC.A row.B.long.2:BD.A
row.B.long.2:BE.A row.B.long.2:BF.A row.B.long.2:BG.A row.B.long.2:BH.A col.B.local.2:PAD2.I
col.B.local.2:row.B.long.2
Addnet a1 P7.I BH.E BG.C BB.C BE.C BF.C BC.C BD.C
Colornet 3 a1
Netdelay a1 BH.E 31.6 BG.C 30.6 BB.C 11.9 BE.C 25.1 BF.C 31.7 BC.C 11.2 BD.C 21.1
NProgram CC.20.1.4 CC.20.1.9 BC.20.1.4 BC.20.1.10 AC.20.1.5 AC.20.1.10 CC.20.1.4 CC.20.1.15
CH.20.1.2 CH.20.1.17 AC.20.1.5 AC.20.1.18 CF.20.1.8 CF.20.1.15 CD.20.1.9 CD.20.1.15 CE.20.1.9
CE.20.1.15 CG.20.1.7 CG.20.1.16 CG.20.1.7 CG.20.1.17 col.C.local.5:BC.C col.H.local.3:BH.E
row.C.local.3:BF.C row.C.local.3:BG.C row.C.local.5:BB.C row.C.local.5:BD.C row.C.local.5:BE.C
row.A.local.2:PAD3.I col.C.local.8:row.C.local.5
Addnet bklt_enin P16.I TBUF.DB.2.I
Colornet 3 bklt_enin
Netdelay bklt_enin TBUF.DB.2.I 3.9
NProgram DB.20.1.2 DB.20.1.13 DB.20.1.2 DB.20.1.17 row.D.local.3:PAD58.I
col.B.local.2:TBUF.DB.2.I
Addnet blue_ledin P30.I TBUF.FC.1.I
Colornet 3 blue_ledin
Netdelay blue_ledin TBUF.FC.1.I 6.7
NProgram FC.20.1.3 FC.20.1.10 GC.20.   ;C.20.1.10 HC.20.1.4 HC.20.1.10 col.C.local.5:PAD45.I
col.C.local.4:TBUF.FC.1.I
Addnet busyin P36.I TBUF.HD.1.I
Colornet 3 busyin
Netdelay busyin TBUF.HD.1.I 4.7
NProgram HD.20.1.3 HD.20.1.8 HE.20.1.11 HE.20.1.16 col.E.local.4:PAD40.I
col.D.local.4:TBUF.HD.1.I
Addnet caps_ledin P37.I TBUF.DF.2.I
Colornet 3 caps_ledin
Netdelay caps_ledin TBUF.DF.2.I 10.4

COMMUNICATIONS MFG. COMPANY
XILINX Configuration data

NProgram HF.20.1.0 HF.20.1.13 FF.20.1.0 FF.20.1.14 GF.20.1.0 GF.20.1.14 EF.20.1.1 EF.20.1.14
col.F.local.2:PAD39.I col.F.local.2:TBUF.DF.2.I col.F.local.1:row.F.local.0
Addnet cnd_enin P19.I TBUF.DB.1.I
Colornet 3 cnd_enin
Netdelay cnd_enin TBUF.DB.1.I 4.3
NProgram DB.20.1.3 DB.20.1.10 EB.20.1.4 EB.20.1.15 row.E.local.5:PAD56.I
col.B.local.4:TBUF.DB.1.I
Addnet ctrl_ledin P28.I TBUF.CC.2.I
Colornet 3 ctrl_ledin
Netdelay ctrl_ledin TBUF.CC.2.I 15.2
NProgram EC.20.1.0 EC.20.1.14 FC.20.1.0 FC.20.1.14 GC.20.1.0 GC.20.1.14 DC.20.1.1 DC.20.1.14
HB.20.1.5 HB.20.1.13 HC.20.1.0 HC.20.1.19 col.B.local.2:PAD47.I col.C.local.2:TBUF.CC.2.I
col.C.local.1:row.F.local.0
Addnet ctrl1_rd BG.X TBUF.HH.1.T TBUF.GG.2.T TBUF.FG.2.T TBUF.FH.1.T TBUF.DH.2.T
TBUF.DG.1.T TBUF.CG.2.T TBUF.BG.1.T
Colornet 3 ctrl1_rd
Netdelay ctrl1_rd TBUF.HH.1.T 13.1 TBUF.GG.2.T 11.8 TBUF.FG.2.T 11.8 TBUF.FH.1.T 13.1
TBUF.DH.2.T 13.1 TBUF.DG.1.T 11.8 TBUF.CG.2.T 11.8 TBUF.BG.1.T 11.8
NProgram DH.20.1.1 DH.20.1.6 CH.20.1.0 CH.20.1.13 BH.20.1.14 BH.20.1.18 col.H.local.1:BG.X
col.G.long.1:TBUF.BG.1.T col.G.long.1:TBUF.DG.1.T col.G.long.1:TBUF.CG.2.T
col.G.long.1:TBUF.FG.2.T col.H.long.1:TBUF.DH.2.T col.H.long.1:TBUF.FH.1.T
col.G.long.1:TBUF.GG.2.T col.H.long.1:TBUF.HH.1.T col.G.long.1:row.B.local.2
col.H.long.1:row.D.local.2
Addnet ctrl1_wr BG.Y P42.OK P40.OK P39.OK P41.OK P43.OK P64.OK P65.OK P63.OK
Colornet 3 ctrl1_wr
Netdelay ctrl1_wr P42.OK 22.0 P40.OK 22.0 P39.OK 22.0 P41.OK 22.0 P43.OK 22.0 P64.OK 17.4
P65.OK 17.4 P63.OK 17.4
NProgram BH.20.1.3 BH.20.1.10 AH.20.1.8 AH.20.1.11 BH.20.1.9 BH.20.1.10 BI.20.1.4 BI.20.1.15
col.H.local.5:BG.Y row.I.local.6:PAD33.OK row.I.local.6:PAD34.OK row.I.local.6:PAD35.OK
row.I.local.6:PAD36.OK row.I.local.6:PAD37.OK row.A.local.11:PAD12.OK row.A.local.11:PAD13.OK
row.A.local.11:PAD14.OK col.H.long.3:row.A.local.4 col.H.long.3:row.I.local.2 col.I.local.2:row.I.local.2
col.I.local.5:row.A.local.7 col.H.local.8:row.B.local.5 col.I.local.2:row.I.local.8
col.I.local.7:row.A.local.11
NProgram col.I.local.10:row.I.local.6
Addnet ctrl2_rd BB.X TBUF.HB.1.T TBUF.GB.2.T TBUF.FB.2.T TBUF.FB.1.T TBUF.DB.2.T
TBUF.DB.1.T TBUF.CB.2.T TBUF.BB.1.T
Colornet 3 ctrl2_rd
Netdelay ctrl2_rd TBUF.HB.1.T 9.8 TBUF.GB.2.T 9.8 TBUF.FB.2.T 9.8 TBUF.FB.1.T 9.8
TBUF.DB.2.T 9.8 TBUF.DB.1.T 9.8 TBUF.CB.2.T 9.8 TBUF.BB.1.T 9.8
NProgram BC.20.1.14 BC.20.1.18 col.C.local.1:BB.X col.B.long.1:TBUF.BB.1.T
col.B.long.1:TBUF.DB.1.T col.B.long.1:TBUF.CB.2.T col.B.long.1:TBUF.DB.2.T
col.B.long.1:TBUF.FB.1.T col.B.long.1:TBUF.FB.2.T col.B.long.1:TBUF.HB.1.T
col.B.long.1:TBUF.GB.2.T col.B.long.1:row.B.local.2
Addnet ctrl2_wr BB.Y P23.OK P22.OK P16.OK P19.OK P11.OK P13.OK GA.K
Colornet 3 ctrl2_wr
Netdelay ctrl2_wr P23.OK 18.5 P22.OK 18.5 P16.OK 18.5 P19.OK 18.5 P11.OK 18.5 P13.OK 18.5
GA.K 19.9
NProgram BA.20.1.4 BA.20.1.9 GA.20.1.6 GA.20.1.13 BB.20.1.8 BB.20.1.15 BC.20.1.8 BC.20.1.16
BB.20.1.7 BB.20.1.18 BC.20.1.8 BC.20.1.17 col.A.local.2:GA.K row.B.local.4:BB.Y
col.A.local.12:PAD50.OK col.A.local.12:PAD52.OK col.A.local.12:PAD62.OK
col.A.local.12:PAD64.OK col.A.local.12:PAD56.OK col.A.local.12:PAD58.OK
col.A.long.3:row.B.local.2 col.A.long.3:row.G.local.2 col.A.local.5:row.A.local.7
col.A.local.12:row.A.local.11
Addnet dtmf_enin P42.I TBUF.HH.1.I COMMUNICATIONS MFG. COMPANY
XILINX Configuration data Colornet 3 dtmf_enin
Netdelay dtmf_enin TBUF.HH.1.I 2.6
NProgram HH.20.1.3 HH.20.1.11 col.H.local.4:PAD34.I col.H.local.4:TBUF.HH.1.I
Addnet d0in P58.I P63.O P13.O P27.O P12.O P68.O
Colornet 3 d0in
Netdelay d0in P63.O 25.8 P13.O 33.8 P27.O 22.6 P12.O 33.0 P68.O 25.8
NProgram BA.20.1.1 BA.20.1.14 BH.20.1.6 BH.20.1.17 BG.20.1.7 BG.20.1.18 AB.20.1.14 AB.20.1.18
row.A.long.1:PAD9.O row.A.long.1:PAD14.O row.I.long.3:PAD48.O col.A.local.1:PAD62.O
col.A.local.2:PAD63.O row.B.local.2:PAD18.I col.F.long.1:row.A.long.1 col.F.long.1:row.I.long.3
col.B.local.1:row.A.long.1 col.F.long.1:row.B.local.2 col.E.local.6:row.A.long.1 col.E.local.6:row.I.long.3
col.A.local.2:row.A.local.2 col.G.local.8:row.B.local.3
Addnet d0out TBUF.BI.1.O TBUF.BG.1.O TBUF.BB.1.O TBUF.BC.1.O TBUF.BA.1.O TBUF.BD.1.O
TBUF.BE.1.O P58.O
Colornet 3 d0out
Netdelay d0out P58.O 4.6
NProgram row.B.long.1:PAD18.O row.B.long.1:TBUF.BA.1.O row.B.long.1:TBUF.BB.1.O
row.B.long.1:TBUF.BC.1.O row.B.long.1:TBUF.BD.1.O row.B.long.1:TBUF.BE.1.O
row.B.long.1:TBUF.BG.1.O row.B.long.1:TBUF.BI.1.O
Addnet d1in P56.I P65.O P11.O P28.O P15.O P67.O
Colornet 3 d1in
Netdelay d1in P65.O 22.5 P11.O 34.2 P28.O 45.2 P15.O 34.2 P67.O 18.4
NProgram CF.20.1.1 CF.20.1.5 EB.20.1.0 EB.20.1.13 FB.20.1.1 FB.20.1.12 DB.20.1.0 DB.20.1.14
GB.20.1.2 GB.20.1.12 HB.20.1.2 HB.20.1.12 BF.20.1.1 BF.20.1.13 AF.20.1.5 AF.20.1.13 CB.20.1.6
CB.20.1.14 CE.20.1.7 CE.20.1.16 CF.20.1.6 CF.20.1.17 CB.20.1.6 CB.20.1.19 CC.20.1.7 CC.20.1.18
CD.20.1.8 CD.20.1.17 CG.20.1.6 CG.20.1.18 CH.20.1.6 CH.20.1.18 CG.20.1.6 CG.20.1.19
col.A.long.1:PAD64.O col.A.long.1:PAD59.O row.C.local.2:PAD20.I col.F.local.2:PAD10.O
row.A.local.1:PAD12.O col.B.local.3:PAD47.O
NProgram col.A.long.1:row.C.local.1 col.B.local.1:row.E.local.0 col.B.local.3:row.G.local.0
col.F.local.8:row.A.local.1 col.E.local.8:row.C.local.3
Addnet d1out TBUF.CI.2.O TBUF.CG.2.O TBUF.CB.2.O TBUF.CC.2.O TBUF.CA.2.O TBUF.CD.2.O
TBUF.CE.2.O P56.O
Colornet 3 d1out
Netdelay d1out P56.O 14.0
NProgram CH.20.1.1 CH.20.1.12 CH.20.1.1 CH.20.1.14 CH.20.1.8 CH.20.1.12 row.C.local.4:PAD20.O
row.C.long.2:TBUF.CA.2.O row.C.long.2:TBUF.CB.2.O row.C.long.2:TBUF.CC.2.O
row.C.long.2:TBUF.CD.2.O row.C.long.2:TBUF.CE.2.O row.C.long.2:TBUF.CG.2.O
row.C.long.2:TBUF.CI.2.O col.H.local.1:row.C.long.2
Addnet d2in P55.I P64.O P19.O P32.O P14.O P2.O
Colornet 3 d2in
Netdelay d2in P64.O 17.1 P19.O 16.4 P32.O 29.4 P14.O 26.1 P2.O 23.4
NProgram CG.20.1.3 CG.20.1.8 BG.20.1.4 BG.20.1.11 EB.20.1.2 EB.20.1.17 DH.20.1.8 DH.20.1.11
AE.20.1.9 AE.20.1.15 AF.20.1.9 AF.20.1.15 IB.20.1.8 IB.20.1.17 IC.20.1.9 IC.20.1.16 CH.20.1.9
CH.20.1.16 AG.20.1.10 AG.20.1.15 CI.20.1.10 CI.20.1.15 row.A.local.5:PAD8.O col.I.local.5:PAD22.I
row.D.local.4:PAD22.I col.G.local.5:PAD13.O row.C.local.3:PAD60.O row.E.local.3:PAD56.O
row.I.local.5:PAD43.O col.B.local.3:row.E.long.1 col.A.long.4:row.C.local.3 col.A.long.4:row.E.local.3
col.H.local.4:row.E.long.1
NProgram col.A.long.4:row.I.local.3 col.E.local.8:row.A.local.5
Addnet d2out TBUF.DI.1.O TBUF.DG.1.O TBUF.DB.1.O TBUF.DC.1.O TBUF.DA.1.O TBUF.DD.1.O
TBUF.DE.1.O P55.O
Colornet 3 d2out
Netdelay d2out P55.O 4.6
NProgram row.D.long.1:PAD22.O row.D.long.1:TBUF.DA.1.O row.D.long.1:TBUF.DB.1.O
row.D.long.1:TBUF.DC.1.O row.D.long.1:TBUF.DD.1.O row.D.long.1:TBUF.DE.1.O
row.D.long.1:TBUF.DG.1.O row.D.long.1:TBUF.DI.1.O page 3 of 50

COMMUNICATIONS MFG. COMPANY
XILINX Configuration data

Addnet d3in P53.I P43.O P16.O P37.O P17.O P6.O
Colornet 3 d3in
Netdelay d3in P43.O 36.0 P16.O 33.9 P37.O 28.0 P17.O 32.8 P6.O 41.8
NProgram EA.20.1.3 EA.20.1.8 EC.20.1.3 EC.20.1.8 HG.20.1.2 HG.20.1.7 IH.20.1.2 IH.20.1.7
DC.20.1.2 DC.20.1.11 BC.20.1.2 BC.20.1.12 CC.20.1.2 CC.20.1.12 FG.20.1.2 FG.20.1.12 GG.20.1.2
GG.20.1.12 HG.20.1.2 HG.20.1.16 EG.20.1.8 EG.20.1.12 HF.20.1.8 HF.20.1.12 ED.20.1.7 ED.20.1.16
EB.20.1.8 EB.20.1.16 EE.20.1.8 EE.20.1.15 ED.20.1.9 ED.20.1.15 EG.20.1.8 EG.20.1.15 EC.20.1.9
EC.20.1.16 EE.20.1.8 EE.20.1.17 EH.20.1.8 EH.20.1.16 EF.20.1.9 EF.20.1.16 HH.20.1.12 HH.20.1.17
col.C.local.3:PAD4.O row.E.local.4:PAD24.I
NProgram col.A.local.4:PAD58.O col.F.local.3:PAD39.O row.I.local.3:PAD33.O row.E.local.4:PAD57.O
col.C.local.3:row.B.local.0 col.G.local.3:row.F.local.0 col.D.local.8:row.E.local.3
col.G.local.8:row.H.local.3 col.H.local.8:row.I.local.3
Addnet d3out TBUF.DI.2.O TBUF.DH.2.O TBUF.DB.2.O TBUF.DF.2.O TBUF.DA.2.O TBUF.DD.2.O
TBUF.DE.2.O P53.O
Colornet 3 d3out
Netdelay d3out P53.O 9.7
NProgram EI.20.1.0 EI.20.1.18 row.E.local.2:PAD24.O row.D.long.2:TBUF.DA.2.O
row.D.long.2:TBUF.DB.2.O row.D.long.2:TBUF.DD.2.O row.D.long.2:TBUF.DE.2.O
row.D.long.2:TBUF.DF.2.O row.D.long.2:TBUF.DH.2.O row.D.long.2:TBUF.DI.2.O
col.I.local.1:row.D.long.2
Addnet d4in P51.I P41.O P22.O P30.O P21.O ED.DI
Colornet 3 d4in
Netdelay d4in P41.O 17.3 P22.O 26.6 P30.O 29.1 P21.O 26.5 ED.DI 16.0
NProgram FA.20.1.0 FA.20.1.9 GA.20.1.3 GA.20.1.3 GA.20.1.8 IG.20.1.4 IG.20.1.5
FA.20.1.4 FA.20.1.9 FA.20.1.4 FA.20.1.11 GG.20.1.4 GG.20.1.10 HG.20.1.4 HG.20.1.10 FG.20.1.9
FG.20.1.10 ID.20.1.6 ID.20.1.17 IE.20.1.5 IE.20.1.18 IC.20.1.7 IC.20.1.17 FH.20.1.8 FH.20.1.15
IG.20.1.4 IG.20.1.19 IF.20.1.5 IF.20.1.19 col.D.local.1:ED.DI col.I.local.2:PAD26.I
row.F.local.4:PAD26.I row.I.local.1:PAD35.O row.G.local.3:PAD52.O row.G.local.4:PAD53.O
row.I.local.3:PAD45.O col.A.local.1:row.E.long.2
NProgram col.D.local.1:row.E.long.2 col.I.local.2:row.E.long.2 col.F.local.8:row.I.local.1
Addnet d4out TBUF.FI.1.O TBUF.FH.1.O TBUF.FB.1.O TBUF.FC.1.O TBUF.FA.1.O TBUF.FD.1.O
TBUF.FE.1.O P51.O
Colornet 3 d4out
Netdelay d4out P51.O 4.6
NProgram row.F.long.1:PAD26.O row.F.long.1:TBUF.FA.1.O row.F.long.1:TBUF.FB.1.O
row.F.long.1:TBUF.FC.1.O row.F.long.1:TBUF.FD.1.O row.F.long.1:TBUF.FE.1.O
row.F.long.1:TBUF.FH.1.O row.F.long.1:TBUF.FI.1.O
Addnet d5in P49.I P39.O P23.O P31.O P20.O
Colornet 3 d5in
Netdelay d5in P39.O 14.7 P23.O 28.1 P31.O 24.1 P20.O 25.5
NProgram GD.20.1.0 GD.20.1.5 HG.20.1.3 HG.20.1.12 GG.20.1.8 GG.20.1.11 IG.20.1.2 IG.20.1.17
FB.20.1.5 FB.20.1.19 FC.20.1.5 FC.20.1.19 IE.20.1.7 IE.20.1.16 ID.20.1.8 ID.20.1.16 IF.20.1.7
IF.20.1.17 GH.20.1.8 GH.20.1.16 GE.20.1.6 GE.20.1.19 GF.20.1.7 GF.20.1.18 GG.20.1.8 GG.20.1.17
FD.20.1.14 FD.20.1.19 col.A.long.1:PAD50.O col.G.local.3:PAD37.O row.F.local.1:PAD54.O
row.G.local.4:PAD28.I row.I.local.4:PAD44.O col.A.long.1:row.F.local.1 col.D.local.1:row.G.local.0
col.F.local.8:row.G.local.3
NProgram col.E.local.8:row.I.local.3 col.G.local.3:row.I.local.11
Addnet d5out TBUF.FI.2.O TBUF.FG.2.O TBUF.FB.2.O TBUF.FC.2.O TBUF.FA.2.O TBUF.FD.2.O
TBUF.FE.2.O P49.O
Colornet 3 d5out
Netdelay d5out P49.O 9.7
NProgram GI.20.1.0 GI.20.1.18 row.G.local.2:PAD28.O row.F.long.2:TBUF.FA.2.O
row.F.long.2:TBUF.FB.2.O row.F.long.2:TBUF.FC.2.O row.F.long.2:TBUF.FD.2.O COMMUNICATIONS MFG. COMPANY
XILINX Configuration data row.F.long.2:TBUF.FE.2.O row.F.long.2:TBUF.FG.2.O row.F.long.2:TBUF.FI.2.O
col.I.local.1:row.F.long.2
Addnet d6_ctrl2_out GA.Y TBUF.GB.2.I
Colornet 3 d6_ctrl2_out
Netdelay d6_ctrl2_out TBUF.GB.2.I 1.0
NProgram col.B.local.2:GA.Y col.B.local.2:TBUF.GB.2.I
Addnet d6in P48.I P40.O P38.O P47.O GA.D
Colornet 3 d6in
Netdelay d6in P40.O 10.2 P38.O 11.1 P47.O 7.8 GA.D 21.1
NProgram HG.20.1.8 HG.20.1.11 IG.20.1.3 IG.20.1.18 HH.20.1.8 HH.20.1.16 HB.20.1.11 HB.20.1.16
HI.20.1.11 HI.20.1.16 row.H.local.4:GA.D row.H.local.4:PAD30.I col.I.local.4:PAD31.O
col.G.local.4:PAD36.O row.I.local.2:PAD38.O col.B.local.4:row.I.long.2 col.G.local.4:row.I.long.2
Addnet d6out TBUF.GI.2.O TBUF.GG.2.O TBUF.GB.2.O TBUF.GF.2.O TBUF.GH.2.O TBUF.GD.2.O
TBUF.GE.2.O P48.O
Colornet 3 d6out
Netdelay d6out P48.O 9.7
NProgram HI.20.1.0 HI.20.1.18 row.H.local.2:PAD30.O row.G.long.2:TBUF.GB.2.O
row.G.long.2:TBUF.GD.2.O row.G.long.2:TBUF.GE.2.O row.G.long.2:TBUF.GF.2.O
row.G.long.2:TBUF.GG.2.O row.G.long.2:TBUF.GH.2.O row.G.long.2:TBUF.GI.2.O
col.I.local.1:row.G.long.2
Addnet d7_ctrl2_out GA.X TBUF.HB.1.I
Colornet 3 d7_ctrl2_out
Netdelay d7_ctrl2_out TBUF.HB.1.I 1.0
NProgram col.B.local.4:GA.X col.B.local.4:TBUF.HB.1.I
Addnet d7in P46.I P42.O P29.O P24.O GA.C
Colornet 3 d7in
Netdelay d7in P42.O 10.7 P29.O 28.6 P24.O 30.0 GA.C 25.4
NProgram HA.20.1.7 HA.20.1.12 HB.20.1.9 HB.20.1.10 HH.20.1.9 HH.20.1.10 HC.20.1.9 HC.20.1.15
HD.20.1.9 HD.20.1.15 HB.20.1.8 HB.20.1.17 HE.20.1.9 HE.20.1.15 HC.20.1.9 HC.20.1.16 HF.20.1.9
HF.20.1.15 HG.20.1.9 HG.20.1.15 HH.20.1.9 HH.20.1.15 HI.20.1.10 HI.20.1.15 row.H.local.3:GA.C
col.I.local.5:PAD32.I col.A.local.3:PAD49.O col.B.local.5:PAD46.O col.H.local.5:PAD34.O
col.A.local.7:row.H.local.3 col.B.local.8:row.H.local.5 col.E.local.8:row.H.local.5
col.H.local.8:row.H.local.5
Addnet d7out TBUF.HI.1.O TBUF.HH.1.O TBUF.HB.1.O TBUF.HC.1.O TBUF.HA.1.O TBUF.HD.1.O
TBUF.HE.1.O P46.O
Colornet 3 d7out
Netdelay d7out P46.O 17.1
NProgram HF.20.1.2 HF.20.1.11 row.I.long.1:PAD32.O row.H.long.1:TBUF.HA.1.O
row.H.long.1:TBUF.HB.1.O row.H.long.1:TBUF.HC.1.O row.H.long.1:TBUF.HD.1.O
row.H.long.1:TBUF.HE.1.O row.H.long.1:TBUF.HH.1.O row.H.long.1:TBUF.HI.1.O
col.F.local.3:row.H.long.1 col.F.local.4:row.I.long.1 col.F.local.3:row.H.local.0
Addnet errorin P4.I TBUF.DD.2.I
Colornet 3 errorin
Netdelay errorin TBUF.DD.2.I 8.5
NProgram DD.20.1.0 DD.20.1.13 CD.20.1.0 CD.20.1.14 BD.20.1.1 BD.20.1.14 col.D.local.2:PAD6.I
col.D.local.2:TBUF.DD.2.I col.D.local.1:row.D.local.0
Addnet initin P2.I TBUF.DE.1.I
Colornet 3 initin
Netdelay initin TBUF.DE.1.I 4.3
NProgram BE.20.1.4 BE.20.1.10 CE.20.1.4 CE.20.1.11 col.E.local.5:PAD8.I col.E.local.4:TBUF.DE.1.I
Addnet io_rd P9.I BH.D BG.D BB.D BE.D BF.D BC.D BD.D AH.C
Flagnet Critical io_rd
Colornet 3 io_rd
Netdelay io_rd BH.D 14.1 BG.D 14.1 BB.D 14.1 BE.D 14.1 BF.D 14.1 BC.D 14.1 BD.D 14.1 AH.C 21.4

COMMUNICATIONS MFG. COMPANY
XILINX Configuration data

NProgram BB.20.1.4 BB.20.1.11 CI.20.1.2 CI.20.1.17 AB.20.1.10 AB.20.1.15 col.H.long.2:AH.C
row.C.long.1:BB.D row.C.long.1:BC.D row.C.long.1:BD.D row.C.long.1:BE.D row.C.long.1:BF.D
row.C.long.1:BG.D row.C.long.1:BH.D row.A.local.5:PAD1.I col.B.local.4:row.C.long.1
col.I.local.3:row.C.long.1 col.H.long.2:row.C.local.3
Addnet io_wr P61.I BG.E BB.E BE.E BF.E BC.E BD.E
Flagnet Critical io_wr
Colornet 3 io_wr
Netdelay io_wr BG.E 8.8 BB.E 25.5 BE.E 17.5 BF.E 16.0 BC.E 24.6 BD.E 18.2
NProgram AC.20.1.7 AC.20.1.17 AD.20.1.7 AD.20.1.17 AE.20.1.7 AE.20.1.17 AF.20.1.7 AF.20.1.17
AG.20.1.7 AG.20.1.17 AH.20.1.7 AH.20.1.17 col.B.long.2:BB.E col.C.long.2:BC.E col.D.long.2:BD.E
col.E.long.2:BE.E col.F.long.2:BF.E col.G.long.2:BG.E row.A.local.3:PAD16.I
col.B.long.2:row.A.local.3 col.C.long.2:row.A.local.3 col.D.long.2:row.A.local.3
col.E.long.2:row.A.local.3 col.F.long.2:row.A.local.3 col.G.long.2:row.A.local.3
col.D.local.8:row.A.local.3 col.G.local.8:row.A.local.3
Addnet irqenin ED.X TBUF.FE.1.I
Colornet 3 irqenin
Netdelay irqenin TBUF.FE.1.I 1.0
NProgram col.E.local.4:ED.X col.E.local.4:TBUF.FE.1.I
Addnet lcd_enin P11.I TBUF.CB.2.I
Colornet 3 lcd_enin
Netdelay lcd_enin TBUF.CB.2.I 7.1
NProgram BA.20.1.0 BA.20.1.5 CB.20.1.0 CB.20.1.13 BB.20.1.14 BB.20.1.19 col.A.local.1:PAD64.I
col.B.local.2:TBUF.CB.2.I
Addnet led_rd BE.Y TBUF.HC.1.T TBUF.GF.2.T TBUF.FC.2.T TBUF.FC.1.T TBUF.DF.2.T
TBUF.DC.1.T TBUF.CC.2.T TBUF.BC.1.T
Colornet 3 led_rd
Netdelay led_rd TBUF.HC.1.T 21.1 TBUF.GF.2.T 18.4 TBUF.FC.2.T 21.1 TBUF.FC.1.T 21.1
TBUF.DF.2.T 13.7 TBUF.DC.1.T 21.1 TBUF.CC.2.T 21.1 TBU¡ . . .  ¹.T 21.1
NProgram CF.20.1.4 CF.20.1.9 CF.20.1.4 CF.20.1.10 DF.20.1.4 ¡ ¡ .20.1.10 EF.20.1.4 EF.20.1.10
FF.20.1.4 FF.20.1.10 GF.20.1.4 GF.20.1.10 CD.20.1.7 CD.20.1.18 CE.20.1.8 CE.20.1.17 CF.20.1.9
CF.20.1.16 col.F.local.5:BE.Y col.C.long.1:TBUF.BC.1.T col.C.long.1:TBUF.DC.1.T
col.C.long.1:TBUF.CC.2.T col.C.long.1:TBUF.FC.1.T col.C.long.1:TBUF.FC.2.T
col.C.long.1:TBUF.HC.1.T col.F.local.5:TBUF.DF.2.T col.F.local.5:TBUF.GF.2.T
col.C.long.1:row.C.local.2
Addnet led_wr BE.X P29.OK P38.OK P31.OK P30.OK P37.OK P32.OK P28.OK P27.OK
Colornet 3 led_wr
Netdelay led_wr P29.OK 29.4 P38.OK 29.4 P31.OK 29.4 P30.OK 29.4 P37.OK 29.4 P32.OK 29.4
P28.OK 29.4 P27.OK 29.4
NProgram BF.20.1.3 BF.20.1.11 IB.20.1.5 IB.20.1.19 IC.20.1.5 IC.20.1.19 ID.20.1.5 ID.20.1.19
IE.20.1.6 IE.20.1.19 AF.20.1.11 AF.20.1.16 col.F.local.4:BE.X row.I.local.7:PAD43.OK
row.I.local.7:PAD44.OK row.I.local.7:PAD45.OK row.I.local.7:PAD46.OK row.I.local.7:PAD47.OK
row.I.local.7:PAD38.OK row.I.local.7:PAD48.OK row.I.local.7:PAD39.OK col.E.long.3:row.A.local.4
col.E.long.3:row.I.local.2 col.A.local.7:row.I.local.1 col.C.local.8:row.I.local.1 col.A.local.7:row.I.local.7
Addnet line1_ledin P38.I TBUF.GF.2.I
Colornet 3 line1_ledin
Netdelay line1_ledin TBUF.GF.2.I 5.6
NProgram HF.20.1.1 HF.20.1.14 col.F.local.1:PAD38.I col.F.local.2:TBUF.GF.2.I
col.F.local.1:row.I.local.11
Addnet line1_selin P63.I TBUF.BG.1.I
Colornet 3 line1_selin
Netdelay line1_selin TBUF.BG.1.I 6.0
NProgram AG.20.1.8 AG.20.1.11 AH.20.1.9 AH.20.1.10 AH.20.1.9 AH.20.1.16 col.H.local.5:PAD14.I
col.G.local.4:TBUF.BG.1.I
Addnet line2_ledin P29.I TBUF.HC.1.I

COMMUNICATIONS MFG. COMPANY
XILINX Configuration data

Colornet 3 line2_ledin
Netdelay line2_ledin TBUF.HC.1.I 4.5
NProgram HC.20.1.3 HC.20.1.12 IC.20.1.2 IC.20.1.18 row.I.local.2:PAD46.I col.C.local.4:TBUF.HC.1.I
Addnet line2_selin P65.I TBUF.CG.2.I
Colornet 3 line2_selin
Netdelay line2_selin TBUF.CG.2.I 4.7
NProgram CG.20.1.0 CG.20.1.13 BG.20.1.1 BG.20.1.14 col.G.local.2:PAD12.I
col.G.local.2:TBUF.CG.2.I
Addnet logic0 DH.Y TBUF.HI.1.I TBUF.GI.2.I TBUF.FI.2.I TBUF.DI.2.I TBUF.DI.1.I TBUF.DD.1.I
TBUF.HE.1.I TBUF.GE.2.I TBUF.FE.2.I TBUF.CI.2.I TBUF.BI.1.I TBUF.CD.2.I TBUF.BD.1.I
Colornet 3 logic0
Netdelay logic0 TBUF.HI.1.I 14.5 TBUF.GI.2.I 15.3 TBUF.FI.2.I 13.8 TBUF.DI.2.I 8.1 TBUF.DI.1.I 9.6
TBUF.DD.1.I 26.3 TBUF.HE.1.I 32.3 TBUF.GE.2.I 30.1 TBUF.FE.2.I 29.1 TBUF.CI.2.I 10.9
TBUF.BI.1.I 12.4 TBUF.CD.2.I 26.6 TBUF.BD.1.I 32.3
NProgram DD.20.1.1 DD.20.1.5 DD.20.1.3 DD.20.1.7 BI.20.1.3 BI.20.1.10 BD.20.1.3 BD.20.1.12
CD.20.1.2 CD.20.1.13 GE.20.1.3 GE.20.1.11 GE.20.1.1 GE.20.1.13 EI.20.1.1 EI.20.1.12 FI.20.1.0
FI.20.1.13 GI.20.1.2 GI.20.1.11 DI.20.1.1 DI.20.1.13 FI.20.1.2 FI.20.1.12 CI.20.1.4 CI.20.1.11 GI.20.1.1
GI.20.1.13 DI.20.1.3 DI.20.1.12 EI.20.1.1 EI.20.1.14 FE.20.1.7 FE.20.1.11 FE.20.1.5 FE.20.1.13
FI.20.1.0 FI.20.1.19 DE.20.1.6 DE.20.1.17 DG.20.1.6 DG.20.1.17 FF.20.1.6 FF.20.1.17 FG.20.1.5
FG.20.1.18 FF.20.1.5 FF.20.1.19
NProgram DE.20.1.6 DE.20.1.19 FG.20.1.5 FG.20.1.19 DF.20.1.7 DF.20.1.18 FH.20.1.5 FH.20.1.19
DH.20.1.7 DH.20.1.18 DI.20.1.12 DI.20.1.17 col.I.local.2:DH.Y col.I.local.3:DH.Y
col.D.local.2:TBUF.CD.2.I col.D.local.4:TBUF.BD.1.I col.D.local.4:TBUF.DD.1.I
col.E.local.2:TBUF.FE.2.I col.E.local.2:TBUF.GE.2.I col.E.local.4:TBUF.HE.1.I
col.I.local.2:TBUF.CI.2.I col.I.local.2:TBUF.DI.2.I col.I.local.4:TBUF.BI.1.I col.I.local.2:TBUF.FI.2.I
col.I.local.4:TBUF.DI.1.I col.I.local.2:TBUF.GI.2.I col.I.local.4:TBUF.HI.1.I
NProgram col.D.local.3:row.C.local.0 col.G.local.8:row.F.local.1 col.F.local.8:row.D.local.3
col.E.local.8:row.F.local.3
Addnet logic1 DH.X P57.O TBUF.FI.1.I
Colornet 3 logic1
Netdelay logic1 P57.O 8.2 TBUF.FI.1.I 3.0
NProgram DI.20.1.2 DI.20.1.11 CI.20.1.3 CI.20.1.  I.20.1.4 EI.20.1.11 col.I.local.4:DH.X
col.I.local.5:DH.X col.I.local.4:PAD19.O col.I.local  TBUF.FI.1.I
Addnet lpt1_cs P66.I BF.B BC.B BD.B AH.B
Colornet 3 lpt1_cs
Netdelay lpt1_cs BF.B 6.6 BC.B 13.8 BD.B 13.3 AH.B 7.3
NProgram BF.20.1.0 BF.20.1.14 BE.20.1.0 BE.20.1.19 AE.20.1.6 AE.20.1.14 BD.20.1.5 BD.20.1.19
AG.20.1.5 AG.20.1.18 AF.20.1.14 AF.20.1.18 AH.20.1.14 AH.20.1.19 col.F.local.1:BF.B
col.H.local.1:AH.B row.B.local.1:BC.B row.B.local.1:BD.B col.F.local.1:PAD11.I row.A.local.2:PAD11.I
col.E.local.1:row.B.local.0
Addnet lpt1_int ED.Y P34.O
Colornet 3 lpt1_int
Netdelay lpt1_int P34.O 11.1
NProgram FE.20.1.2 FE.20.1.12 GE.20.1.2 GE.20.1.12 HE.20.1.2 HE.20.1.12 col.E.local.3:ED.Y
col.E.local.3:PAD41.O col.E.local.3:row.G.local.0
Addnet lpt1a_rd BF.X TBUF.HA.1.T TBUF.GH.2.T TBUF.FA.2.T TBUF.FA.1.T TBUF.DA.2.T
TBUF.DA.1.T TBUF.BA.1.T TBUF.CA.2.T
Colornet 3 lpt1a_rd
Netdelay lpt1a_rd TBUF.HA.1.T 32.6 TBUF.GH.2.T 15.9 TBUF.FA.2.T 32.6 TBUF.FA.1.T 32.6
TBUF.DA.2.T 32.6 TBUF.DA.1.T 32.6 TBUF.BA.1.T 32.6 TBUF.CA.2.T 32.6
NProgram DH.20.1.4 DH.20.1.10 EH.20.1.4 EH.20.1.10 FH.20.1.4 FH.20.1.10 GH.20.1.4 GH.20.1.10
DH.20.1.4 DH.20.1.15 DC.20.1.9 DC.20.1.15 DD.20.1.9 DD.20.1.15 DB.20.1.9 DB.20.1.16 DE.20.1.9
DE.20.1.15 DF.20.1.9 DF.20.1.15 DG.20.1.9 DG.20.1.15 CH.20.1.10 CH.20.1.15 row.C.local.5:BF.X
col.A.long.2:TBUF.BA.1.T col.A.long.2:TBUF.DA.1.T col.A.long.2:TBUF.CA.2.T COMMUNICATIONS MFG. COMPANY
XILINX Configuration data col.A.long.2:TBUF.DA.2.T col.A.long.2:TBUF.FA.1.T col.A.long.2:TBUF.FA.2.T
col.A.long.2:TBUF.HA.1.T col.H.local.5:TBUF.GH.2.T col.A.long.2:row.D.local.4
NProgram col.D.local.8:row.D.local.5 col.G.local.8:row.D.local.5
Addnet lpt1a_wr BF.Y P24.OK P47.OK P20.OK P21.OK P17.OK P14.OK P15.OK P12.OK
Colornet 3 lpt1a_wr
Netdelay lpt1a_wr P24.OK 39.9 P47.OK 29.8 P20.OK 39.9 P21.OK 39.9 P17.OK 39.9 P14.OK 39.9
P15.OK 39.9 P12.OK 39.9
NProgram EG.20.1.4 EG.20.1.9 GA.20.1.2 GA.20.1.12 HA.20.1.2 HA.20.1.13 CG.20.1.4 CG.20.1.10
DG.20.1.4 DG.20.1.10 HI.20.1.2 HI.20.1.12 FI.20.1.4 FI.20.1.11 GI.20.1.3 GI.20.1.12 EH.20.1.9
EH.20.1.15 EI.20.1.10 EI.20.1.15 col.G.local.5:BF.Y col.I.local.7:PAD31.OK col.A.local.13:PAD60.OK
col.A.local.13:PAD53.OK col.A.local.13:PAD63.OK col.A.local.13:PAD54.OK
col.A.local.13:PAD57.OK col.A.local.13:PAD49.OK col.A.local.13:PAD59.OK
col.A.local.3:row.G.long.1 col.I.local.4:row.G.long.1 col.A.local.3:row.G.local.0
NProgram col.I.local.3:row.H.local.0 col.H.local.8:row.E.local.5 col.I.local.3:row.I.local.9
col.I.local.7:row.I.local.7 col.A.local.2:row.I.local.10 col.A.local.13:row.I.local.10
Addnet lpt1b_rd BC.Y TBUF.HD.1.T TBUF.GD.2.T TBUF.FD.2.T TBUF.FD.1.T TBUF.DD.2.T
TBUF.DD.1.T TBUF.CD.2.T TBUF.BD.1.T
Colornet 3 lpt1b_rd
Netdelay lpt1b_rd TBUF.HD.1.T 12.5 TBUF.GD.2.T 12.5 TBUF.FD.2.T 12.5 TBUF.FD.1.T 12.5
TBUF.DD.2.T 12.5 TBUF.DD.1.T 12.5 TBUF.CD.2.T 12.5 TBUF.BD.1.T 12.5
NProgram BD.20.1.6 BD.20.1.17 BD.20.1.8 BD.20.1.17 row.B.local.4:BC.Y col.D.long.1:TBUF.BD.1.T
col.D.long.1:TBUF.DD.1.T col.D.long.1:TBUF.CD.2.T col.D.long.1:TBUF.DD.2.T
col.D.long.1:TBUF.FD.1.T col.D.long.1:TBUF.FD.2.T col.D.long.1:TBUF.HD.1.T
col.D.long.1:TBUF.GD.2.T col.D.long.1:row.B.local.2
Addnet lpt1c_rd BD.Y TBUF.HE.1.T TBUF.GE.2.T TBUF.FE.2.T TBUF.FE.1.T TBUF.DE.2.T
TBUF.DE.1.T TBUF.CE.2.T TBUF.BE.1.T
Colornet 3 lpt1c_rd
Netdelay lpt1c_rd TBUF.HE.1.T 10.3 TBUF.GE.2.T 10.3 TBUF.FE.2.T 10.3 TBUF.FE.1.T 10.3
TBUF.DE.2.T 10.3 TBUF.DE.1.T 10.3 TBUF.CE.2.T 10.3 TBUF.BE.1.T 10.3
NProgram BE.20.1.6 BE.20.1.13 col.E.local.2:BD.Y col.E.long.1:TBUF.BE.1.T
col.E.long.1:TBUF.DE.1.T col.E.long.1:TBUF.CE.2.T col.E.long.1:TBUF.DE.2.T
col.E.long.1:TBUF.FE.1.T col.E.long.1:TBUF.FE.2.T col.E.long.1:TBUF.HE.1.T
col.E.long.1:TBUF.GE.2.T col.E.long.1:row.B.local.2
Addnet lpt1c_wr BD.X P6.OK P2.OK P67.OK P68.OK ED.K
Colornet 3 lpt1c_wr
Netdelay lpt1c_wr P6.OK 25.6 P2.OK 25.6 P67.OK 25.6 P68.OK 25.6 ED.K 8.9
NProgram BE.20.1.2 BE.20.1.11 AE.20.1.12 AE.20.1.16 col.D.long.3:ED.K col.E.local.4:BD.X
row.A.local.10:PAD4.OK row.A.local.10:PAD8.OK row.A.local.10:PAD9.OK
row.A.local.10:PAD10.OK col.D.long.3:row.A.long.2 col.D.long.3:row.A.local.4
col.A.local.11:row.A.long.2 col.A.local.11:row.A.local.10
Addnet l1_holdin P64.I TBUF.DG.1.I
Colornet 3 l1_holdin
Netdelay l1_holdin TBUF.DG.1.I 9.2
NProgram BG.20.1.0 BG.20.1.13 CG.20.1.2 CG.20.1.11 CG.20.1.1 CG.20.1.12 CG.20.1.2 CG.20.1.12
col.G.local.1:PAD13.I col.G.local.4:TBUF.DG.1.I
Addnet l2_holdin P43.I TBUF.DH.2.I
Colornet 3 l2_holdin
Netdelay l2_holdin TBUF.DH.2.I 12.7
NProgram IH.20.1.0 IH.20.1.9 FH.20.1.0 FH.20.1.14 GH.20.1.0 GH.20.1.14 HH.20.1.0 HH.20.1.14
EH.20.1.1 EH.20.1.14 row.I.local.5:PAD33.I col.H.local.2:TBUF.DH.2.I col.H.local.1:row.H.local.0
Addnet masterread AH.Y P58.T P56.T P55.T P53.T P51.T P49.T P48.T P46.T
Colornet 3 masterread
Netdelay masterread P58.T 15.1 P56.T 15.1 P55.T 15.1 P53.T 15.1 P51.T 15.1 P49.T 15.1 P48.T 15.1
P46.T 15.1

COMMUNICATIONS MFG. COMPANY
XILINX Configuration data

NProgram CI.20.1.0 CI.20.1.14 BI.20.1.1 BI.20.1.14 DI.20.1.0 DI.20.1.19 col.I.local.2:AH.Y
col.I.long.2:PAD20.T col.I.long.2:PAD30.T col.I.long.2:PAD22.T col.I.long.2:PAD32.T
col.I.long.2:PAD24.T col.I.long.2:PAD26.T col.I.long.2:PAD18.T col.I.long.2:PAD28.T
col.I.long.2:row.D.local.1 col.I.long.2:row.E.local.6
Addnet modem_enin P23.I TBUF.FB.2.I
Colornet 3 modem_enin
Netdelay modem_enin TBUF.FB.2.I 8.4
NProgram GB.20.1.1 GB.20.1.14 HB.20.1.0 HB.20.1.18 HA.20.1.6 HA.20.1.14 col.A.local.1:PAD50.I
col.B.local.2:TBUF.FB.2.I col.B.local.1:row.H.local.0
Addnet mon_ledin P31.I TBUF.FC.2.I
Colornet 3 mon_ledin
Netdelay mon_ledin TBUF.FC.2.I 6.6
NProgram GC.20.1.1 GC.20.1.12 HC.20.1.2 HC.20.1.11 col.C.local.4:PAD44.I
col.C.local.2:TBUF.FC.2.I col.C.local.3:row.H.local.0
Addnet pd0in P12.I TBUF.BA.1.I
Colornet 3 pd0in
Netdelay pd0in TBUF.BA.1.I 2.4
NProgram BA.20.1.3 BA.20.1.8 row.B.local.4:PAD63.I col.A.local.4:TBUF.BA.1.I
Addnet pd1in P15.I TBUF.CA.2.I
Colornet 3 pd1in
Netdelay pd1in TBUF.CA.2.I 1.0
NProgram col.A.local.2:PAD59.I col.A.local.2:TBUF.CA.2.I
Addnet pd2in P14.I TBUF.DA.1.I
Colornet 3 pd2in
Netdelay pd2in TBUF.DA.1.I 1.0
NProgram col.A.local.4:PAD60.I col.A.local.4:TBUF.DA.1.I
Addnet pd3in P17.I TBUF.DA.2.I
Colornet 3 pd3in
Netdelay pd3in TBUF.DA.2.I 1.0
NProgram col.A.local.2:PAD57.I col.A.local.2:TBUF.DA.2.I
Addnet pd4in P21.I TBUF.FA.1.I
Colornet 3 pd4in
Netdelay pd4in TBUF.FA.1.I 2.4
NProgram FA.20.1.3 FA.20.1.10 col.A.local.5:PAD53.I col.A.local.4:TBUF.FA.1.I
Addnet pd5in P20.I TBUF.FA.2.I
Colornet 3 pd5in
Netdelay pd5in TBUF.FA.2.I 3.6
NProgram FA.20.1.5 FA.20.1.13 FA.20.1.5 FA.20.1.14 col.A.local.1:PAD54.I col.A.local.2:TBUF.FA.2.I
Addnet pd6in P47.I TBUF.GH.2.I
Colornet 3 pd6in
Netdelay pd6in TBUF.GH.2.I 4.5
NProgram HH.20.1.1 HH.20.1.5 HI.20.1.14 HI.20.1.19 col.I.local.1:PAD31.I col.H.local.2:TBUF.GH.2.I
Addnet pd7in P24.I TBUF.HA.1.I
Colornet 3 pd7in
Netdelay pd7in TBUF.HA.1.I 2.1
NProgram HA.20.1.3 HA.20.1.10 col.A.local.5:PAD49.I col.A.local.4:TBUF.HA.1.I
Addnet pein P5.I TBUF.FD.2.I
Colornet 3 pein
Netdelay pein TBUF.FD.2.I 14.0
NProgram GD.20.1.1 GD.20.1.12 HD.20.1.2 HD.20.1.11 ID.20.1.3 ID.20.1.18 row.A.local.4:PAD5.I
col.D.local.2:TBUF.FD.2.I col.C.long.3:row.A.local.4 col.C.long.3:row.I.local.2
Addnet pld1_cs P59.I BH.B BG.B BB.B BE.B AH.A
Flagnet Critical pld1_cs
Colornet 3 pld1_cs COMMUNICATIONS MFG. COMPANY
XILINX Configuration data Netdelay pld1_cs BH.B 8.5 BG.B 9.8 BB.B 19.6 BE.B 15.0 AH.A 15.8
NProgram BH.20.1.1 BH.20.1.5 BC.20.1.0 BC.20.1.19 BI.20.1.0 BI.20.1.19 BF.20.1.5 BF.20.1.19
BG.20.1.5 BG.20.1.19 BH.20.1.5 BH.20.1.19 row.A.long.3:AH.A row.B.local.1:BB.B row.B.local.1:BE.B
row.B.local.1:BG.B row.B.local.1:BH.B col.I.local.1:PAD17.I col.C.local.1:row.A.long.3
col.H.local.2:row.A.long.3 col.F.local.8:row.B.local.1
Addnet shift_ledin P27.I TBUF.BC.1.I
Colornet 3 shift_ledin
Netdelay shift_ledin TBUF.BC.1.I 10.6
NProgram AB.20.1.8 AB.20.1.16 AC.20.1.11 AC.20.1.16 row.I.local.2:PAD48.I
col.C.local.4:TBUF.BC.1.I col.A.long.5:row.A.local.4 col.A.long.5:row.I.local.2
Addnet slctin P3.I TBUF.FD.1.I
Colornet 3 slctin
Netdelay slctin TBUF.FD.1.I 10.6
NProgram BD.20.1.0 BD.20.1.13 CD.20.1.1 CD.20.1.12 ED.20.1.2 ED.20.1.11 DD.20.1.2 DD.20.1.12
col.D.local.1:PAD7.I col.D.local.4:TBUF.FD.1.I
Addnet slctinin P6.I TBUF.DE.2.I
Colornet 3 slctinin
Netdelay slctinin TBUF.DE.2.I 12.7
NProgram CC.20.1.1 CC.20.1.5 BC.20.1.1 BC.20.1.13 DE.20.1.0 DE.20.1.13 CD.20.1.5 CD.20.1.19
CE.20.1.14 CE.20.1.19 col.C.local.2:PAD4.I col.E.local.2:TBUF.DE.2.I col.D.local.8:row.C.local.1
Addnet sp_enin P41.I TBUF.FH.1.I
Colornet 3 sp_enin
Netdelay sp_enin TBUF.FH.1.I 8.3
NProgram GH.20.1.2 GH.20.1.12 FH.20.1.3 FH.20.1.12 HH.20.1.2 HH.20.1.13 col.H.local.2:PAD35.I
col.H.local.4:TBUF.FH.1.I col.H.local.3:row.G.local.0
Addnet sp_mutein P39.I TBUF.FG.2.I
Colornet 3 sp_mutein
Netdelay sp_mutein TBUF.FG.2.I 4.7
NProgram HG.20.1.0 HG.20.1.13 GG.20.1.1 GG.20.1.14 col.G.local.2:PAD37.I
col.G.local.2:TBUF.FG.2.I
Addnet spkr_enin P13.I TBUF.BB.1.I
Colornet 3 spkr_enin
Netdelay spkr_enin TBUF.BB.1.I 2.3
NProgram BB.20.1.3 BB.20.1.17 row.B.local.3:PAD62.I col.B.local.4:TBUF.BB.1.I
Addnet strobein P68.I TBUF.BE.1.I
Colornet 3 strobein
Netdelay strobein TBUF.BE.1.I 1.0
NProgram col.E.local.4:PAD9.I col.E.local.4:TBUF.BE.1.I
Addnet tone_enin P40.I TBUF.GG.2.I
Colornet 3 tone_enin
Netdelay tone_enin TBUF.GG.2.I 2.4
NProgram HG.20.1.1 HG.20.1.14 col.G.local.1:PAD36.I col.G.local.2:TBUF.GG.2.I
Addnet ttl5v_enin P22.I TBUF.FB.1.I
Colornet 3 ttl5v_enin
Netdelay ttl5v_enin TBUF.FB.1.I 4.0
NProgram FB.20.1.3 FB.20.1.10 GB.20.1.4 GB.20.1.15 row.G.local.5:PAD52.I
col.B.local.4:TBUF.FB.1.I
Addnet version_rd BH.Y TBUF.HI.1.T TBUF.GI.2.T TBUF.FI.2.T TBUF.FI.1.T TBUF.DI.2.T
TBUF.DI.1.T TBUF.CI.2.T TBUF.BI.1.T
Colornet 3 version_rd
Netdelay version_rd TBUF.HI.1.T 11.5 TBUF.GI.2.T 11.5 TBUF.FI.2.T 11.5 TBUF.FI.1.T 11.5
TBUF.DI.2.T 11.5 TBUF.DI.1.T 11.5 TBUF.CI.2.T 11.5 TBUF.BI.1.T 11.5

COMMUNICATIONS MFG. COMPANY
XILINX Configuration data

NProgram BI.20.1.2 BI.20.1.13 BI.20.1.2 BI.20.1.16 col.I.local.2:BH.Y col.I.long.1:TBUF.BI.1.T
col.I.long.1:TBUF.DI.1.T col.I.long.1:TBUF.CI.2.T col.I.long.1:TBUF.DI.2.T col.I.long.1:TBUF.FI.1.T
col.I.long.1:TBUF.FI.2.T col.I.long.1:TBUF.HI.1.T col.I.long.1:TBUF.GI.2.T col.I.long.1:row.B.local.4
Editblk BH
Base F
Config F:B:E:A:D Y:F X: DY: DX: RSTDIR: CLK: ENCLK:
Equate F = B+E+A+D
Endblk
Editblk BG
Base FG
Config F:B:C:A:D G:B:C:A:E X:F Y:G DX: DY: RSTDIR: CLK: ENCLK:
Equate F = B+C+~A+D
Equate G = B+C+~A+E
Endblk
Editblk BB
Base FG
Config F:B:C:A:D G:B:C:A:E X:F Y:G DX: DY: RSTDIR: CLK: ENCLK:
Equate F = B+~C+A+D
Equate G = B+~C+A+E
Endblk
Nameblk P33 ack
Editblk P33
Base IO
Config IN:I:PULLUP OUT: TRI:
Endblk
Editblk BE
Base FG
Config G:B:C:A:D F:B:C:A:E Y:G X:F DY: DX: RSTDIR: CLK: ENCLK:
Equate G = B+~C+~A+D
Equate F = B+~C+~A+E
Endblk
Nameblk P32 alt_led
Editblk P32
Base IO
Config IN:I OUT:OQ TRI:
Endblk
Nameblk P67 autofd
Editblk P67
Base IO
Config IN:I OUT:OQ TRI:
Endblk
Nameblk P8 a0
Editblk P8
Base IO
Config IN:I:PULLUP OUT: TRI:
Endblk
Nameblk P7 a1
Editblk P7
Base IO
Config IN:I:PULLUP OUT: TRI:
Endblk
Nameblk P54 a13
Nameblk P50 a14
Nameblk P62 a15

COMMUNICATIONS MFG. COMPANY
XILINX Configuration data

Editblk BF
Base FG
Config F:B:C:A:D G:B:C:A:E X:F Y:G DX: DY: RSTDIR: CLK: ENCLK:
Equate F = B+C+A+D
Equate G = B+C+A+E
Endblk
Editblk BC
Base FG
Config G:B:C:A:D F:B:C:A:E Y:G X: DY: DX: RSTDIR: CLK: ENCLK:
Equate G = B+C+~A+D
Equate F = B+C+~A+E
Endblk
Editblk BD
Base FG
Config G:B:C:A:D F:B:C:A:E Y:G X:F DY: DX: RSTDIR: CLK: ENCLK:
Equate G = B+~C+A+D
Equate F = B+~C+A+E
Endblk
Nameblk P16 bklt_en
Editblk P16
Base IO
Config IN:I OUT:OQ TRI:
Endblk
Nameblk P30 blue_led
Editblk P30
Base IO
Config IN:I OUT:OQ TRI:
Endblk
Nameblk P36 busy
Editblk P36
Base IO
Config IN:I:PULLUP OUT: TRI:
Endblk
Editblk AH
Base FG
Config G:A:B:C F: Y:G X: DY: DX: RSTDIR: CLK: ENCLK:
Equate G = B*A+C
Endblk
Nameblk P37 caps_led
Editblk P37
Base IO
Config IN:I OUT:OQ TRI:
Endblk
Editblk GA
Base FG
Config F:C G:D X:QX Y:QY DX:F DY:G RSTDIR: CLK:K:NOT ENCLK:
Equate F = C
Equate G = D
Endblk
Nameblk P19 cnd_en
Editblk P19
Base IO
Config IN:I OUT:OQ TRI:
Endblk COMMUNICATIONS MFG. COMPANY
XILINX Configuration data Nameblk P28 ctrl_led
Editblk P28
Base IO
Config IN:I OUT:OQ TRI:
Endblk
Editblk ED
Base FG
Config F: G:D:QX X:QX Y:G DX:DI DY: RSTDIR: CLK:K ENCLK:
Equate G = D*QX
Endblk
Editblk DH
Base FG
Config F: G: X:F Y:G DX: DY: RSTDIR: CLK: ENCLK:
Equate F = 1
Equate G = 0
Endblk
Nameblk P42 dtmf_en
Editblk P42
Base IO
Config IN:I OUT:OQ TRI:
Endblk
Nameblk P58 d0
Editblk P58
Base IO
Config IN:I OUT:O TRI:T
Endblk
Nameblk P56 d1
Editblk P56
Base IO
Config IN:I OUT:O TRI:T
Endblk
Nameblk P55 d2
Editblk P55
Base IO
Config IN:I OUT:O TRI:T
Endblk
Nameblk P53 d3
Editblk P53
Base IO
Config IN:I OUT:O TRI:T
Endblk
Nameblk P51 d4
Editblk P51
Base IO
Config IN:I OUT:O TRI:T
Endblk
Nameblk P49 d5
Editblk P49
Base IO
Config IN:I OUT:O TRI:T
Endblk
Nameblk P48 d6
Editblk P48
Base IO COMMUNICATIONS MFG. COMPANY
XILINX Configuration data Config IN:I OUT:O TRI:T
Endblk
Nameblk P46 d7
Editblk P46
Base IO
Config IN:I OUT:O TRI:T
Endblk
Nameblk P4 error
Editblk P4
Base IO
Config IN:I:PULLUP OUT: TRI:
Endblk
Nameblk P2 init
Editblk P2
Base IO
Config IN:I OUT:OQ TRI:
Endblk
Nameblk P9 io_rd
Editblk P9
Base IO
Config IN:I:PULLUP OUT: TRI:
Endblk
Nameblk P61 io_wr
Editblk P61
Base IO
Config IN:I:PULLUP OUT: TRI:
Endblk
Nameblk P57 iochrdy
Editblk P57
Base IO
Config IN: OUT:O TRI:
Endblk
Nameblk P11 lcd_en
Editblk P11
Base IO
Config IN:I OUT:OQ TRI:
Endblk
Nameblk P38 line1_led
Editblk P38
Base IO
Config IN:I OUT:OQ TRI:
Endblk
Nameblk P63 line1_sel
Editblk P63
Base IO
Config IN:I OUT:OQ TRI:
Endblk
Nameblk P29 line2_led
Editblk P29
Base IO
Config IN:I OUT:OQ TRI:
Endblk
Nameblk P65 line2_sel
Editblk P65

COMMUNICATIONS MFG. COMPANY
XILINX Configuration data

Base IO
Config IN:I OUT:OQ TRI:
Endblk
Nameblk P66 lpt1_cs
Editblk P66
Base IO
Config IN:I:PULLUP OUT: TRI:
Endblk
Nameblk P34 lpt1_int
Editblk P34
Base IO
Config IN: OUT:O TRI:
Endblk
Nameblk P64 l1_hold
Editblk P64
Base IO
Config IN:I OUT:OQ TRI:
Endblk
Nameblk P43 l2_hold
Editblk P43
Base IO
Config IN:I OUT:OQ TRI:
Endblk
Nameblk P23 modem_en
Editblk P23
Base IO
Config IN:I OUT:OQ TRI:
Endblk
Nameblk P31 mon_led
Editblk P31
Base IO
Config IN:I OUT:OQ TRI:
Endblk
Nameblk P12 pd0
Editblk P12
Base IO
Config IN:I OUT:OQ TRI:
Endblk
Nameblk P15 pd1
Editblk P15
Base IO
Config IN:I OUT:OQ TRI:
Endblk
Nameblk P14 pd2
Editblk P14
Base IO
Config IN:I OUT:OQ TRI:
Endblk
Nameblk P17 pd3
Editblk P17
Base IO
Config IN:I OUT:OQ TRI:
Endblk
Nameblk P21 pd4

COMMUNICATIONS MFG. COMPANY
XILINX Configuration data

Editblk P21
Base IO
Config IN:I OUT:OQ TRI:
Endblk
Nameblk P20 pd5
Editblk P20
Base IO
Config IN:I OUT:OQ TRI:
Endblk
Nameblk P47 pd6
Editblk P47
Base IO
Config IN:I OUT:OQ TRI:
Endblk
Nameblk P24 pd7
Editblk P24
Base IO
Config IN:I OUT:OQ TRI:
Endblk
Nameblk P5 pe
Editblk P5
Base IO
Config IN:I:PULLUP OUT: TRI:
Endblk
Nameblk P59 pld1_cs
Editblk P59
Base IO
Config IN:I:PULLUP OUT: TRI:
Endblk
Nameblk P27 shift_led
Editblk P27
Base IO
Config IN:I OUT:OQ TRI:
Endblk
Nameblk P3 slct
Editblk P3
Base IO
Config IN:I:PULLUP OUT: TRI:
Endblk
Nameblk P6 slctin
Editblk P6
Base IO
Config IN:I OUT:OQ TRI:
Endblk
Nameblk P41 sp_en
Editblk P41
Base IO
Config IN:I OUT:OQ TRI:
Endblk
Nameblk P39 sp_mute
Editblk P39
Base IO
Config IN:I OUT:OQ TRI:
Endblk

COMMUNICATIONS MFG. COMPANY
XILINX Configuration data

Nameblk P13 spkr_en
Editblk P13
Base IO
Config IN:I OUT:OQ TRI:
Endblk
Nameblk P68 strobe
Editblk P68
Base IO
Config IN:I OUT:OQ TRI:
Endblk
Nameblk P40 tone_en
Editblk P40
Base IO
Config IN:I OUT:OQ TRI:
Endblk
Nameblk P22 ttl5v_en
Editblk P22
Base IO
Config IN:I OUT:OQ TRI:
Endblk ;: FIN2.LCA (3020PC68-50), XACT 4.12, Sat Feb 27 17:40:41 1993
Design 3020PC68 9 0
Speed -50
Programorder On
Addnet a0 P64.I BG.C FH.C P63.O BH.C
Colornet 3 a0
Netdelay a0 BG.C 5.9 FH.C 9.8 P63.O 9.8 BH.C 9.8
Program {175G211} {175G225} {174G231} {174G253} {212G91} {212G211} {212G256} {212G264}
{205G264} {199G263} {190G263}
NProgram col.G.local.2:BG.C BG.20.1.13 BG.20.1.0 col.G.local.1:PAD13.I col.H.long.2:FH.C
col.H.long.2:BH.C
NProgram col.H.long.2:PAD14.O col.H.long.2:row.A.local.3 AH.20.1.7 AH.20.1.16
row.A.local.4:PAD13.I
Addnet a1 P62.I DG.A BG.B P61.O P53.O BH.E
Colornet 3 a1
Netdelay a1 DG.A 14.0 BG.B 10.2 P61.O 6.3 P53.O 14.8 BH.E 9.8
Program {195G230} {199G230} {200G231} {200G232} {226G266} {205G266} {200G261}
{200G253} {193G168} {199G168} {203G171}
Program {236G149} {236G165} {233G167} {205G167} {203G171} {203G195} {204G201}
{204G208} {204G225} {203G231} {203G253}
NProgram row.B.local.1:BG.B BH.20.1.19 BH.20.1.0 col.H.local.1:row.B.local.0 row.A.local.1:PAD16.O
AH.20.1.5 AH.20.1.14
NProgram col.H.local.1:PAD15.I row.D.local.3:DG.A DH.20.1.17 DH.20.1.3 col.I.local.3:PAD24.O
DI.20.1.12 DI.20.1.16
NProgram DH.20.1.8 DH.20.1.3 CH.20.1.11 CH.20.1.4 col.H.local.5:BH.E BH.20.1.10 BH.20.1.3
col.H.local.4:PAD15.I
Addnet a2 P4.I GE.D AG.C DG.C GH.D P65.O P48.O
Colornet 3 a2
Netdelay a2 GE.D 29.2 AG.C 20.4 DG.C 20.4 GH.D 29.2 P65.O 20.4 P48.O 29.2
Program {139G53} {230G53} {217G53} {203G53} {203G51} {199G48} {186G48} {186G151}
{186G241} {186G256} {186G264} {180G264}

COMMUNICATIONS MFG. COMPANY
XILINX Configuration data

Program {179G264} {173G265} {153G265} {147G266} {127G266} {121G266} {101G266} {95G266} {93G266}
NProgram row.H.long.1:GE.D row.H.long.1:PAD30.O row.H.long.1:GH.D col.H.local.4:row.H.long.1 HH.20.1.3 HH.20.1.17
NProgram col.G.long.2:row.H.local.3 col.G.long.2:DG.C col.G.long.2:AG.C col.G.long.2:PAD12.O col.G.long.2:row.A.local.3
NProgram col.G.local.8:row.A.local.3 AG.20.1.7 AG.20.1.18 AF.20.1.6 AF.20.1.19 AE.20.1.5 AE.20.1.19 AD.20.1.5 AD.20.1.19
NProgram row.A.local.1:PAD6.I
Addnet a2d_busy P8.I P9.O
Colornet 3 a2d_busy
Netdelay a2d_busy P9.O 5.6
Program {30G265} {43G265} {45G261} {45G258}
NProgram row.A.local.2:PAD1.O AB.20.1.18 AB.20.1.13 col.B.local.2:PAD2.I
Addnet a2d_cs HD.Y P36.O
Colornet 3 a2d_cs
Netdelay a2d_cs P36.O 3.7
Program {126G12} {126G30}
NProgram col.E.local.5:PAD40.O col.E.local.5:HD.Y
Addnet a2d_power P37.I P36.T P63.T P61.T P65.T P43.T P2.T P41.T P9.T
Colornet 3 a2d_power
Netdelay a2d_power P36.T 6.5 P63.T 17.6 P61.T 17.6 P65.T 17.6 P43.T 6.5 P2.T 17.6 P41.T 6.5 P9.T 17.6
Program {139G13} {224G13} {198G13} {148G13} {148G11} {147G6} {33G259} {120G259} {229G259} {198G259} {172G259} {134G259}
Program {134G8} {145G8} {145G6}
NProgram row.I.long.3:PAD40.T row.I.long.3:PAD33.T row.I.long.3:PAD35.T col.F.local.1:row.I.long.3 IF.20.1.0 IF.20.1.15
NProgram row.A.long.2:PAD1.T row.A.long.2:PAD8.T row.A.long.2:PAD16.T row.A.long.2:PAD14.T row.A.long.2:PAD12.T
NProgram col.E.long.2:row.A.long.2 col.E.long.2:row.I.local.3 row.I.local.3:PAD39.I row.I.local.5:PAD39.I
Addnet a3 P38.I AE.A GE.C AG.B DG.B FH.E HG.B GH.C P43.O HH.D
Colornet 3 a3
Netdelay a3 AE.A 23.9 GE.C 10.1 AG.B 17.8 DG.B 17.8 FH.E 14.8 HG.B 17.8 GH.C 13.8 P43.O 14.9 HH.D 12.1
Program {221G8} {206G8} {205G8} {199G8} {204G88} {204G81} {204G75} {204G61} {204G51} {203G45} {203G25} {203G11} {199G8}
Program {179G8} {173G9} {185G32} {141G264} {147G264} {153G264} {173G264} {179G265} {185G265} {185G242} {185G152} {185G49}
Program {179G49} {173G48} {153G48} {151G45} {132G48} {147G48} {150G51} {150G51} {151G45} {151G16} {164G9}
NProgram row.I.local.3:PAD33.O col.H.local.8:row.I.local.3 IH.20.1.7 IH.20.1.17 col.H.local.5:FH.E GH.20.1.4 GH.20.1.10
NProgram col.H.local.5:GH.C HH.20.1.4 HH.20.1.11 col.H.local.4:HH.D IH.20.1.3 IH.20.1.17 IG.20.1.7 IG.20.1.18
NProgram col.G.long.1:HG.B row.A.local.3:AE.A AF.20.1.17 AF.20.1.7 AG.20.1.17 AG.20.1.6 col.G.long.1:row.A.local.2
NProgram col.G.long.1:AG.B col.G.long.1:DG.B col.G.long.1:row.H.local.2 HG.20.1.6 HG.20.1.17 HF.20.1.7 HF.20.1.11
NProgram row.H.local.3:GE.C HF.20.1.17 HF.20.1 HF.20.1.2 HF.20.1.11 col.F.local.4:PAD38.I row.I.local.2:PAD38.I
Addnet a4 P33.I ED.B FD.B HD.B EC.A GD.B
Colornet 3 a4

COMMUNICATIONS MFG. COMPANY
XILINX Configuration data

Netdelay a4 ED.B 10.2 FD.B 10.2 HD.B 10.2 EC.A 13.8 GD.B 10.2
Program {89G140} {95G140} {101G139} {107G139} {107G122} {107G92} {107G62} {107G32} {107G7} {112G7}
NProgram row.E.local.1:EC.A ED.20.1.19 ED.20.1.6 col.D.long.1:row.E.local.2 col.D.long.1:ED.B col.D.long.1:FD.B
NProgram col.D.long.1:GD.B col.D.long.1:HD.B col.D.long.1:row.I.local.4 row.I.local.4:PAD42.I
Addnet a5 P32.I ED.C FD.C HD.C EC.E GD.C
Colornet 3 a5
Netdelay a5 ED.C 9.8 FD.C 9.8 HD.C 9.8 EC.E 8.4 GD.C 9.8
Program {82G118} {82G8} {108G121} {108G91} {108G61} {108G31} {108G8} {101G8} {95G8} {93G8}
NProgram col.C.long.2:EC.E col.C.long.2:row.I.local.3 col.D.long.2:ED.C col.D.long.2:FD.C col.D.long.2:GD.C col.D.long.2:HD.C
NProgram col.D.long.2:row.I.local.3 ID.20.1.7 ID.20.1.17 row.I.local.3:PAD43.I
Addnet a6 P23.I ED.E FD.E HD.D HC.E EC.C GD.E
Colornet 3 a6
Netdelay a6 ED.E 21.4 FD.E 20.4 HD.D 19.9 HC.E 13.4 EC.C 21.2 GD.E 18.5
Program {72G28} {72G45} {69G47} {80G106} {95G106} {100G105} {100G118} {100G111} {100G105} {100G88} {100G81} {100G75} {100G58}
Program {99G25} {99G45} {100G51} {100G51} {95G46} {75G46} {69G47} {49G47} {43G48} {32G48}
NProgram col.C.local.3:HC.E HC.20.1.12 HC.20.1.16 row.F.local.5:EC.C FD.20.1.15 FD.20.1.10 col.D.local.5:ED.E
NProgram FD.20.1.4 FD.20.1.10 col.D.local.5:FD.E GD.20.1.4 GD.20.1.10 col.D.local.5:GD.E col.D.local.4:HD.D
NProgram HD.20.1.11 HD.20.1.4 HD.20.1.4 HD.20.1.15 HC.20.1.9 HC.20.1.16 HB.20.1.8 HB.20.1.17 row.H.local.3:PAD50.I
Addnet a7 P24.I ED.D FD.D HD.A HC.B EC.B GD.D
Colornet 3 a7
Netdelay a7 ED.D 20.2 FD.D 22.4 HD.A 12.4 HC.B 15.7 EC.B 18.5 GD.D 21.6
Program {70G32} {115G44} {113G77} {101G77} {99G75} {99G57} {99G51} {101G48} {101G48} {95G49} {75G49} {70G45} {70G44} {113G109}
Program {101G109} {95G109} {75G109} {71G105} {72G122} {72G111} {71G105} {71G81} {69G80} {50G80} {49G80} {43G80}
Program {17G80} {12G75} {12G51} {13G45} {13G44} {13G20}
NProgram col.C.local.1:HC.B row.H.long.2:HD.A row.G.local.4:FD.D GD.20.1.8 GD.20.1.11 col.D.local.4:GD.D HD.20.1.3 HD.20.1.7
NProgram HD.20.1.7 HD.20.1.18 HC.20.1.6 HC.20.1.14 col.C.local.1:row.H.long.2 row.F.local.2:ED.D FD.20.1.6 FD.20.1.18
NProgram FC.20.1.6 FC.20.1.13 col.C.local.3:EC.B FC.20.1.2 FC.20.1.13 GC.20.1.1 GC.20.1.19 col.B.local.8:row.G.local.1
NProgram GB.20.1.5 GB.20.1.19 GA.20.1.5 GA.20.1.14 HA.20.1.0 HA.20.1.13 col.A.local.2:row.H.long.2 col.A.local.2:PAD49.I
Addnet a8 P20.I EB.D EA.C FB.B
Colornet 3 a8
Netdelay a8 EB.D 5.0 EA.C 4.3 FB.B 5.0
Program {23G106} {65G107} {61G107} {49G107} {43G106} {32G106}
NProgram row.F.local.5:EA.C row.F.local.4:FB.B row.F.local.4:EB.D FB.20.1.8 FB.20.1.15 row.F.local.5:PAD54.I
Addnet a9 P22.I EB.C EA.B FB.E
Colornet 3 a9
Netdelay a9 EB.C 8.5 EA.B 10.1 FB.E 6.9
Program {22G137} {43G137} {49G136} {49G136} {48G135} {48G121} {48G111} {48G105} {48G88} {48G81} {43G76} {32G76}

COMMUNICATIONS MFG. COMPANY
XILINX Configuration data

NProgram row.E.local.4:EA.B EB.20.1.16 EB.20.1.9 EB.20.1.9 EB.20.1.10 col.B.local.5:EB.C FB.20.1.4 FB.20.1.10
NProgram col.B.local.5:FB.E GB.20.1.4 GB.20.1.15 row.G.local.5:PAD52.I
Addnet a10 P21.I EB.E EA.D FB.A
Colornet 3 a10
Netdelay a10 EB.E 7.6 EA.D 6.8 FB.A 7.6
Program {63G110} {51G110} {49G110} {43G109} {36G109} {17G109} {13G105} {13G93}
NProgram row.F.local.1:FB.A row.F.local.1:EB.E FB.20.1.5 FB.20.1.18 row.F.local.2:EA.D FA.20.1.6 FA.20.1.13
NProgram col.A.local.2:PAD53.I
Addnet a11 P14.I EB.B EA.E FB.C
Colornet 3 a11
Netdelay a11 EB.B 15.7 EA.E 11.9 FB.C 14.4
Program {47G91} {47G105} {43G107} {17G107} {14G111} {14G118} {14G135} {15G141} {65G137} {49G137} {43G138} {18G138}
Program {17G138} {15G141} {15G165} {15G171} {15G189}
NProgram col.B.local.4:FB.C FB.20.1.11 FB.20.1.16 FA.20.1.8 FA.20.1.2 col.A.local.3:EA.E EA.20.1.12 EA.20.1.3
NProgram row.E.local.4:EB.B EB.20.1.8 EB.20.1.17 col.A.local.7:row.E.local.3 EA.20.1.7 EA.20.1.3 DA.20.1.11 DA.20.1.3
NProgram col.A.local.4:PAD60.I
Addnet a12 P15.I DA.E
Colornet 3 a12
Netdelay a12 DA.E 5.3
Program {14G148} {14G165} {13G171} {13G183}
NProgram col.A.local.3:DA.E DA.20.1.12 DA.20.1.1 col.A.local.2:PAD59.I
Addnet a13 P16.I DA.B
Colornet 3 a13
Netdelay a13 DA.B 2.0
Program {32G152}
NProgram PAD58.I:DA.B
Addnet a14 P17.I DA.C
Colornet 3 a14
Netdelay a14 DA.C 3.7
Program {16G151} {16G153}
NProgram col.A.local.5:DA.C col.A.local.5:PAD57.I
Addnet a15 P19.I DA.A
Colornet 3 a15
Netdelay a15 DA.A 5.1
Program {12G163} {12G141} {12G135} {12G129}
NProgram col.A.local.1:DA.A EA.20.1.0 EA.20.1.14 col.A.local.1:PAD56.I
Addnet bklt_wr DG.X P54.O
Colornet 3 bklt_wr
Netdelay bklt_wr P54.O 4.8
Program {234G157} {234G141} {233G136} {214G136}
NProgram col.I.local.1:PAD23.O EI.20.1.0 EI.20.1.15 row.E.local.5:DG.X
Addnet com2_cs AE.Y P68.O
Colornet 3 com2_cs
Netdelay com2_cs P68.O 5.1
Program {136G263} {147G263} {153G263} {155G263}
NProgram row.A.local.4:PAD9.O AF.20.1.16 AF.20.1.8 ro.....local.4:AE.Y
Addnet com2b EA.X EC.D
Colornet 3 com2b
Netdelay com2b EC.D 5.0

COMMUNICATIONS MFG. COMPANY
XILINX Configuration data

Program {87G107} {75G107} {69G106} {58G106}
NProgram row.F.local.4:EC.D FC.20.1.8 FC.20.1.15 row.F.local.5:EA.X
Addnet com2c EC.Y AE.E
Colornet 3 com2c
Netdelay com2c AE.E 12.6
Program {126G238} {126G231} {126G225} {126G201} {125G195} {125G171} {124G165} {124G141} {121G137} {103G137}
NProgram col.E.local.5:AE.E BE.20.1.4 BE.20.1.10 CE.20.1.4 CE.20.1.11 DE.20.1.3 DE.20.1.12 EE.20.1.2 EE.20.1.16
NProgram row.E.local.4:EC.Y
Addnet com2lpt1a DA.Y FB.D EA.A
Colornet 3 com2lpt1a
Netdelay com2lpt1a FB.D 7.5 EA.A 2.6
Program {38G142} {45G87} {45G105} {46G111} {46G135} {46G141} {46G150}
NProgram DA.Y:EA.A col.B.local.2:FB.D FB.20.1.13 FB.20.1.2 EB.20.1.12 EB.20.1.2 col.B.local.3:DA.Y
Addnet ctrlblk EB.X ED.A FD.A HD.E HC.A
Colornet 3 ctrlblk
Netdelay ctrlblk ED.A 5.6 FD.A 5.4 HD.E 12.3 HC.A 12.3
Program {89G50} {95G50} {97G51} {98G28} {98G45} {97G51} {97G75} {96G81} {96G82} {96G100} {96G105} {95G110} {96G130}
Program {96G111} {95G110} {84G110}
NProgram row.H.local.1:HC.A HD.20.1.19 HD.20.1.1 col.D.local.3:HD.E HD.20.1.12 HD.20.1.1 GD.20.1.13 GD.20.1.0
NProgram col.D.local.1:row.G.local.0 col.D.local.1:FD.A FD.20.1.14 FD.20.1.19 col.D.local.1:ED.A FD.20.1.0 FD.20.1.19
NProgram row.F.local.1:EB.X
Addnet ctrlblka DA.X EB.A
Colornet 3 ctrlblka
Netdelay ctrlblka EB.A 3.8
Program {63G140} {58G140}
NProgram row.E.local.1:EB.A row.E.local.1:DA.X
Addnet ctrl2_wr BH.Y P7.OK
Colornet 3 ctrl2_wr
Netdelay ctrl2_wr P7.OK 11.5
Program {58G271} {248G271} {238G258} {238G231} {238G225} {238G210}
NProgram row.A.local.11:PAD3.OK col.I.local.7:row.A.local.11 col.I.local.5:row.A.local.7 BI.20.1.4 BI.20.1.10
NProgram col.I.local.5:BH.Y
Addnet dtmf_clk AC.Y P3.O
Colornet 3 dtmf_clk
Netdelay dtmf_clk P3.O 3.7
Program {100G255} {100G240}
NProgram col.D.local.5:PAD7.O col.D.local.5:AC.Y
Addnet dtmf_power P66.I P3.T P67.T AA.D
Colornet 3 dtmf_power
Netdelay dtmf_power P3.T 8.1 P67.T 7.7 AA.D 9.2
Program {146G260} {113G265} {121G265} {127G265} {147G265} {148G261} {148G260} {148G253} {36G233} {151G233} {151G253}
NProgram row.A.long.1:PAD10.T row.A.local.2:PAD7.T AE.20.1.18 AE.20.1.6 AF.20.1.18 AF.20.1.14 col.F.local.1:row.A.long.1
NProgram col.F.local.1:PAD11.I row.B.long.1:AA.D col.F.local.4:row.B.long.1 col.F.local.4:PAD11.I
Addnet dtmf_wr BG.Y P67.O
Colornet 3 dtmf_wr

COMMUNICATIONS MFG. COMPANY
XILINX Configuration data

Netdelay dtmf_wr P67.O 11.1
Program {149G256} {149G231} {153G229} {173G229} {179G229} {199G229} {201G225} {201G210}
NProgram col.F.local.2:PAD10.O BF.20.1.1 BF.20.1.6 BG.20.1.18 BG.20.1.6 BH.20.1.18 BH.20.1.13 col.H.local.2:BG.Y
Addnet d2a_both FD.X FH.A HG.A GH.A HH.A
Colornet 3 d2a_both
Netdelay d2a_both FH.A 10.3 HG.A 15.4 GH.A 10.1 HH.A 15.4
Program {193G50} {199G50} {200G51} {200G40} {200G45} {200G51} {200G52} {200G70} {200G75} {199G80} {200G100} {200G81} {199G80}
Program {179G80} {173G80} {153G80} {147G80} {136G80}
NProgram row.H.local.1:HG.A HH.20.1.19 HH.20.1.0 col.H.local.1:HH.A HH.20.1.14 HH.20.1.0 col.H.local.1:row.H.local.0
NProgram col.H.local.1:GH.A GH.20.1.14 GH.20.1.19 col.H.local.1:FH.A GH.20.1.0 GH.20.1.19 GG.20.1.5 GG.20.1.19
NProgram GF.20.1.5 GF.20.1.19 row.G.local.1:FD.X
Addnet d2a_csh FH.Y P50.O
Colornet 3 d2a_csh
Netdelay d2a_csh P50.O 2.0
Program {230G97}
NProgram PAD27.O:FH.Y
Addnet d2a_csl FH.X P49.O
Colornet 3 d2a_csl
Netdelay d2a_csl P49.O 2.0
Program {233G93}
NProgram PAD28.O:FH.X
Addnet d2a_io_wr HH.X P46.O
Colornet 3 d2a_io_wr
Netdelay d2a_io_wr P46.O 2.0
Program {229G33}
NProgram PAD32.O:HH.X
Addnet d2a_load HG.Y P47.O
Colornet 3 d2a_load
Netdelay d2a_load P47.O 5.3
Program {225G50} {205G50} {201G45} {201G30}
NProgram row.H.local.1:PAD31.O HH.20.1.5 HH.20.1.13 col.H.local.2:HG.Y
Addnet d2a_power P51.I P50.T P49.T P47.T P53.T P48.T P46.T
Colornet 3 d2a_power
Netdelay d2a_power P50.T 9.3 P49.T 9.3 P47.T 9.3 P53.T 9.3 P48.T 9.3 P46.T 9.3
Program {231G21} {231G40} {231G64} {231G94} {231G100} {231G154} {231G107} {228G107}
NProgram col.I.long.1:PAD32.T col.I.l... 1:PAD31.T col.I.long.1:PAD30.T col.I.long.1:PAD28.T col.I.long.1:PAD27.T
NProgram col.I.long.1:PAD24.T col.I.long.1:row.F.local.4 row.F.local.4:PAD26.I
Addnet d2a2_wr GH.Y P40.O
Colornet 3 d2a2_wr
Netdelay d2a2_wr P40.O 9.6
Program {188G9} {199G9} {205G10} {234G10} {234G45} {235G51} {235G60}
NProgram row.I.local.2:PAD36.O IH.20.1.18 IH.20.1.5 col.I.local.1:row.I.local.1 HI.20.1.14 HI.20.1.1 col.I.local.2:GH.Y
Addnet d6in P6.I P7.O
Colornet 3 d6in
Netdelay d6in P7.O 4.6
Program {44G255} {44G261} {49G266} {67G266}
NProgram col.B.local.1:PAD3.O AB.20.1.14 AB.20.1.5 row.A.local.1:PAD4.I

COMMUNICATIONS MFG. COMPANY
XILINX Configuration data

Addnet ffstat_cs HC.X P31.O
Colornet 3 ffstat_cs
Netdelay ffstat_cs P31.O 5.0
Program {84G9} {95G9} {101G10} {114G10}
NProgram row.I.local.2:PAD44.O ID.20.1.18 ID.20.1.5 row.I.local.1:HC.X
Addnet io_rd P42.I HG.C P41.O
Colornet 3 io_rd
Netdelay io_rd HG.C 5.0 P41.O 5.0
Program {181G10} {195G10} {199G10} {205G9} {217G9}
NProgram row.I.local.1:HG.C row.I.local.1:PAD35.O IH.20.1.19 IH.20.1.6 row.I.local.2:PAD34.I
Addnet io_wr P39.I BG.D FH.B GH.B HH.B BH.B
Flagnet Critical io_wr
Colornet 3 io_wr
Netdelay io_wr BG.D 26.0 FH.B 15.3 GH.B 15.3 HH.B 15.3 BH.B 15.3
Program {191G203} {203G203} {203G201} {199G198} {199G198} {205G199} {211G212}
{211G199} {211G92} {211G62} {211G32} {211G7}
Program {205G7} {199G7} {179G7} {173G6} {171G6}
NProgram row.C.long.1:BG.D col.H.local.4:row.C.long.1 CH.20.1.3 CH.20.1.17 CH.20.1.17 CH.20.1.6
col.H.long.1:BH.B
NProgram col.H.long.1:row.C.local.2 col.H.long.1:FH.B col.H.long.1:GH.B col.H.long.1:HH.B
col.H.long.1:row.I.local.4
NProgram IH.20.1.8 IH.20.1.16 IG.20.1.8 IG.20.1.15 row.I.local.5:PAD37.I
Addnet logic0 HB.X P28.O
Colornet 3 logic0
Netdelay logic0 P28.O 6.4
Program {35G6} {43G6} {49G6} {69G6} {75G6} {88G6}
NProgram row.I.local.5:PAD47.O IB.20.1.15 IB.20.1.9 IC.20.1.15 IC.20.1.9 row.I.local.5:HB.X
Addnet logic1 HB.Y P34.O
Colornet 3 logic1
Netdelay logic1 P34.O 7.0
Program {124G19} {124G45} {121G47} {101G47} {95G47} {77G47}
NProgram col.E.local.3:PAD41.O HE.20.1.12 HE.20.1.16 HD.20.1.8 HD.20.1.16 row.H.local.4:HB.Y
Addnet low16 ED.Y AG.E DG.E
Colornet 3 low16
Netdelay low16 AG.E 15.1 DG.E 11.2
Program {178G238} {178G231} {178G225} {178G201} {178G195} {178G171} {178G165}
{178G148} {178G141} {173G136}
Program {153G136} {147G137} {129G137}
NProgram col.G.local.5:AG.E BG.20.1.4 BG.20.1.10 CG.20.1.4 CG.20.1.10 DG.20.1.4 DG.20.1.10
col.G.local.5:DG.E
NProgram EG.20.1.4 EG.20.1.15 EF.20.1.9 EF.20.1.16 row.E.local.4:ED.Y
Addnet lpt1_cs GE.Y P27.O
Colornet 3 lpt1_cs
Netdelay lpt1_cs P27.O 11.7
Program {30G13} {96G13} {96G45} {101G49} {121G49} {127G50} {147G50} {149G51} {149G60}
NProgram row.I.long.3:PAD48.O col.D.local.1:row.I.long.3 HD.20.1.14 HD.20.1.6 HE.20.1.18 HE.20.1.5
HF.20.1.19 HF.20.1.1
NProgram col.F.local.2:GE.Y
Addnet lpt1b FB.X GD.A
Colornet 3 lpt1b
Netdelay lpt1b GD.A 5.1
Program {115G80} {101G80} {95G80} {84G80}
NProgram row.G.local.1:GD.A GD.20.1.5 GD.20.1.19 row.G.local.1:FB.X
Addnet lpt1c GD.X GE.B COMMUNICATIONS MFG. COMPANY
XILINX Configuration data Colornet 3 lpt1c
Netdelay lpt1c GE.B 2.0
Program {136G62}
NProgram GD.X:GE.B
Addnet pld1_cs AG.X P58.O BH.A
Flagnet Critical pld1_cs
Colornet 3 pld1_cs
Netdelay pld1_cs P58.O 5.4 BH.A 4.6
Program {235G239} {235G231} {233G230} {219G230} {214G230}
NProgram col.I.local.2:PAD18.O BI.20.1.1 BI.20.1.19 row.B.local.1:BH.A row.B.local.1:AG.X
Addnet pld3_cs AG.Y P59.O BG.A
Flagnet Critical pld3_cs
Colornet 3 pld3_cs
Netdelay pld3_cs P59.O 7.6 BG.A 2.6
Program {193G236} {234G253} {234G231} {233G229} {205G229} {201G231} {201G240}
NProgram AG.Y:BG.A col.I.local.1:PAD17.O BI.20.1.0 BI.20.1.18 BH.20.1.6 BH.20.1.1
col.H.local.2:AG.Y
Addnet sys_clk P11.I AA.A AA.K P2.O
Colornet 3 sys_clk
Netdelay sys_clk AA.A 4.7 AA.K 5.4 P2.O 14.2
Program {24G227} {17G227} {14G231} {14G....} {117G262} {101G262} {95G262} {75G262}
{69G263} {49G263} {43G264} {17G264} {14G264}
Program {14G256}
NProgram row.B.local.4:AA.K BA.20.1.8 BA.20.1.2 col.A.local.3:AA.A row.A.local.5:PAD8.O
AD.20.1.9 AD.20.1.15
NProgram AC.20.1.9 AC.20.1.16 AB.20.1.8 AB.20.1.17 col.A.local.6:row.A.local.3
col.A.local.3:row.A.local.3
NProgram col.A.local.3:PAD64.I
Addnet sysc_4 AA.X AB.D AB.K
Colornet 3 sysc_4
Netdelay sysc_4 AB.D 4.6 AB.K 5.3
Program {59G227} {49G227} {47G231} {47G237} {47G243}
NProgram row.B.local.4:AB.K BB.20.1.8 BB.20.1.3 col.B.local.4:AB.D col.B.local.4:AA.X
Addnet sysc_8 AB.X AC.E AC.K
Colornet 3 sysc_8
Netdelay sysc_8 AC.E 3.5 AC.K 8.4
Program {71G239} {71G231} {75G230} {76G230} {77G230} {84G230}
NProgram col.C.local.2:AC.K BC.20.1.1 BC.20.1.5 col.C.local.8:row.B.local.1 row.B.local.1:AC.E
row.B.local.1:AB.X
Addnet touch_cs HC.Y P29.O
Colornet 3 touch_cs
Netdelay touch_cs P29.O 8.0
Program {58G7} {69G7} {75G7} {95G7} {97G11} {97G30}
NProgram row.I.local.4:PAD46.O IC.20.1.16 IC.20.1.8 ID.20.1.16 ID.20.1.1 col.D.local.2:HC.Y
Addnet volume_wr DG.Y P30.O
Colornet 3 volume_wr
Netdelay volume_wr P30.O 19.6
Program {71G19} {71G45} {70G51} {70G75} {70G81} {70G104} {201G104} {201G105} {202G111}
{202G135} {202G141} {202G150}
NProgram col.C.local.2:PAD45.O HC.20.1.13 HC.20.1.0 GC.20.1.14 GC.20.1.0
col.C.local.1:row.F.long.2 col.H.local.2:row.F.long.2
NProgram FH.20.1.13 FH.20.1.2 EH.20.1.12 EH.20.1.2 col.H.local.3:DG.Y
Editblk HB
Base FG COMMUNICATIONS MFG. COMPANY
XILINX Configuration data Config X:F Y:G F: G: DX: DY: ENCLK: RSTDIR: CLK:
Equate F = 0
Equate G = 1
Endblk
Editblk HC
Base FG
Config X:F Y:G F:A:B G:A:B:E DX: DY: ENCLK: RSTDIR: CLK:
Equate F = A+~B
Equate G = A+B+~E
Endblk
Editblk HG
Base FG
Config X: Y:G F: G:A:C:B DX: DY: ENCLK: RSTDIR: CLK:
Equate G = A+C+B
Endblk
Editblk HH
Base FG
Config X:F Y: F:A:B:D G: DX: DY: ENCLK: RSTDIR: CLK:
Equate F = A+B+D
Endblk
Editblk GE
Base FG
Config X: Y:G F: G:B:C:D DX: DY: ENCLK: RSTDIR: CLK:
Equate G = B+~C+D
Endblk
Editblk GH
Base FG
Config X: Y:G F: G:A:B:C:D DX: DY: ENCLK: RSTDIR: CLK:
Equate G = A+B+~C+D
Endblk
Editblk FH
Base FG
Config X:F Y:G F:A:B:E:C G:A:B:E:C DX: DY: ENCLK: RSTDIR: CLK:
Equate F = A+B+E+C
Equate G = A+B+E+~C
Endblk
Editblk DA
Base FG
Config X:F Y:G F:A:C:B:E G:A:C:B:E DX: DY: ENCLK: RSTDIR: CLK:
Equate F = A+C+B+~E
Equate G = A+C+B+E
Endblk
Editblk DG
Base FG
Config X:F Y:G F:E:B:C:A G:E:B:C:A DX: DY: ENCLK: RSTDIR: CLK:
Equate F = E+~B+C+~A
Equate G = E+~B+C+A
Endblk
Editblk BG
Base FG
Config X: Y:G F: G:A:B:C:D DX: DY: ENCLK: RSTDIR: CLK:
Equate G = A+~B+C+D
Endblk
Editblk BH

COMMUNICATIONS MFG. COMPANY
XILINX Configuration data

```
Base FG
Config X: Y:G F: G:A:B:E:C DX: DY: ENCLK: RSTDIR: CLK:
Equate G = A+B+~E+C
Endblk
Editblk AA
Base FG
Config X:QX Y: F:A:QY:QX G:A:D:QY DX:F DY:G ENCLK: RSTDIR: CLK:K
Equate F = QX*~A+QX*~QY+~QX*QY*A
Equate G = ~QY*D*A+QY*D*~A
Endblk
Editblk AB
Base FG
Config X:QX Y: F:D:QY:QX G:D:QY DX:F DY:G ENCLK: RSTDIR: CLK:K
Equate F = QX*~D+QX*~QY+~QX*QY*D
Equate G = ~QY*D+QY*~D
Endblk
Editblk AC
Base FG
Config X: Y:QY F:E:QY:QX G:E:QY DX:F DY:G ENCLK: RSTDIR: CLK:K
Equate F = QX*~E+QX*~QY+~QX*QY*E
Equate G = ~QY*E+QY*~E
Endblk
Editblk AE
Base FG
Config X: Y:G F: G:E:A DX: DY: ENCLK: RSTDIR: CLK:
Equate G = E+~A
Endblk
Editblk AG
Base FG
Config X:F Y:G F:E:B:C G:E:B:C DX: DY: ENCLK: RSTDIR: CLK:
Equate F = E+B+C
Equate G = E+B+~C
Endblk
Editblk HD
Base F
Config X: Y:F F:E:A:D:C:B DX: DY: ENCLK: RSTDIR: CLK:
Equate F = E+A+D+~C+B
Endblk
Editblk GD
Base F
Config X:F Y: F:A:D:E:C:B DX: DY: ENCLK: RSTDIR: CLK:
Equate F = A+D+~E+~C+~B
Endblk
Editblk FB
Base F
Config X:F Y: F:D:C:A:E:B DX: DY: ENCLK: RSTDIR: CLK:
Equate F = D+C+A+~E+~B
Endblk
Editblk FD
Base F
Config X:F Y: F:A:D:E:C:B DX: DY: ENCLK: RSTI    CLK:
Equate F = A+D+E+C+~B
Endblk
Editblk EA
```

COMMUNICATIONS MFG. COMPANY
XILINX Configuration data

Base F
Config X:F Y: F:A:E:D:B:C DX: DY: ENCLK: RSTDIR: CLK:
Equate F = A+E+D+~B+C
Endblk
Editblk EB
Base F
Config X:F Y: F:A:B:E:C:D DX: DY: ENCLK: RSTDIR: CLK:
Equate F = A+B+E+C+~D
Endblk
Editblk EC
Base F
Config X: Y:F F:D:B:C:E:A DX: DY: ENCLK: RSTDIR: CLK:
Equate F = D+~B+~C+~E+~A
Endblk
Editblk ED
Base F
Config X: Y:F F:A:D:E:C:B DX: DY: ENCLK: RSTDIR: CLK:
Equate F = A+D+E+C+B
Endblk
Editblk P27
Base IO
Config IN: OUT:O TRI:
Endblk
Editblk P28
Base IO
Config IN: OUT:O TRI:
Endblk
Editblk P24
Base IO
Config IN:I:PULLUP OUT: TRI:
Endblk
Editblk P29
Base IO
Config IN: OUT:O TRI:
Endblk
Editblk P30
Base IO
Config IN: OUT:O TRI:
Endblk
Editblk P31
Base IO
Config IN: OUT:O TRI:
Endblk
Editblk P32
Base IO
Config IN:I:PULLUP OUT: TRI:
Endblk
Editblk P33
Base IO
Config IN:I:PULLUP OUT: TRI:
Endblk
Editblk P34
Base IO
Config IN: OUT:O TRI:

COMMUNICATIONS MFG. COMPANY
XILINX Configuration data

Endblk
Editblk P36
Base IO
Config IN: OUT:O TRI:T:NOT
Endblk
Editblk P37
Base IO
Config IN:I:PULLUP OUT: TRI:
Endblk
Editblk P38
Base IO
Config IN:I:PULLUP OUT: TRI:
Endblk
Editblk P39
Base IO
Config IN:I:PULLUP OUT: TRI:
Endblk
Editblk P40
Base IO
Config IN: OUT:O TRI:
Endblk
Editblk P41
Base IO
Config IN: OUT:O TRI:T:NOT
Endblk
Editblk P42
Base IO
Config IN:I:PULLUP OUT: TRI:
Endblk
Editblk P43
Base IO
Config IN: OUT:O TRI:T:NOT
Endblk
Editblk P46
Base IO
Config IN: OUT:O TRI:T:NOT
Endblk
Editblk P23
Base IO
Config IN:I:PULLUP OUT: TRI:
Endblk
Editblk P47
Base IO
Config IN: OUT:O TRI:T:NOT
Endblk
Editblk P48
Base IO
Config IN: OUT:O TRI:T:NOT
Endblk
Editblk P22
Base IO
Config IN:I:PULLUP OUT: TRI:
Endblk
Editblk P21

COMMUNICATIONS MFG. COMPANY
XILINX Configuration data

Base IO
Config IN:I:PULLUP OUT: TRI:
Endblk
Editblk P49
Base IO
Config IN: OUT:O TRI:T:NOT
Endblk
Editblk P20
Base IO
Config IN:I:PULLUP OUT: TRI:
Endblk
Editblk P50
Base IO
Config IN: OUT:O TRI:T:NOT
Endblk
Editblk P51
Base IO
Config IN:I:PULLUP OUT: TRI:
Endblk
Editblk P19
Base IO
Config IN:I:PULLUP OUT: TRI:
Endblk
Editblk P17
Base IO
Config IN:I:PULLUP OUT: TRI:
Endblk
Editblk P53
Base IO
Config IN: OUT:O TRI:T:NOT
Endblk
Editblk P16
Base IO
Config IN:I:PULLUP OUT: TRI:
Endblk
Editblk P15
Base IO
Config IN:I:PULLUP OUT: TRI:
Endblk
Editblk P54
Base IO
Config IN: OUT:O TRI:
Endblk
Editblk P14
Base IO
Config IN:I:PULLUP OUT: TRI:
Endblk
Editblk P58
Base IO
Config IN: OUT:O TRI:
Endblk
Editblk P11
Base IO
Config IN:I:PULLUP OUT: TRI:

COMMUNICATIONS MFG. COMPANY
XILINX Configuration data

Endblk
Editblk P9
Base IO
Config IN: OUT:O TRI:T:NOT
Endblk
Editblk P8
Base IO
Config IN:I OUT: TRI:
Endblk
Editblk P7
Base IO
Config IN: OUT:OQ TRI:
Endblk
Editblk P6
Base IO
Config IN:I OUT: TRI:
Endblk
Editblk P4
Base IO
Config IN:I:PULLUP OUT: TRI:
Endblk
Editblk P3
Base IO
Config IN: OUT:O TRI:T:NOT
Endblk
Editblk P2
Base IO
Config IN: OUT:O TRI:T:NOT
Endblk
Editblk P68
Base IO
Config IN: OUT:O TRI:
Endblk
Editblk P67
Base IO
Config IN: OUT:O TRI:T:NOT
Endblk
Editblk P66
Base IO
Config IN:I:PULLUP OUT: TRI:
Endblk
Editblk P65
Base IO
Config IN: OUT:O TRI:T:NOT
Endblk
Editblk P64
Base IO
Config IN:I:PULLUP OUT: TRI:
Endblk
Editblk P63
Base IO
Config IN: OUT:O TRI:T:NOT
Endblk
Editblk P62

COMMUNICATIONS MFG. COMPANY
XILINX Configuration data

Base IO
Config IN:I:PULLUP OUT: TRI:
Endblk
Editblk P59
Base IO
Config IN: OUT:O TRI:
Endblk
Editblk P61
Base IO
Config IN: OUT:O TRI:T:NOT
Endblk
Nameblk P27 lpt1_cs
Nameblk P28 sys_reseth
Nameblk P24 a7
Nameblk P29 touch_cs
Nameblk P30 volume_wr
Nameblk P31 ffstat_cs
Nameblk P32 a5
Nameblk P33 a4
Nameblk P34 sys_resetl
Nameblk P36 a2d_cs
Nameblk P37 a2d_power
Nameblk P38 a3
Nameblk P39 io_wr
Nameblk P40 d2a2_wr
Nameblk P41 a2d_io_rd
Nameblk P42 io_rd
Nameblk P43 a2d_a3
Nameblk P46 d2a_io_wr
Nameblk P23 a6
Nameblk P47 d2a_load
Nameblk P48 d2a_a2
Nameblk P22 a9
Nameblk P21 a10
Nameblk P49 d2a_csl
Nameblk P20 a8
Nameblk P50 d2a_csh
Nameblk P51 d2a_power
Nameblk P19 a15
Nameblk P17 a14
Nameblk P53 d2a_a1
Nameblk P16 a13
Nameblk P15 a12
Nameblk P54 bklt_wr
Nameblk P14 a11
Nameblk P58 pld1_cs
Nameblk P11 sys_clk
Nameblk P9 iochrdy
Nameblk P8 a2d_busy
Nameblk P7 mon_en
Nameblk P6 d6
Nameblk P5 d7
Nameblk P4 a2
Nameblk P3 dtmf_clk

COMMUNICATIONS MFG. COMPANY
XILINX Configuration data

Nameblk P2 a2d_clk
Nameblk P68 com2_cs
Nameblk P67 dtmf_wr
Nameblk P66 dtmf_power
Nameblk P65 a2d_a2
Nameblk P64 a0
Nameblk P63 a2d_a0
Nameblk P62 a1
Nameblk P59 pld3_cs
Nameblk P61 a2d_a1

; LCA Design=ds2pld3 Part=3020PC68 -- Blocks=129 Nets=94.
; Program=APR Version=3.20 Date=Mon Mar 1 13:32:43 1993.
Design 3020PC68
Speed -50
Programorder On
Addnet ac_mask EB.Y DC.D TBUF.HC.1.I
Colornet 3 ac_mask
Netdelay ac_mask DC.D 4.4 TBUF.HC.1.I 4.5
NProgram FC.20.1.4 FC.20.1.10 GC.20.1.4 GC.20.1.11 row.E.local.4:DC.D col.C.local.5:EB.Y
row.E.local.4:EB.Y col.C.local.4:TBUF.HC.1.I
Addnet ac_presin P53.I TBUF.DH.1.I DC.B
Colornet 3 ac_presin
Netdelay ac_presin TBUF.DH.1.I 4.8 DC.B 14.6
NProgram EH.20.1.3 EH.20.1.8 DH.20.1.3 DH.20.1.11 col.C.local.3:DC.B row.E.local.4:PAD24.I
col.H.local.4:TBUF.DH.1.I col.C.local.3:row.E.long.1 col.H.local.4:row.E.long.1
Addnet ac_toggle DC.Y BA.D
Colornet 3 ac_toggle
Netdelay ac_toggle BA.D 14.1
NProgram DD.20.1.2 DD.20.1.12 CB.20.1.7 CB.20.1.18 CC.20.1.8 CC.20.1.17 CD.20.1.12 CD.20.1.16
row.C.local.2:BA.D col.D.local.3:DC.Y col.B.local.8:row.C.local.3
Addnet a0 P9.I BG.B BB.B BD.B BC.B
Colornet 3 a0
Netdelay a0 BG.B 21.4 BB.B 8.2 BD.B 15.2 BC.B 13.4
NProgram BB.20.1.1 BB.20.1.5 BE.20.1.5 BE.20.1.18 BC.20.1.5 BC.20.1.19 BF.20.1.5 BF.20.1.19
BD.20.1.6 BD.20.1.19 AB.20.1.13 AB.20.1.18 BG.20.1.14 BG.20.1.19 col.G.local.1:BG.B
row.B.local.1:BB.B row.B.local.1:BC.B row.B.local.2:BD.B row.A.local.2:PAD1.I
col.C.local.8:row.B.local.1 col.F.local.8:row.B.local.1
Addnet a1 P11.I BG.C BB.C BD.C BC.C
Colornet 3 a1
Netdelay a1 BG.C 26.7 BB.C 15.3 BD.C 22.6 BC.C 14.5
NProgram CC.20.1.4 CC.20.1.9 BC.20.1.4 BC.20.1.10 CC.20.1.4 CC.20.1.15 AB.20.1.9 AB.20.1.16
CF.20.1.8 CF.20.1.15 CD.20.1.9 CD.20.1.15 CE.20.1.9 CE.20.1.15 CG.20.1.9 CG.20.1.16 AC.20.1.10
AC.20.1.15 col.C.local.5:BC.C row.C.local.5:BB.C row.C.local.5:BD.C row.C.local.5:BG.C
col.A.local.4:PAD64.I col.A.local.4:row.A.local.4 col.B.local.8:row.A.local.5 col.C.local.8:row.C.local.5
Addnet a2d_cs P61.I BH.B
Colornet 3 a2d_cs
Netdelay a2d_cs BH.B 6.7
NProgram BI.20.1.0 BI.20.1.19 row.B.local.1:BH.B row.A.local.5:PAD16.I col.I.local.1:row.A.local.5
Addnet a2d_d0 P55.I TBUF.DI.1.I
Colornet 3 a2d_d0
Netdelay a2d_d0 TBUF.DI.1.I 2.4
NProgram DI.20.1.3 DI.20.1.16 row.D.local.4:PAD22.I col.I.local.4:TBUF.DI.1.I
Addnet a2d_d1 P56.I TBUF.CI.2.I

COMMUNICATIONS MFG. COMPANY
XILINX Configuration data

Colornet 3 a2d_d1
Netdelay a2d_d1 TBUF.CI.2.I 2.6
NProgram CI.20.1.13 CI.20.1.18 row.C.local.2:PAD20.I col.I.local.2:TBUF.CI.2.I
Addnet a2d_d2 P59.I TBUF.BI.1.I
Colornet 3 a2d_d2
Netdelay a2d_d2 TBUF.BI.1.I 1.0
NProgram col.I.local.4:PAD17.I col.I.local.4:TBUF.BI.1.I
Addnet a2d_d3 P57.I TBUF.AI.1.I
Colornet 3 a2d_d3
Netdelay a2d_d3 TBUF.AI.1.I 2.4
NProgram BI.20.1.1 BI.20.1.14 col.I.local.1:PAD19.I col.I.local.2:TBUF.AI.1.I
Addnet a2d_d4 P51.I TBUF.FI.1.I
Colornet 3 a2d_d4
Netdelay a2d_d4 TBUF.FI.1.I 2.4
NProgram FI.20.1.3 FI.20.1.16 row.F.local.4:PAD26.I col.I.local.4:TBUF.FI.1.I
Addnet a2d_d5 P47.I TBUF.HI.1.I
Colornet 3 a2d_d5
Netdelay a2d_d5 TBUF.HI.1.I 2.6
NProgram HI.20.1.3 HI.20.1.11 col.I.local.4:PAD31.I col.I.local.4:TBUF.HI.1.I
Addnet a2d_d6 P49.I TBUF.GI.1.I
Colornet 3 a2d_d6
Netdelay a2d_d6 TBUF.GI.1.I 2.4
NProgram GI.20.1.3 GI.20.1.16 row.G.local.4:PAD28.I col.I.local.4:TBUF.GI.1.I
Addnet a2d_d7 P48.I TBUF.GI.2.I
Colornet 3 a2d_d7
Netdelay a2d_d7 TBUF.GI.2.I 1.0
NProgram col.I.local.2:PAD30.I col.I.local.2:TBUF.GI.2.I
Addnet a2d_power P42.I
Colornet 3 a2d_power
Addnet a2d_rd BH.X TBUF.DI.1.T TBUF.CI.2.T TBUF.BI.1.T TBUF.AI.1.T TBUF.FI.1.T TBUF.GI.2.T TBUF.GI.1.T TBUF.HI.1.T
Colornet 3 a2d_rd
Netdelay a2d_rd TBUF.DI.1.T 10.4 TBUF.CI.2.T 10.4 TBUF.BI.1.T 10.4 TBUF.AI.1.T 10.4
TBUF.FI.1.T 10.4 TBUF.GI.2.T 10.4 TBUF.GI.1.T 10.4 TBUF.HI.1.T 10.4
NProgram BI.20.1.11 BI.20.1.16 col.I.local.4:BH.X col.I.long.1:TBUF.AI.1.T col.I.long.1:TBUF.BI.1.T
col.I.long.1:TBUF.DI.1.T col.I.long.1:TBUF.CI.2.T col.I.long.1:TBUF.FI.1.T col.I.long.1:TBUF.GI.1.T
col.I.long.1:TBUF.HI.1.T col.I.long.1:TBUF.GI.2.T col.I.long.1:row.B.local.4
Addnet call_pin P66.I TBUF.AF.1.I
Colornet 3 call_pin
Netdelay call_pin TBUF.AF.1.I 2.6
NProgram AF.20.1.6 AF.20.1.13 row.A.local.2:PAD11.I col.F.local.2:TBUF.AF.1.I
Addnet clk_rd DG.Y EF.RD EG.RD DH.RD DF.RD DE.RD GE.RD GF.RD HG.A HG.K
Colornet 3 clk_rd
Netdelay clk_rd EF.RD 13.4 EG.RD 12.5 DH.RD 12.9 DF.RD 12.9 DE.RD 12.9 GE.RD 24.7 GF.RD 24.7
HG.A 24.7 HG.K 20.4
NProgram FH.20.1.1 FH.20.1.12 EH.20.1.2 EH.20.1.13 HG.20.1.2 HG.20.1.13 GH.20.1.2 GH.20.1.16
GG.20.1.8 GG.20.1.12 FG.20.1.7 FG.20.1.17 FH.20.1.12 FH.20.1.17 row.H.long.2:HG.A
row.E.long.2:DE.RD row.E.long.2:DF.RD row.E.long.2:DH.RD row.H.long.2:GE.RD
row.H.long.2:GF.RD col.G.local.2:HG.K col.G.local.3:DG.Y row.F.local.3:EF.RD row.F.local.3:EG.RD
col.H.local.2:row.E.long.2 col.G.local.2:row.H.long.2 col.H.local.3:row.G.local.0
Addnet cnd_dcd_dsr P31.I HC.D
Colornet 3 cnd_dcd_dsr
Netdelay cnd_dcd_dsr HC.D 2.0
NProgram HC.D:PAD44.I

COMMUNICATIONS MFG. COMPANY
XILINX Configuration data

Addnet cnd_rxd P23.I HA.B
Colornet 3 cnd_rxd
Netdelay cnd_rxd HA.B 2.0
NProgram PAD50.I:HA.B
Addnet ctrl3_rd BB.X TBUF.GC.2.T TBUF.GC.1.T TBUF.HC.1.T TBUF.FC.1.T TBUF.AC.1.T
TBUF.BC.1.T TBUF.CC.2.T TBUF.DC.1.T
Colornet 3 ctrl3_rd
Netdelay ctrl3_rd TBUF.GC.2.T 9.8 TBUF.GC.1.T 9.8 TBUF.HC.1.T 9.8 TBUF.FC.1.T 9.8
TBUF.AC.1.T 9.8 TBUF.BC.1.T 9.8 TBUF.CC.2.T 9.8 TBUF.DC.1.T 9.8
NProgram BC.20.1.6 BC.20.1.14 col.C.local.1:BB.X col.C.long.1:TBUF.AC.1.T
col.C.long.1:TBUF.BC.1.T col.C.long.1:TBUF.DC.1.T col.C.long.1:TBUF.CC.2.T
col.C.long.1:TBUF.FC.1.T col.C.long.1:TBUF.GC.1.T col.C.long.1:TBUF.HC.1.T
col.C.long.1:TBUF.GC.2.T col.C.long.1:row.B.local.2
Addnet ctrl3_wr BB.Y FB.K EB.K AB.K CB.K
Colornet 3 ctrl3_wr
Netdelay ctrl3_wr FB.K 11.2 EB.K 11.2 AB.K 11.2 CB.K 11.2
NProgram BC.20.1.2 BC.20.1.12 AC.20.1.12 AC.20.1.16 col.B.long.3:AB.K col.B.long.3:CB.K
col.B.long.3:EB.K col.B.long.3:FB.K col.C.local.3:BB.Y col.B.long.3:row.A.local.4
col.C.local.3:row.B.local.0
Addnet div_d0 CD.X DG.E TBUF.DE.1.I
Colornet 3 div_d0
Netdelay div_d0 DG.E 7.0 TBUF.DE.1.I 1.5
NProgram DF.20.1.9 DF.20.1.15 DG.20.1.10 DG.20.1.15 col.G.local.5:DG.E col.E.local.4:CD.X
row.D.local.5:CD.X col.E.local.4:TBUF.DE.1.I
Addnet div_d1 CD.Y DG.A TBUF.CE.2.I
Colornet 3 div_d1
Netdelay div_d1 DG.A 10.1 TBUF.CE.2.I 2.5
NProgram DE.20.1.1 DE.20.1.6 DF.20.1.5 DF.20.1.18 DG.20.1.14 DG.20.1.19 col.G.local.1:DG.A
col.E.local.2:CD.Y col.E.local.2:TBUF.CE.2.I
Addnet div_d2 AD.X CF.E TBUF.BE.1.I
Colornet 3 div_d2
Netdelay div_d2 CF.E 6.7 TBUF.BE.1.I 1.4
NProgram CF.20.1.4 CF.20.1.10 BF.20.1.10 BF.20.1.15 col.F.local.5:CF.E col.E.local.4:AD.X
row.B.local.5:AD.X col.E.local.4:TBUF.BE.1.I
Addnet div_d3 AD.Y CF.A TBUF.AE.1.I
Colornet 3 div_d3
Netdelay div_d3 CF.A 9.7 TBUF.AE.1.I 2.4
NProgram CE.20.1.0 CE.20.1.5 BE.20.1.1 BE.20.1.14 CF.20.1.14 CF.20.1.19 col.F.local.1:CF.A
col.E.local.2:AD.Y col.E.local.2:TBUF.AE.1.I
Addnet div_d4 ED.X EE.B TBUF.FE.1.I
Colornet 3 div_d4
Netdelay div_d4 EE.B 2.2 TBUF.FE.1.I 1.0
NProgram ED.X:EE.B col.E.local.4:ED.X col.E.local.4:TBUF.FE.1.I
Addnet div_d5 ED.Y EE.E TBUF.HE.1.I
Colornet 3 div_d5
Netdelay div_d5 EE.E 4.9 TBUF.HE.1.I 4.3
NProgram FE.20.1.4 FE.20.1.10 GE.20.1.4 GE.20.1.11 col.E.local.5:EE.E col.E.local.5:ED.Y
col.E.local.4:TBUF.HE.1.I
Addnet div_d6 FD.X FE.B TBUF.GE.1.I
Colornet 3 div_d6
Netdelay div_d6 FE.B 2.2 TBUF.GE.1.I 1.0
NProgram FD.X:FE.B col.E.local.4:FD.X col.E.local.4:TBUF.GE.1.I
Addnet div_d7 FD.Y FE.A TBUF.GE.2.I
Colornet 3 div_d7

COMMUNICATIONS MFG. COMPANY
XILINX Configuration data

Netdelay div_d7 FE.A 3.5 TBUF.GE.2.I 5.4
NProgram GE.20.1.2 GE.20.1.13 col.E.local.3:FE.A col.E.local.3:FD.Y col.E.local.2:TBUF.GE.2.I
col.E.local.3:row.G.local.0
Addnet divide_rd BC.X TBUF.GE.2.T TBUF.GE.1.T TBUF.HE.1.T TBUF.FE.1.T TBUF.AE.1.T
TBUF.BE.1.T TBUF.CE.2.T TBUF.DE.1.T
Colornet 3 divide_rd
Netdelay divide_rd TBUF.GE.2.T 9.9 TBUF.GE.1.T 9.9 TBUF.HE.1.T 9.9 TBUF.FE.1.T 9.9
TBUF.AE.1.T 9.9 TBUF.BE.1.T 9.9 TBUF.CE.2.T 9.9 TBUF.DE.1.T 9.9
NProgram CE.20.1.6 CE.20.1.19 row.C.local.1:BC.X col.E.long.1:TBUF.AE.1.T
col.E.long.1:TBUF.BE.1.T col.E.long.1:TBUF.DE.1.T col.E.long.1:TBUF.CE.2.T
col.E.long.1:TBUF.FE.1.T col.E.long.1:TBUF.GE.1.T col.E.long.1:TBUF.HE.1.T
col.E.long.1:TBUF.GE.2.T col.E.long.1:row.C.local.2
Addnet divide_wr BC.Y FD.K ED.K AD.K CD.K
Colornet 3 divide_wr
Netdelay divide_wr FD.K 19.5 ED.K 19.5 AD.K 19.5 CD.K 19.5
NProgram HE.20.1.7 HE.20.1.11 IE.20.1.3 IE.20.1.18 BE.20.1.7 BE.20.1.16 col.D.long.3:AD.K
col.D.long.3:CD.K col.D.long.3:ED.K col.D.long.3:FD.K row.B.local.4:BC.Y col.E.long.2:row.B.local.3
col.D.long.3:row.I.local.2 col.E.long.2:row.H.local.3
Addnet dtmf_d0 P64.I TBUF.DG.1.I
Colornet 3 dtmf_d0
Netdelay dtmf_d0 TBUF.DG.1.I 4.6
NProgram BG.20.1.3 BG.20.1.10 CG.20.1.4 CG.20.1.11 col.G.local.4:PAD13.I
col.G.local.4:TBUF.DG.1.I
Addnet dtmf_d1 P67.I TBUF.CF.2.I
Colornet 3 dtmf_d1
Netdelay dtmf_d1 TBUF.CF.2.I 8.2
NProgram CF.20.1.0 CF.20.1.13 BF.20.1.0 BF.20.1.14 AF.20.1.14 AF.20.1.19 row.A.local.1:PAD10.I
col.F.local.2:TBUF.CF.2.I col.F.local.1:row.C.local.0
Addnet dtmf_d2 P5.I TBUF.BD.1.I
Colornet 3 dtmf_d2
Netdelay dtmf_d2 TBUF.BD.1.I 2.4
NProgram AD.20.1.11 AD.20.1.16 row.A.local.4:PAD5.I col.D.local.4:TBUF.BD.1.I
Addnet dtmf_d3 P65.I TBUF.AG.1.I
Colornet 3 dtmf_d3
Netdelay dtmf_d3 TBUF.AG.1.I 1.0
NProgram col.G.local.2:PAD12.I col.G.local.2:TBUF.AG.1.I
Addnet dtmf_power P38.I TBUF.HF.1.I P37.T P32.T P17.T P20.T
Colornet 3 dtmf_power
Netdelay dtmf_power TBUF.HF.1.I 3.3 P37.T 6.1 P32.T 13.0 P17.T 24.3 P20.T 22.1
NProgram FA.20.1.2 FA.20.1.11 EA.20.1.2 EA.20.1.12 HA.20.1.2 HA.20.1.12 GA.20.1.3 GA.20.1.12
HF.20.1.3 HF.20.1.11 IF.20.1.3 IF.20.1.17 ID.20.1.8 ID.20.1.15 IE.20.1.7 IE.20.1.16
col.F.local.4:PAD38.I col.A.local.4:PAD54.T col.A.local.3:PAD57.T row.I.local.3:PAD39.T
row.I.local.5:PAD43.T col.F.local.4:TBUF.HF.1.I col.A.local.3:row.I.long.1 col.F.local.4:row.I.long.1
col.E.local.8:row.I.local.3
Addnet dtmf_rd BD.Y TBUF.BD.1.T TBUF.AG.1.T TBUF.FG.1.T TBUF.HG.1.T TBUF.GG.1.T
TBUF.GG.2.T TBUF.CF.2.T TBUF.DG.1.T
Colornet 3 dtmf_rd
Netdelay dtmf_rd TBUF.BD.1.T 9.6 TBUF.AG.1.T 14.9 TBUF.FG.1.T 14.9 TBUF.HG.1.T 14.9
TBUF.GG.1.T 14.9 TBUF.GG.2.T 14.9 TBUF.CF.2.T 15.7 TBUF.DG.1.T 14.9
NProgram BD.20.1.0 BD.20.1.5 BE.20.1.0 BE.20.1.13 BE.20.1.0 BE.20.1.19 BF.20.1.7 BF.20.1.16
BG.20.1.6 BG.20.1.17 BG.20.1.6 BG.20.1.18 col.E.local.2:BD.Y row.B.local.4:BD.Y
col.G.long.1:TBUF.AG.1.T col.F.long.1:TBUF.CF.2.T col.G.long.1:TBUF.DG.1.T
col.G.long.1:TBUF.FG.1.T col.G.long.1:TBUF.GG.1.T col.G.long.1:TBUF.HG.1.T

COMMUNICATIONS MFG. COMPANY
XILINX Configuration data col.G.long.1:TBUF.GG.2.T col.D.local.1:TBUF.BD.1.T col.F.long.1:row.B.local.2
col.G.long.1:row.B.local.2
Addnet d0in P15.I CD.C CB.C P4.O
Colornet 3 d0in
Netdelay d0in CD.C 14.0 CB.C 8.9 P4.O 16.4
NProgram BD.20.1.2 BD.20.1.11 CD.20.1.3 CD.20.1.10 DD.20.1.4 DD.20.1.15 DC.20.1.9 DC.20.1.15
DB.20.1.9 DB.20.1.16 col.D.local.5:CD.C row.D.local.5:CB.C col.D.local.3:PAD6.O
row.D.local.4:PAD59.I
Addnet d0out TBUF.DH.1.O TBUF.DC.1.O TBUF.DG.1.O TBUF.DE.1.O TBUF.DI.1.O P15.O
Colornet 3 d0out
Netdelay d0out P15.O 4.6
NProgram row.D.long.1:PAD59.O row.D.long.1:TBUF.DC.1.O row.D.long.1:TBUF.DE.1.O
row.D.long.1:TBUF.DG.1.O row.D.long.1:TBUF.DH.1.O row.D.long.1:TBUF.DI.1.O
Addnet d1in P14.I CD.B CB.B P8.O
Colornet 3 d1in
Netdelay d1in CD.B 12.2 CB.B 9.6 P8.O 10.3
NProgram BB.20.1.2 BB.20.1.11 CB.20.1.3 CB.20.1.17 CC.20.1.7 CC.20.1.16 CB.20.1.8 CB.20.1.17
CD.20.1.8 CD.20.1.17 row.C.local.4:CB.B row.C.local.4:CD.B col.B.local.3:PAD2.O
row.C.local.3:PAD60.I
Addnet d1out TBUF.CA.2.O TBUF.CC.2.O TBUF.CF.2.O TBUF.CE.2.O TBUF.CI.2.O P14.O
Colornet 3 d1out
Netdelay d1out P14.O 4.0
NProgram row.C.long.2:PAD60.O row.C.long.2:TBUF.CA.2.O row.C.long.2:TBUF.CC.2.O
row.C.long.2:TBUF.CE.2.O row.C.long.2:TBUF.CF.2.O row.C.long.2:TBUF.CI.2.O
Addnet d2a_power P41.I TBUF.GH.2.I P4.T P8.T P6.T P2.T P46.T P19.T P16.T P50.T
Colornet 3 d2a_power
Netdelay d2a_power TBUF.GH.2.I 4.0 P4.T 19.0 P8.T 19.0 P6.T 19.0 P2.T 19.0 P46.T 9.7 P19.T 28.7
P16.T 33.6 P50.T 9.7
NProgram GA.20.1.0 GA.20.1.9 IG.20.1.3 IG.20.1.7 FA.20.1.0 FA.20.1.14 EA.20.1.1 EA.20.1.14
HB.20.1.4 HB.20.1.11 HH.20.1.1 HH.20.1.13 DA.20.1.5 DA.20.1.13 HH.20.1.5 HH.20.1.13 GB.20.1.10
GB.20.1.15 row.A.long.2:PAD2.T row.A.long.2:PAD4.T row.A.long.2:PAD6.T row.A.long.2:PAD8.T
col.A.long.1:PAD58.T col.I.long.2:PAD32.T col.I.long.2:PAD27.T col.H.local.2:PAD35.I
col.A.local.1:PAD56.T row.I.local.3:PAD35.I col.H.local.2:TBUF.GH.2.I col.G.long.2:row.A.long.2
col.A.long.1:row.D.local.1 col.I.long.2:row.H.local.1
NProgram col.B.local.4:row.I.long.2 col.G.long.2:row.I.local.3 col.G.local.4:row.I.long.2
col.A.local.7:row.G.local.5
Addnet d2in P12.I AD.B AB.D P6.O
Colornet 3 d2in
Netdelay d2in AD.B 11.0 AB.D 8.6 P6.O 10.8
NProgram BB.20.1.4 BB.20.1.9 AB.20.1.5 AB.20.1.10 BD.20.1.4 BD.20.1.15 BB.20.1.8 BB.20.1.16
BB.20.1.9 BB.20.1.16 BC.20.1.9 BC.20.1.16 col.D.local.5:AD.B row.B.local.4:AB.D
row.A.local.1:PAD4.O row.B.local.4:PAD63.I
Addnet d2out TBUF.BH.1.O TBUF.BC.1.O TBUF.BD.1.O TBUF.BE.1.O TBUF.BI.1.O P12.O
Colornet 3 d2out
Netdelay d2out P12.O 4.6
NProgram row.B.long.1:PAD63.O row.B.long.1:TBUF.BC.1.O row.B.long.1:TBUF.BD.1.O
row.B.long.1:TBUF.BE.1.O row.B.long.1:TBUF.BH.1.O row.B.long.1:TBUF.BI.1.O
Addnet d3in P68.I AD.A AB.B P2.O
Colornet 3 d3in
Netdelay d3in AD.A 8.2 AB.B 10.8 P2.O 8.2
NProgram AD.20.1.5 AD.20.1.18 AC.20.1.6 AC.20.1.18 AE.20.1.6 AE.20.1.19 row.A.local.1:AD.A
row.A.local.2:AB.B row.A.local.2:PAD9.I row.A.local.1:PAD8.O
Addnet d3out TBUF.AF.1.O TBUF.AC.1.O TBUF.AG.1.O TBUF.AE.1.O TBUF.AI.1.O P68.O
Colornet 3 d3out

COMMUNICATIONS MFG. COMPANY
XILINX Configuration data

Netdelay d3out P68.O 7.6
NProgram col.E.local.1:PAD9.O row.A.long.3:TBUF.AC.1.O row.A.long.3:TBUF.AE.1.O
row.A.long.3:TBUF.AF.1.O row.A.long.3:TBUF.AG.1.O row.A.long.3:TBUF.AI.1.O
col.E.local.1:row.A.long.3
Addnet d4in P40.I ED.E EB.C P46.O P37.O
Colornet 3 d4in
Netdelay d4in ED.E 19.5 EB.C 26.0 P46.O 13.7 P37.O 12.5
NProgram HE.20.1.0 HE.20.1.5 GE.20.1.0 GE.20.1.14 HF.20.1.6 HF.20.1.13 HG.20.1.6 HG.20.1.14
FC.20.1.6 FC.20.1.17 FD.20.1.5 FD.20.1.18 HF.20.1.6 HF.20.1.19 HH.20.1.7 HH.20.1.18 HI.20.1.12
HI.20.1.17 FE.20.1.14 FE.20.1.19 HG.20.1.14 HG.20.1.18 row.F.local.1:ED.E row.F.local.3:EB.C
col.G.local.1:PAD36.I col.I.local.3:PAD32.O col.F.local.2:PAD39.O col.E.local.1:row.H.local.0
col.D.local.8:row.F.local.1
Addnet d4out TBUF.FH.1.O TBUF.FC.1.O TBUF.FG.1.O TBUF.FE.1.O TBUF.FI.1.O P40.O
Colornet 3 d4out
Netdelay d4out P40.O 18.7
NProgram HH.20.1.0 HH.20.1.14 FH.20.1.2 FH.20.1.13 GH.20.1.1 GH.20.1.14 IH.20.1.0 IH.20.1.16
row.I.local.4:PAD36.O row.F.long.1:TBUF.FC.1.O row.F.long.1:TBUF.FE.1.O
row.F.long.1:TBUF.FG.1.O row.F.long.1:TBUF.FH.1.O row.F.long.1:TBUF.FI.1.O
col.H.local.3:row.F.long.1 col.H.local.1:row.H.local.0
Addnet d5in P36.I ED.A EB.E P19.O P32.O
Colornet 3 d5in
Netdelay d5in ED.A 17.2 EB.E 20.6 P19.O 22.8 P32.O 13.1
NProgram FB.20.1.0 FB.20.1.5 HD.20.1.1 HD.20.1.5 GD.20.1.0 GD.20.1.13 HD.20.1.1 HD.20.1.12
FD.20.1.0 FD.20.1.14 FC.20.1.5 FC.20.1.19 EB.20.1.14 EB.20.1.19 FD.20.1.14 FD.20.1.19 HE.20.1.14
HE.20.1.19 col.D.local.1:ED.A row.F.local.1:EB.E col.E.local.1:PAD40.I col.D.local.3:PAD43.O
row.E.local.1:PAD56.O col.D.local.1:row.G.local.0 col.D.local.3:row.I.local.11
Addnet d5out TBUF.HF.1.O TBUF.HC.1.O TBUF.HG.1.O TBUF.HE.1.O TBUF.HI.1.O P36.O
Colornet 3 d5out
Netdelay d5out P36.O 13.1
NProgram IE.20.1.1 IE.20.1.8 HE.20.1.2 HE.20.1.13 row.I.local.4:PAD40.O row.H.long.1:TBUF.HC.1.O
row.H.long.1:TBUF.HE.1.O row.H.long.1:TBUF.HF.1.O row.H.long.1:TBUF.HG.1.O
row.H.long.1:TBUF.HI.1.O col.E.local.3:row.H.long.1
Addnet d6in P21.I FD.C FB.C P16.O P17.O
Colornet 3 d6in
Netdelay d6in FD.C 9.9 FB.C 7.7 P16.O 9.5 P17.O 9.4
NProgram FA.20.1.3 FA.20.1.10 EA.20.1.3 EA.20.1.11 EA.20.1.4 EA.20.1.11 GD.20.1.4 GD.20.1.15
GC.20.1.9 GC.20.1.15 GB.20.1.9 GB.20.1.16 col.D.local.5:FD.C row.G.local.5:FB.C
col.A.local.5:PAD53.I col.A.local.4:PAD58.O col.A.local.5:PAD57.O row.G.local.4:PAD53.I
Addnet d6out TBUF.GB.1.O TBUF.GC.1.O TBUF.GG.1.O TBUF.GE.1.O TBUF.GI.1.O P21.O
Colornet 3 d6out
Netdelay d6out P21.O 4.6
NProgram row.G.long.1:PAD53.O row.G.long.1:TBUF.GB.1.O row.G.long.1:TBUF.GC.1.O
row.G.long.1:TBUF.GE.1.O row.G.long.1:TBUF.GG.1.O row.G.long.1:TBUF.GI.1.O
Addnet d7in P22.I FD.A FB.A P50.O P20.O
Colornet 3 d7in
Netdelay d7in FD.A 9.9 FB.A 9.9 P50.O 9.9 P20.O 9.9
NProgram GA.20.1.1 GA.20.1.14 row.F.long.2:FB.A row.F.long.2:FD.A row.F.long.2:PAD54.O
row.F.long.2:PAD27.O col.A.local.1:PAD52.I col.A.local.2:row.F.long.2
Addnet d7out TBUF.GH.2.O TBUF.GC.2.O TBUF.GG.2.O TBUF.GE.2.O TBUF.GI.2.O P22.O
Colornet 3 d7out
Netdelay d7out P22.O 4.0
NProgram row.G.long.2:PAD52.O row.G.long.2:TBUF.GC.2.O row.G.long.2:TBUF.GE.2.O
row.G.long.2:TBUF.GG.2.O row.G.long.2:TBUF.GH.2.O row.G.long.2:TBUF.GI.2.O
Addnet io_rd P63.I BG.D BB.D BD.D BC.D BH.D

COMMUNICATIONS MFG. COMPANY
XILINX Configuration data

Flagnet Critical io_rd
Colornet 3 io_rd
Netdelay io_rd BG.D 10.6 BB.D 10.6 BD.D 10.6 BC.D 10.6 BH.D 10.6
NProgram BH.20.1.4 BH.20.1.11 row.C.long.1:BB.D row.C.long.1:BC.D row.C.long.1:BD.D
row.C.long.1:BG.D row.C.long.1:BH.D col.H.local.5:PAD14.I col.H.local.4:row.C.long.1
Addnet io_wr P3.I BB.E BD.E BC.E
Flagnet Critical io_wr
Colornet 3 io_wr
Netdelay io_wr BB.E 12.0 BD.E 15.3 BC.E 11.1
NProgram AC.20.1.7 AC.20.1.17 AD.20.1.7 AD.20.1.17 AD.20.1.8 AD.20.1.17 col.B.long.2:BB.E
col.C.long.2:BC.E col.D.long.2:BD.E row.A.local.4:PAD7.I col.B.long.2:row.A.local.3
col.C.long.2:row.A.local.3 col.D.long.2:row.A.local.3 col.D.local.8:row.A.local.3
Addnet logic0 FF.X TBUF.GG.2.I TBUF.GG.1.I TBUF.HG.1.I TBUF.FG.1.I
Colornet 3 logic0
Netdelay logic0 TBUF.GG.2.I 3.1 TBUF.GG.1.I 2.8 TBUF.HG.1.I 4.1 TBUF.FG.1.I 4.1
NProgram FG.20.1.3 FG.20.1.11 GG.20.1.3 GG.20.1.11 GG.20.1.5 GG.20.1.13 col.G.local.4:FF.X
row.G.local.1:FF.X col.G.local.2:TBUF.GG.2.I col.G.local.4:TBUF.FG.1.I col.G.local.4:TBUF.GG.1.I
col.G.local.4:TBUF.HG.1.I
Addnet l1_riin P13.I BA.B TBUF.CA.2.I
Colornet 3 l1_riin
Netdelay l1_riin BA.B 2.4 TBUF.CA.2.I 2.4
NProgram PAD62.I:BA.B CA.20.1.0 CA.20.1.13 col.A.local.1:PAD62.I col.A.local.2:TBUF.CA.2.I
Addnet l2_riin P62.I TBUF.BH.1.I
Colornet 3 l2_riin
Netdelay l2_riin TBUF.BH.1.I 1.0
NProgram col.H.local.4:PAD15.I col.H.local.4:TBUF.BH.1.I
Addnet m_c CB.X HA.A HC.A TBUF.DC.1.I
Colornet 3 m_c
Netdelay m_c HA.A 19.2 HC.A 18.3 TBUF.DC.1.I 2.8
NProgram HC.20.1.2 HC.20.1.7 DC.20.1.3 DC.20.1.11 FC.20.1.2 FC.20.1.12 GC.20.1.2 GC.20.1.12
EC.20.1.3 EC.20.1.12 HC.20.1.2 HC.20.1.16 HB.20.1.8 HB.20.1.17 row.H.local.3:HA.A
row.H.local.3:HC.A col.C.local.4:CB.X col.C.local.4:TBUF.DC.1.I col.C.local.3:row.H.local.0
Addnet masterread BH.Y P15.T P14.T P12.T P68.T P40.T P36.T P21.T P22.T
Colornet 3 masterread
Netdelay masterread P15.T 30.7 P14.T 30.7 P12.T 30.7 P68.T 13.5 P40.T 19.5 P36.T 21.6 P21.T 30.7
P22.T 30.7
NProgram BB.20.1.0 BB.20.1.13 CB.20.1.1 CB.20.1.12 BI.20.1.4 BI.20.1.10 AH.20.1.5 AH.20.1.14
CI.20.1.2 CI.20.1.17 IF.20.1.6 IF.20.1.18 IG.20.1.6 IG.20.1.18 IH.20.1.7 IH.20.1.18 CB.20.1.12
CB.20.1.16 row.A.long.1:PAD9.T col.I.local.3:BH.Y col.I.local.5:BH.Y col.A.long.2:PAD60.T
col.A.long.2:PAD52.T col.A.long.2:PAD53.T col.A.long.2:PAD63.T col.A.long.2:PAD59.T
row.I.local.2:PAD40.T row.I.local.2:PAD36.T col.B.local.1:row.A.long.1 col.H.local.1:row.A.long.1
col.A.long.2:row.C.local.4
NProgram col.H.long.2:row.C.local.3 col.E.local.6:row.A.long.1 col.H.long.2:row.I.local.3
col.B.local.1:row.B.local.0 col.I.local.5:row.A.local.1 col.H.local.8:row.I.local.3
Addnet match1 FE.Y EE.D
Colornet 3 match1
Netdelay match1 EE.D 2.0
NProgram EE.D:FE.Y
Addnet match2 EE.Y CF.C
Colornet 3 match2
Netdelay match2 CF.C 6.7
NProgram EG.20.1.2 EG.20.1.16 DG.20.1.12 DG.20.1.17 row.D.local.3:CF.C row.E.local.4:EE.Y
Addnet match3 CF.Y DG.D
Colornet 3 match3

COMMUNICATIONS MFG. COMPANY
XILINX Configuration data

Netdelay match3 DG.D 5.4
NProgram DG.20.1.4 DG.20.1.11 col.G.local.4:DG.D col.G.local.5:CF.Y
Addnet mc_ttl CB.Y P28.T P27.T P34.T TBUF.CC.2.I
Colornet 3 mc_ttl
Netdelay mc_ttl P28.T 18.6 P27.T 18.6 P34.T 18.6 TBUF.CC.2.I 2.2
NProgram CC.20.1.5 CC.20.1.13 CD.20.1.6 CD.20.1.19 col.C.local.2:CB.Y row.I.long.3:PAD41.T row.I.long.3:PAD47.T row.I.long.3:PAD48.T col.C.local.2:TBUF.CC.2.I col.D.long.1:row.I.long.3 col.D.long.1:row.C.local.2
Addnet modem_dcd P33.I HC.B
Colornet 3 modem_dcd
Netdelay modem_dcd HC.B 4.7
NProgram HD.20.1.14 HD.20.1.19 row.H.local.1:HC.B col.D.local.1:PAD42.I
Addnet modem_dsr P29.I HC.C
Colornet 3 modem_dsr
Netdelay modem_dsr HC.C 5.4
NProgram IC.20.1.7 IC.20.1.18 row.I.local.3:HC.C row.I.local.2:PAD46.I
Addnet modem_rxd P24.I HA.E
Colornet 3 modem_rxd
Netdelay modem_rxd HA.E 3.4
NProgram col.A.local.5:HA.E col.A.local.5:PAD49.I
Addnet on_off_kb P7.I BA.C TBUF.GB.1.I
Colornet 3 on_off_kb
Netdelay on_off_kb BA.C 11.9 TBUF.GB.1.I 14.8
NProgram BB.20.1.3 BB.20.1.10 CB.20.1.4 CB.20.1.10 DB.20.1.4 DB.20.1.10 EB.20.1.4 EB.20.1.10 FB.20.1.4 FB.20.1.11 CB.20.1.4 CB.20.1.15 row.C.local.5:BA.C col.B.local.4:PAD3.I col.B.local.4:TBUF.GB.1.I
Addnet on_off_mask AB.X BA.A TBUF.BC.1.I
Colornet 3 on_off_mask
Netdelay on_off_mask BA.A 7.3 TBUF.BC.1.I 2.2
NProgram BC.20.1.3 BC.20.1.17 BB.20.1.7 BB.20.1.17 row.B.local.3:BA.A col.C.local.4:AB.X col.C.local.4:TBUF.BC.1.I
Addnet pld3_cs P58.I BG.A BB.A BD.A BC.A BH.A
Flagnet Critical pld3_cs
Colornet 3 pld3_cs
Netdelay pld3_cs BG.A 10.2 BB.A 10.2 BD.A 10.2 BC.A 10.2 BH.A 10.2
NProgram BI.20.1.13 BI.20.1.18 row.B.long.2:BB.A row.B.long.2:BC.A row.B.long.2:BD.A row.B.long.2:BG.A row.B.long.2:BH.A row.B.local.2:PAD18.I col.I.local.2:row.B.long.2
Addnet pwr_toggle BA.Y GB.D GB.K
Colornet 3 pwr_toggle
Netdelay pwr_toggle GB.D 16.7 GB.K 16.7
NProgram DB.20.1.1 DB.20.1.12 EB.20.1.2 EB.20.1.12 FB.20.1.2 FB.20.1.12 CB.20.1.2 CB.20.1.13 GB.20.1.2 GB.20.1.13 col.B.local.2:GB.D col.B.local.2:GB.K col.B.local.3:BA.Y col.B.local.3:row.G.local.0
Addnet pwr_up GB.Y P30.O TBUF.GC.2.I
Colornet 3 pwr_up
Netdelay pwr_up P30.O 5.3 TBUF.GC.2.I 1.6
NProgram HC.20.1.1 HC.20.1.12 col.C.local.2:GB.Y col.C.local.3:PAD45.O col.C.local.2:TBUF.GC.2.I
Addnet pwr_up_xor FB.X GB.A TBUF.GC.1.I
Colornet 3 pwr_up_xor
Netdelay pwr_up_xor GB.A 5.6 TBUF.GC.1.I 1.7
NProgram GC.20.1.3 GC.20.1.17 row.G.local.3:GB.A col.C.local.4:FB.X col.C.local.4:TBUF.GC.1.I
Addnet ri_mask AB.Y BA.E TBUF.AC.1.I
Colornet 3 ri_mask
Netdelay ri_mask BA.E 9.3 TBUF.AC.1.I 2.4

COMMUNICATIONS MFG. COMPANY
XILINX Configuration data

NProgram BC.20.1.1 BC.20.1.13 CC.20.1.1 CC.20.1.19 CB.20.1.5 CB.20.1.19 row.C.local.1:BA.E
col.C.local.2:AB.Y col.C.local.2:TBUF.AC.1.I
Addnet status_rd BG.Y TBUF.GH.2.T TBUF.GB.1.T TBUF.HF.1.T TBUF.FH.1.T TBUF.AF.1.T
TBUF.BH.1.T TBUF.CA.2.T TBUF.DH.1.T
Colornet 3 status_rd
Netdelay status_rd TBUF.GH.2.T 20.0 TBUF.GB.1.T 28.6 TBUF.HF.1.T 28.5 TBUF.FH.1.T 20.0
TBUF.AF.1.T 12.4 TBUF.BH.1.T 20.0 TBUF.CA.2.T 24.0 TBUF.DH.1.T 20.0
NProgram DH.20.1.1 DH.20.1.6 DA.20.1.4 DA.20.1.9 BF.20.1.4 BF.20.1.9 EB.20.1.0 EB.20.1.13
FB.20.1.1 FB.20.1.14 CH.20.1.2 CH.20.1.13 GF.20.1.6 GF.20.1.14 DA.20.1.9 DA.20.1.14 BG.20.1.8
BG.20.1.15 GG.20.1.6 GG.20.1.18 GH.20.1.6 GH.20.1.18 BH.20.1.12 BH.20.1.16 DI.20.1.13 DI.20.1.18
col.H.local.3:BG.Y col.H.long.1:TBUF.BH.1.T col.H.long.1:TBUF.DH.1.T col.H.long.1:TBUF.FH.1.T
col.H.long.1:TBUF.GH.2.T col.B.local.1:TBUF.GB.1.T col.A.local.5:TBUF.CA.2.T
col.F.local.1:TBUF.HF.1.T col.F.local.5:TBUF.AF.1.T
NProgram col.A.local.1:row.D.long.2 col.B.local.1:row.D.long.2 col.H.long.1:row.D.local.2
col.H.long.1:row.G.local.2 col.I.local.2:row.D.long.2 col.B.local.1:row.E.local.0
Addnet sys_clk P43.I EF.D EF.K
Colornet 3 sys_clk
Netdelay sys_clk EF.D 15.3 EF.K 15.3
NProgram IH.20.1.4 IH.20.1.5 GH.20.1.4 GH.20.1.10 HH.20.1.4 HH.20.1.10 FG.20.1.9 FG.20.1.16
FH.20.1.10 FH.20.1.15 row.F.local.4:EF.D row.F.local.4:EF.K row.I.local.1:PAD33.I
Addnet sys_4 EF.X EG.E EG.K
Colornet 3 sys_4
Netdelay sys_4 EG.E 3.5 EG.K 8.4
NProgram FG.20.1.1 FG.20.1.5 col.G.local.2:EG.K row.F.local.1:EG.E row.F.local.1:EF.X
col.G.local.8:row.F.local.1
Addnet sys_16 EG.X DH.D DH.K
Colornet 3 sys_16
Netdelay sys_16 DH.D 5.4 DH.K 5.4
NProgram EH.20.1.1 EH.20.1.14 col.H.local.2:DH.D col.H.local.2:DH.K col.H.local.1:EG.X
Addnet sys_64 DH.X DF.E DF.K DG.C
Colornet 3 sys_64
Netdelay sys_64 DF.E 8.7 DF.K 13.6 DG.C 2.6
NProgram DH.X:DG.C EF.20.1.1 EF.20.1.5 EI.20.1.0 EI.20.1.19 EG.20.1.5 EG.20.1.19 EH.20.1.5
EH.20.1.19 col.F.local.2:DF.K row.E.local.1:DF.E col.I.local.1:DH.X col.F.local.8:row.E.local.1
Addnet sys_128 DF.X DG.B
Colornet 3 sys_128
Netdelay sys_128 DG.B 2.0
NProgram DF.X:DG.B
Addnet sys_2048 GE.X EE.C
Colornet 3 sys_2048
Netdelay sys_2048 EE.C 12.3
NProgram GG.20.1.0 GG.20.1.14 HG.20.1.0 HG.20.1.19 FF.20.1.5 FF.20.1.19 FG.20.1.14 FG.20.1.19
row.F.local.1:EE.C row.H.local.1:GE.X col.G.local.1:row.G.local.0
Addnet sys_256 DF.Y DE.A DE.K CF.D
Colornet 3 sys_256
Netdelay sys_256 DE.A 10.2 DE.K 12.3 CF.D 2.8
NProgram CF.D:DF.Y DE.20.1.2 DE.20.1.7 DE.20.1.2 DE.20.1.13 DG.20.1.8 DG.20.1.16 DF.20.1.8
DF.20.1.17 col.E.local.2:DE.K row.D.local.3:DE.A row.D.local.4:DF.Y
Addnet sys_512 DE.X CF.B
Colornet 3 sys_512
Netdelay sys_512 CF.B 5.3
NProgram DF.20.1.2 DF.20.1.11 col.F.local.3:CF.B col.F.local.4:DE.X
Addnet sys_1024 DE.Y GE.D GE.K EE.A
Colornet 3 sys_1024

COMMUNICATIONS MFG. COMPANY
XILINX Configuration data

Netdelay sys_1024 GE.D 13.5 GE.K 13.5 EE.A 2.6
NProgram DE.Y:EE.A GF.20.1.2 GF.20.1.12 EF.20.1.4 EF.20.1.11 FF.20.1.3 FF.20.1.12 HF.20.1.2
HF.20.1.16 row.H.local.4:GE.D row.H.local.4:GE.K col.F.local.5:DE.Y col.F.local.3:row.H.local.0
Addnet sys_4096 GE.Y GF.D GF.K FE.D
Colornet 3 sys_4096
Netdelay sys_4096 GF.D 4.0 GF.K 4.0 FE.D 2.2
NProgram FE.D:GE.Y col.F.local.2:GF.D col.F.local.2:GF.K col.F.local.2:GE.Y
Addnet sys_8192 GF.Y FE.C
Colornet 3 sys_8192
Netdelay sys_8192 FE.C 6.7
NProgram GF.20.1.9 GF.20.1.15 GG.20.1.10 GG.20.1.15 row.G.local.5:FE.C col.G.local.5:GF.Y
Addnet time_int_en EB.X EF.B TBUF.FC.1.I
Colornet 3 time_int_en
Netdelay time_int_en EF.B 9.0 TBUF.FC.1.I 1.7
NProgram FF.20.1.4 FF.20.1.15 FD.20.1.9 FD.20.1.15 FE.20.1.9 FE.20.1.15 col.F.local.5:EF.B
col.C.local.4:EB.X row.F.local.5:EB.X col.C.local.4:TBUF.FC.1.I
Addnet timed_int HG.X P39.O
Colornet 3 timed_int
Netdelay timed_int P39.O 9.2
NProgram IG.20.1.9 IG.20.1.15 IH.20.1.9 IH.20.1.15 row.I.local.5:HG.X row.I.local.5:PAD37.O
col.G.local.8:row.I.local.5
Addnet tone_validin P54.I TBUF.FH.1.I
Colornet 3 tone_validin
Netdelay tone_validin TBUF.FH.1.I 4.3
NProgram EH.20.1.4 EH.20.1.11 DH.20.1.9 DH.20.1.10 row.D.local.5:PAD23.I
col.H.local.4:TBUF.FH.1.I
Addnet uart_dcd HC.Y P27.O
Colornet 3 uart_dcd
Netdelay uart_dcd P27.O 10.7
NProgram ID.20.1.1 ID.20.1.16 IC.20.1.8 IC.20.1.15 IB.20.1.9 IB.20.1.16 col.D.local.2:HC.Y
row.I.local.4:PAD48.O
Addnet uart_dsr HC.X P34.O
Colornet 3 uart_dsr
Netdelay uart_dsr P34.O 3.5
NProgram row.I.local.5:HC.X row.I.local.5:PAD41.O
Addnet uart_rxd HA.Y P28.O
Colornet 3 uart_rxd
Netdelay uart_rxd P28.O 2.0
NProgram HA.Y:PAD47.O
Editblk BG
Base F
Config F:A:C:B:D Y:F X: DY: DX: RSTDIR: CLK: ENCLK:
Equate F = A+C+B+D
Endblk
Editblk BB
Base FG
Config F:A:C:B:D G:A:C:B:E X:F Y:G DX: DY: RSTDIR: CLK: ENCLK:
Equate F = A+C+~B+D
Equate G = A+C+~B+E
Endblk
Editblk BD
Base FG
Config G:A:C:B:D F:A:C:B:E Y:G X: DY: DX: RSTDIR: CLK: ENCLK:
Equate G = A+~C+B+D

COMMUNICATIONS MFG. COMPANY
XILINX Configuration data

Equate F = A+~C+B+E
Endblk
Nameblk P53 ac_pres
Editblk P53
Base IO
Config IN:I:PULLUP OUT: TRI:
Endblk
Editblk BC
Base FG
Config F:A:C:B:D G:A:C:B:E X:F Y:G DX: DY: RSTDIR: CLK: ENCLK:
Equate F = A+~C+~B+D
Equate G = A+~C+~B+E
Endblk
Editblk BH
Base FG
Config G:A:B:D F:B:D Y:G X:F DY: DX: RSTDIR: CLK: ENCLK:
Equate G = B*A+D
Equate F = B+D
Endblk
Nameblk P9 a0
Editblk P9
Base IO
Config IN:I:PULLUP OUT: TRI:
Endblk
Nameblk P11 a1
Editblk P11
Base IO
Config IN:I:PULLUP OUT: TRI:
Endblk
Nameblk P61 a2d_cs
Editblk P61
Base IO
Config IN:I:PULLUP OUT: TRI:
Endblk
Nameblk P55 a2d_d0
Editblk P55
Base IO
Config IN:I OUT: TRI:
Endblk
Nameblk P56 a2d_d1
Editblk P56
Base IO
Config IN:I OUT: TRI:
Endblk
Nameblk P59 a2d_d2
Editblk P59
Base IO
Config IN:I OUT: TRI:
Endblk
Nameblk P57 a2d_d3
Editblk P57
Base IO
Config IN:I OUT: TRI:
Endblk COMMUNICATIONS MFG. COMPANY
XILINX Configuration data Nameblk P51 a2d_d4
Editblk P51
Base IO
Config IN:I OUT: TRI:
Endblk
Nameblk P47 a2d_d5
Editblk P47
Base IO
Config IN:I OUT: TRI:
Endblk
Nameblk P49 a2d_d6
Editblk P49
Base IO
Config IN:I OUT: TRI:
Endblk
Nameblk P48 a2d_d7
Editblk P48
Base IO
Config IN:I OUT: TRI:
Endblk
Nameblk P42 a2d_power
Editblk P42
Base IO
Config IN:I OUT: TRI:
Endblk
Editblk FD
Base FG
Config G:A F:C Y:QY X:QX DY:G DX:F RSTDIR: CLK:K ENCLK:
Equate G = A
Equate F = C
Endblk
Editblk ED
Base FG
Config G:A F:E Y:QY X:QX DY:G DX:F RSTDIR: CLK:K ENCLK:
Equate G = A
Equate F = E
Endblk
Editblk AD
Base FG
Config G:A F:B Y:QY X:QX DY:G DX:F RSTDIR: CLK:K:NOT ENCLK:
Equate G = A
Equate F = B
Endblk
Editblk CD
Base FG
Config G:B F:C Y:QY X:QX DY:G DX:F RSTDIR: CLK:K:NOT ENCLK:
Equate G = B
Equate F = C
Endblk
Editblk EF
Base FG
Config G:D:B:QY F:D:QY:QX Y: X:QX DY:G DX:F RSTDIR:RD CLK:K ENCLK:
Equate G = ~QY*B*~D+QY*B*D
Equate F = QX*~D+QX*~QY+~QX*QY*D COMMUNICATIONS MFG. COMPANY
XILINX Configuration data Endblk
Nameblk P66 call_p
Editblk P66
Base IO
Config IN:I OUT: TRI:
Endblk
Editblk EG
Base FG
Config G:E:QY F:E:QY:QX Y: X:QX DY:G DX:F RSTDIR:RD CLK:K ENCLK:
Equate G = ~QY*E+QY*~E
Equate F = QX*~E+QX*~QY+~QX*QY*E
Endblk
Editblk DH
Base FG
Config G:D:QY F:D:QY:QX Y: X:QX DY:G DX:F RSTDIR:RD CLK:K ENCLK:
Equate G = ~QY*D+QY*~D
Equate F = QX*~D+QX*~QY+~QX*QY*D
Endblk
Editblk DF
Base FG
Config F:E:QX G:E:QX:QY X:QX Y:QY DX:F DY:G RSTDIR:RD CLK:K ENCLK:
Equate F = ~QX*E+QX*~E
Equate G = QY*~E+QY*~QX+~QY*QX*E
Endblk
Editblk DE
Base FG
Config F:A:QX G:A:QX:QY X:QX Y:QY DX:F DY:G RSTDIR:RD CLK:K ENCLK:
Equate F = ~QX*A+QX*~A
Equate G = QY*~A+QY*~QX+~QY*QX*A
Endblk
Editblk GE
Base FG
Config F:D:QX G:D:QX:QY X:QX Y:QY DX:F DY:G RSTDIR:RD CLK:K ENCLK:
Equate F = ~QX*D+QX*~D
Equate G = QY*~D+QY*~QX+~QY*QX*D
Endblk
Editblk GF
Base FG
Config G:D:QY F:D:QY:QX Y:QY X: DY:G DX:F RSTDIR:RD CLK:K ENCLK:
Equate G = ~QY*D+QY*~D
Equate F = QX*~D+QX*~QY+~QX*QY*D
Endblk
Nameblk P31 cnd_dcd_dsr
Editblk P31
Base IO
Config IN:I:PULLUP OUT: TRI:
Endblk
Nameblk P23 cnd_rxd
Editblk P23
Base IO
Config IN:I:PULLUP OUT: TRI:
Endblk
Editblk FE
Base FG COMMUNICATIONS MFG. COMPANY
XILINX Configuration data Config G:A:C:B:D F: Y:G X: DY: DX: RSTDIR: CLK: ENCLK:
Equate G = ~C*A+C*~A+~D*B+D*~B
Endblk
Editblk EE
Base F
Config F:E:C:B:A:D Y:F X: DY: DX: RSTDIR: CLK: ENCLK:
Equate F = E*~C+~E*C+B*~A+~B*A+D
Endblk
Editblk CF
Base F
Config F:A:B:E:D:C Y:F X: DY: DX: RSTDIR: CLK: ENCLK:
Equate F = A*~B+~A*B+E*~D+~E*D+C
Endblk
Editblk DG
Base F
Config F:A:B:E:C:D Y:F X: DY: DX: RSTDIR: CLK: ENCLK:
Equate F = A*~B+~A*B+E*~C+~E*C+D
Endblk
Editblk HG
Base FG
Config F:A:QX G:A:QX:QY X:QX Y: DX:F DY:G RSTDIR: CLK:K ENCLK:
Equate F = ~QX*A+QX*~A
Equate G = QY*~A+QY*~QX+~QY*QX*A
Endblk
Nameblk P64 dtmf_d0
Editblk P64
Base IO
Config IN:I OUT: TRI:
Endblk
Nameblk P67 dtmf_d1
Editblk P67
Base IO
Config IN:I OUT: TRI:
Endblk
Nameblk P5 dtmf_d2
Editblk P5
Base IO
Config IN:I OUT: TRI:
Endblk
Nameblk P65 dtmf_d3
Editblk P65
Base IO
Config IN:I OUT: TRI:
Endblk
Nameblk P37 dtmf_d4
Editblk P37
Base IO
Config IN: OUT:O TRI:T:NOT
Endblk
Nameblk P32 dtmf_d5
Editblk P32
Base IO
Config IN: OUT:O TRI:T:NOT
Endblk

COMMUNICATIONS MFG. COMPANY
XILINX Configuration data

Nameblk P17 dtmf_d6
Editblk P17
Base IO
Config IN: OUT:O TRI:T:NOT
Endblk
Nameblk P20 dtmf_d7
Editblk P20
Base IO
Config IN: OUT:O TRI:T:NOT
Endblk
Nameblk P38 dtmf_power
Editblk P38
Base IO
Config IN:I OUT: TRI:
Endblk
Nameblk P15 d0
Editblk P15
Base IO
Config IN:I OUT:O TRI:T
Endblk
Nameblk P14 d1
Editblk P14
Base IO
Config IN:I OUT:O TRI:T
Endblk
Nameblk P12 d2
Editblk P12
Base IO
Config IN:I OUT:O TRI:T
Endblk
Nameblk P4 d2a_d0
Editblk P4
Base IO
Config IN: OUT:O TRI:T:NOT
Endblk
Nameblk P8 d2a_d1
Editblk P8
Base IO
Config IN: OUT:O TRI:T:NOT
Endblk
Nameblk P6 d2a_d2
Editblk P6
Base IO
Config IN: OUT:O TRI:T:NOT
Endblk
Nameblk P2 d2a_d3
Editblk P2
Base IO
Config IN: OUT:O TRI:T:NOT
Endblk
Nameblk P46 d2a_d4
Editblk P46
Base IO
Config IN: OUT:O TRI:T:NOT

COMMUNICATIONS MFG. COMPANY
XILINX Configuration data

Endblk
Nameblk P19 d2a_d5
Editblk P19
Base IO
Config IN: OUT:O TRI:T:NOT
Endblk
Nameblk P16 d2a_d6
Editblk P16
Base IO
Config IN: OUT:O TRI:T:NOT
Endblk
Nameblk P50 d2a_d7
Editblk P50
Base IO
Config IN: OUT:O TRI:T:NOT
Endblk
Nameblk P41 d2a_power
Editblk P41
Base IO
Config IN:I OUT: TRI:
Endblk
Nameblk P68 d3
Editblk P68
Base IO
Config IN:I OUT:O TRI:T
Endblk
Nameblk P40 d4
Editblk P40
Base IO
Config IN:I OUT:O TRI:T
Endblk
Nameblk P36 d5
Editblk P36
Base IO
Config IN:I OUT:O TRI:T
Endblk
Nameblk P21 d6
Editblk P21
Base IO
Config IN:I OUT:O TRI:T
Endblk
Nameblk P22 d7
Editblk P22
Base IO
Config IN:I OUT:O TRI:T
Endblk
Editblk FB
Base FG
Config G:A F:C Y: X:QX DY:G DX:F RSTDIR: CLK:K:NOT ENCLK:
Equate G = A
Equate F = C
Endblk
Editblk EB
Base FG COMMUNICATIONS MFG. COMPANY
XILINX Configuration data Config G:E F:C Y:QY X:QX DY:G DX:F RSTDIR: CLK:K:NOT ENCLK:
Equate G = E
Equate F = C
Endblk
Editblk AB
Base FG
Config G:B F:D Y:QY X:QX DY:G DX:F RSTDIR: CLK:K:NOT ENCLK:
Equate G = B
Equate F = D
Endblk
Editblk CB
Base FG
Config F:C G:B X:QX Y:QY DX:F DY:G RSTDIR: CLK:K:NOT ENCLK:
Equate F = C
Equate G = B
Endblk
Editblk FF
Base FG
Config G: F: Y: X:F DY: DX: RSTDIR: CLK: ENCLK:
Equate G = 1
Equate F = 0
Endblk
Editblk BA
Base F
Config F:C:A:B:E:D Y:F X: DY: DX: RSTDIR: CLK: ENCLK:
Equate F = ~C*A+~B*E+D
Endblk
Editblk GB
Base FG
Config G:A:QX F:D:QX Y:G X: DY: DX:F RSTDIR: CLK:K ENCLK:
Equate G = QX*~A+~QX*A
Equate F = ~QX*~D+QX*D
Endblk
Editblk DC
Base FG
Config G:B:D F: Y:G X: DY: DX: RSTDIR: CLK: ENCLK:
Equate G = D*~B
Endblk
Editblk HA
Base FG
Config G:E:B:A F: Y:G X: DY: DX: RSTDIR: CLK: ENCLK:
Equate G = A*E+~A*B
Endblk
Editblk HC
Base FG
Config F:C:D:A G:D:A:B X:F Y:G DX: DY: RSTDIR: CLK: ENCLK:
Equate F = A*C+~A*D
Equate G = A*B+~A*D
Endblk
Nameblk P63 io_rd
Editblk P63
Base IO
Config IN:I:PULLUP OUT: TRI:
Endblk COMMUNICATIONS MFG. COMPANY
XILINX Configuration data Nameblk P3 io_wr
Editblk P3
Base IO
Config IN:I:PULLUP OUT: TRI:
Endblk
Nameblk P13 l1_ri
Editblk P13
Base IO
Config IN:I:PULLUP OUT: TRI:
Endblk
Nameblk P62 l2_ri
Editblk P62
Base IO
Config IN:I:PULLUP OUT: TRI:
Endblk
Nameblk P33 modem_dcd
Editblk P33
Base IO
Config IN:I:PULLUP OUT: TRI:
Endblk
Nameblk P29 modem_dsr
Editblk P29
Base IO
Config IN:I:PULLUP OUT: TRI:
Endblk
Nameblk P24 modem_rxd
Editblk P24
Base IO
Config IN:I:PULLUP OUT: TRI:
Endblk
Nameblk P7 on_off_kb
Editblk P7
Base IO
Config IN:I:PULLUP OUT: TRI:
Endblk
Nameblk P58 pld3_cs
Editblk P58
Base IO
Config IN:I:PULLUP OUT: TRI:
Endblk
Nameblk P30 pwr_up
Editblk P30
Base IO
Config IN: OUT:O TRI:
Endblk
Nameblk P43 sys_clk
Editblk P43
Base IO
Config IN:I:PULLUP OUT: TRI:
Endblk
Nameblk P39 timed_int
Editblk P39
Base IO
Config IN: OUT:O TRI:

COMMUNICATIONS MFG. COMPANY
XILINX Configuration data

```
Endblk
Nameblk P54 tone_valid
Editblk P54
Base IO
Config IN:I OUT: TRI:
Endblk
Nameblk P27 uart_dcd
Editblk P27
Base IO
Config IN: OUT:O TRI:T:NOT
Endblk
Nameblk P34 uart_dsr
Editblk P34
Base IO
Config IN: OUT:O TRI:T:NOT
Endblk
Nameblk P28 uart_rxd
Editblk P28
Base IO
Config IN: OUT:O TRI:T:NOT
Endblk
```

What is claimed is:

1. A data terminal for communications and testing of subscriber equipment in a telephone system of the type having a tip and ring connection, comprising:

a microprocessor;

an EPROM interconnected with said microprocessor to provide system storage;

dynamic random access memory interactively interconnected with said microprocessor and said EPROM and containing resident MS DOS operating system program;

an address buss interconnected between said microprocessor, said EPROM and said dynamic random access memory;

a data buss interconnected between said microprocessor, said EPROM and said dynamic random access memory;

a field programmable gate array receiving a plurality of control signals, address signals, data signals and sensed signals from around the data terminal, and providing a plurality of gated output signals;

a universal asynchronous receiver-transmitter connected to an 8-bit data buss that interconnects with plural gated output digital data ports from said field programmable gate array and provides output of modem control signals;

telephone line input circuit providing connection to the tip and ring connections of said telephone system and generating a caller number delivery signal; and a modem receiving input of said modem control signals and said caller number delivery signal from said telephone line input circuit to provide system subscriber identification.

2. A data terminal as set forth in claim 1 which further includes:

a digital to analog converter connected to said 8-bit data buss and producing an analog control signal indicative of a selected communication channel.

3. A data terminal as set forth in claim 1 which further includes:

a liquid crystal display screen connected to receive output data from said microprocessor;

a transistor responsive to a backlight enable signal from the field programmable gate array to energize a voltage regulator to produce a liquid crystal display backlight voltage; and a digital resistor controlling the voltage regulator to adjust the backlighting for optimum viewing light level.

4. A data terminal as set forth in claim 3 which further includes:

an amplifier stage receiving a control voltage input from said field programmable gate array and generating a liquid crystal display contrast voltage for input to control said liquid crystal display automatically.

5. A data terminal as set forth in claim 1 which further includes:

a DTMF receiver-transmitter receiving input of 8-bit digital data as well as clock input from said field programmable gate array and generating a dual tone multi-frequency output signal for call line identification.

6. A data terminal as set forth in claim 1 which further includes:

a voice-switched speaker phone circuit receiving audio input from a microphone and providing selectively audio speaker output and audio speaker phone output, said speaker phone circuit also receiving speaker enable and speaker mute control inputs from the field programmed gate array.

7. A data terminal as set forth in claim 6 which further includes:

a digital to analog converter which receives 8-bit binary signals and control signals from the field programmed gate array to produce first and second analog outputs; and means applying the first output to said voice switched speaker phone circuit.

8. A data terminal as set forth in claim 7 which further includes:

an audio output circuit including an audio amplifier with speaker outputs; and means applying the second analog output from the digital to analog converter to said audio amplifier.

9. A data terminal as set forth in claim 1 which further includes:

a multi-channel analog to digital converter that receives sensed analog inputs for LCD light level, ambient temperature, battery charge levels, and microphone audio output, for conversion to respective digital signals as output on an 8-bit digital buss for connection to selected input ports of said field programmable gate array.

10. A data terminal as set forth in claim 1 which further includes:

a DC power source;

a solid state energy management stage receiving inputs from said DC power source as well as control signals from said field programmable gate array to provide plural DC operating voltages for operation around said data terminal.

11. A data terminal as set forth in claim 1 wherein said field programmable gate array comprises:

a plurality of field programmable gate array devices connected in parallel, providing a total of at least four thousand logic gates.

12. A data terminal as set forth in claim 10 wherein said field programmable gate array comprises:

a plurality of field programmable gate array devices connected in parallel, providing a total of at least four thousand logic gates.

13. A data terminal as set forth in claim 1 which further includes:

a hermetically sealed housing including a front panel, said housing containing all of said data terminal components;

a liquid crystal display mounted in said front panel; and a keyboard which includes a plurality of function keys, a standard QWERTY key pad and a twelve button telephone key pad, all mounted in said front panel adjacent said display.

14. A data terminal as set forth in claim 13 which further includes:

a photosensor disposed in said front panel to provide a light signal output indicative of ambient light; and means responsive to said light signal to cause backlighting at selected intensity to the liquid crystal display.

15. A data terminal as set forth in claim 13 which further includes:

a thermistor disposed in said housing to provide a temperature signal output;

a reference means established by software to represent optimum viewing light condition for said liquid crystal display; and means for comparing said temperature signal output to said reference means to effect automatic contrast control.

* * * * *

UNITED STATES PATENT AND TRADEMARK OFFICE
CERTIFICATE OF CORRECTION

PATENT NO. : 5,903,624
DATED : May 11, 1999
INVENTOR(S) : Lanny E. Boswell et al.

It is certified that error appears in the above-identified patent and that said Letters Patent is hereby corrected as shown below:

On the title page after "[75] Inventors:", line 2, change "Christopher I. Madore" to --Christopher L. Madore--.

Signed and Sealed this

Eighteenth Day of July, 2000

Attest:

Q. TODD DICKINSON

*Attesting Officer*  *Director of Patents and Trademarks*

UNITED STATES PATENT AND TRADEMARK OFFICE
CERTIFICATE OF CORRECTION

Patent No.: 5,903,624
Dated: May 11, 1999
Inventors: Lanny E. Boswell et al.

It is certified that errors appear in the above-identified patent and that said Letters Patent is hereby corrected as shown below:

Column 5, line 42, delete "20".

Column 8, line 48, change the first occurrence of "L2TR" to --L1TR--.

Signed and Sealed this

Twenty-ninth Day of August, 2000

Attest:

Q. TODD DICKINSON

*Attesting Officer*      *Director of Patents and Trademarks*